United States Patent [19]

Hirota et al.

[11] Patent Number: 5,327,261
[45] Date of Patent: Jul. 5, 1994

[54] IMAGE READING APPARATUS CAPABLE OF DETECTING PAPER SIZE

[75] Inventors: Yoshihiko Hirota; Kunihiko Omura; Shigeru Moriya; Hiroya Sugawa; Katsuaki Tajima; Kaoru Tada, all of Osaka, Japan

[73] Assignee: Minolta Camera Kabushiki Kaisha, Osaka, Japan

[21] Appl. No.: 516,134

[22] Filed: Apr. 27, 1990

[30] Foreign Application Priority Data

| Apr. 29, 1989 | [JP] | Japan | 1-109821 |
| Apr. 29, 1989 | [JP] | Japan | 1-109822 |
| Apr. 29, 1989 | [JP] | Japan | 1-109823 |
| Apr. 29, 1989 | [JP] | Japan | 1-109824 |
| Apr. 29, 1989 | [JP] | Japan | 1-109825 |
| Aug. 8, 1989 | [JP] | Japan | 1-206268 |

[51] Int. Cl.⁵ .................. H04N 1/40; H04N 1/387
[52] U.S. Cl. ................... 358/449; 358/451; 358/452; 358/453; 358/488; 358/494; 355/75
[58] Field of Search ........... 358/401, 406, 449, 448, 358/451, 452, 453, 464, 474, 481, 482, 483, 488, 494, 497, 443, 445; 355/75, 120, 121, 230; 382/9, 47; 395/146, 147

[56] References Cited

U.S. PATENT DOCUMENTS

| 3,695,760 | 10/1972 | Orr | 355/75 |
| 4,630,127 | 12/1986 | Fuwa | 358/449 |
| 4,698,511 | 10/1987 | Sueda et al. | 250/560 |
| 4,802,229 | 1/1989 | Yamada | 358/406 |
| 4,899,227 | 2/1990 | Yamada | 358/449 |

FOREIGN PATENT DOCUMENTS

| 0292212 | 11/1988 | European Pat. Off. | H04N 1/46 |
| 5915930 | 1/1984 | Japan | 355/75 |
| 59-10361 | 4/1984 | Japan | F02D 29/02 |
| 615245 | 6/1984 | Japan | 355/75 |
| 6163835 | 9/1984 | Japan | G03B 27/62 |
| 62-4974 | 2/1985 | Japan | G03B 27/62 |
| 60-100157 | 6/1985 | Japan | G03G 15/00 |
| 62119536 | 11/1985 | Japan | 355/75 |
| 62-1370 | 1/1987 | Japan | H04N 1/40 |
| 63252063 | 4/1987 | Japan | H04N 1/04 |
| 62-170948 | 7/1987 | Japan | G03B 27/62 |
| 62-47026 | 10/1987 | Japan | H04N 1/04 |

Primary Examiner—Edward L. Coles, Sr.
Assistant Examiner—Jerome Grant, II
Attorney, Agent, or Firm—Burns, Doane, Swecker & Mathis

[57] ABSTRACT

An image reading apparatus includes an original placing platen formed of a rectangular transparent member on which an original is placed; a photoelectrical conversion device for reading an image of the original-placed on the transparent member; an original pressing plate having an original pressing surface for pressing the overall surface of the original placing platen, the original pressing surface having a first area formed at a portion opposing a first side of the transparent member and a second area formed at a portion opposing a second side crossing at a right angle to the first side of the transparent member. The first and second areas are determined as a predetermined color by the photoelectrical conversion device. The apparatus further includes a size detecting device for reading by the photoelectrical conversion device the original sandwiched between the first and second areas of the original pressing surface and the transparent member so as to detect the size of the original based on the result of reading.

55 Claims, 41 Drawing Sheets

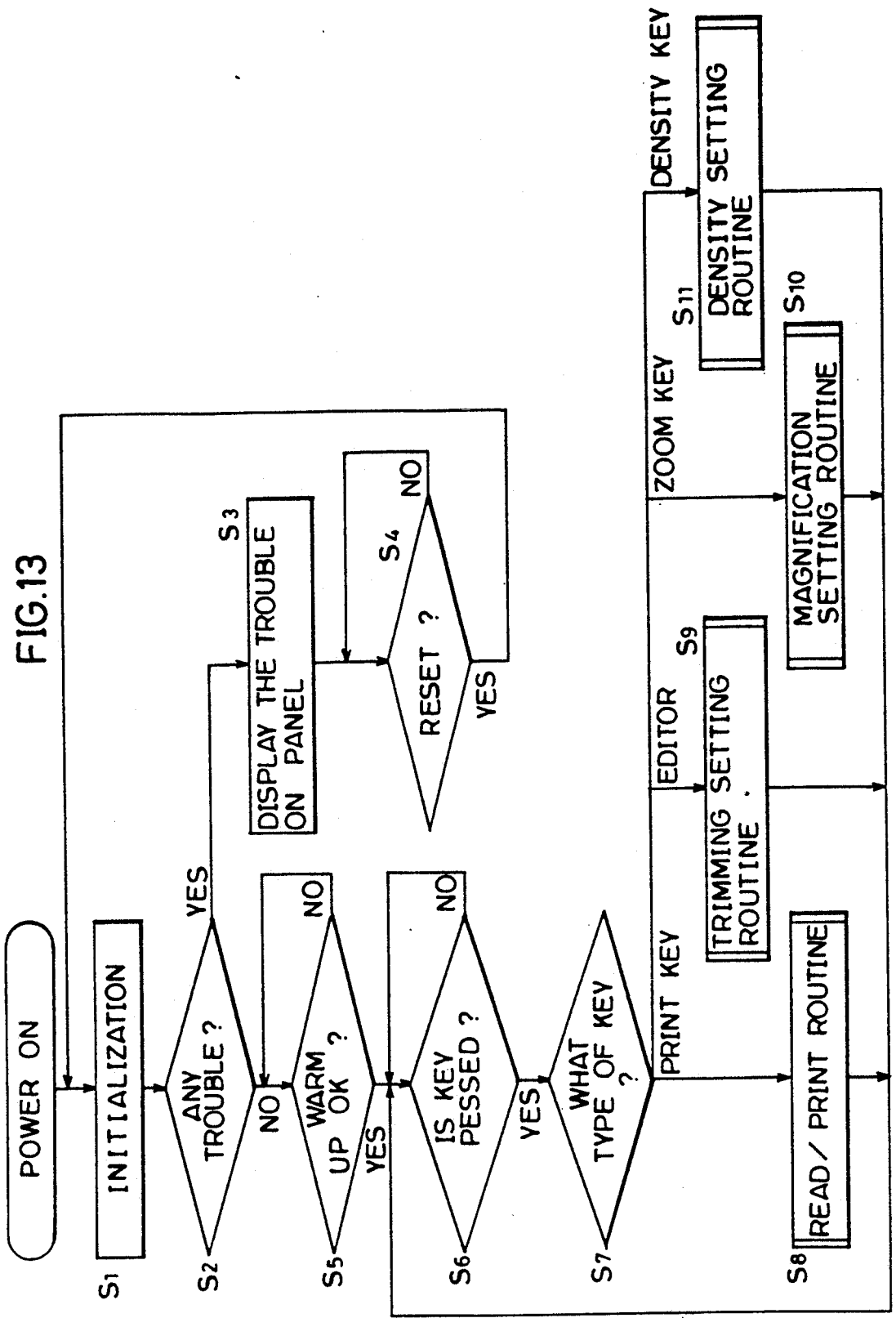

FIG. 26

| | ORIGINAL SIZE | XF | YF | XW | YW |
|---|---|---|---|---|---|
| GENERAL ORIGINAL | A3T | 0 | 0 | 4752 | 6720 |
| | A4Y | 0 | 0 | 4752 | 3360 |
| | A4T | 0 | 0 | 3360 | 4752 |
| | A5Y | 0 | 0 | 3360 | 2376 |
| | A5T | 0 | 0 | 2376 | 3360 |
| OHP PAPER | A3T | 90 | 90 | 4752 | 6720 |
| | A4Y | 90 | 90 | 4752 | 3360 |
| | A4T | 90 | 90 | 3360 | 4752 |
| | A5Y | 90 | 90 | 3360 | 2376 |
| | A5T | 90 | 90 | 2376 | 3360 |

FIG.27

|  | | VALUE OF FLAG A | | | |
|---|---|---|---|---|---|
|  | | 0 | 1 | 2 | 3 |
| VALUE OF FLAG B | 0 | UNDEFINED | UNDEFINED | UNDEFINED | UNDEFINED |
| | 1 | UNDEFINED | NOT NORMAL SIZE | A 5 Y | NOT NORMAL SIZE |
| | 2 | UNDEFINED | A 4 Y | NOT NORMAL SIZE | A 5 T |
| | 3 | UNDEFINED | NOT NORMAL SIZE | A 4 T | NOT NORMAL SIZE |
| | 4 | UNDEFINED | A 3 T | NOT NORMAL SIZE | NOT NORMAL SIZE |

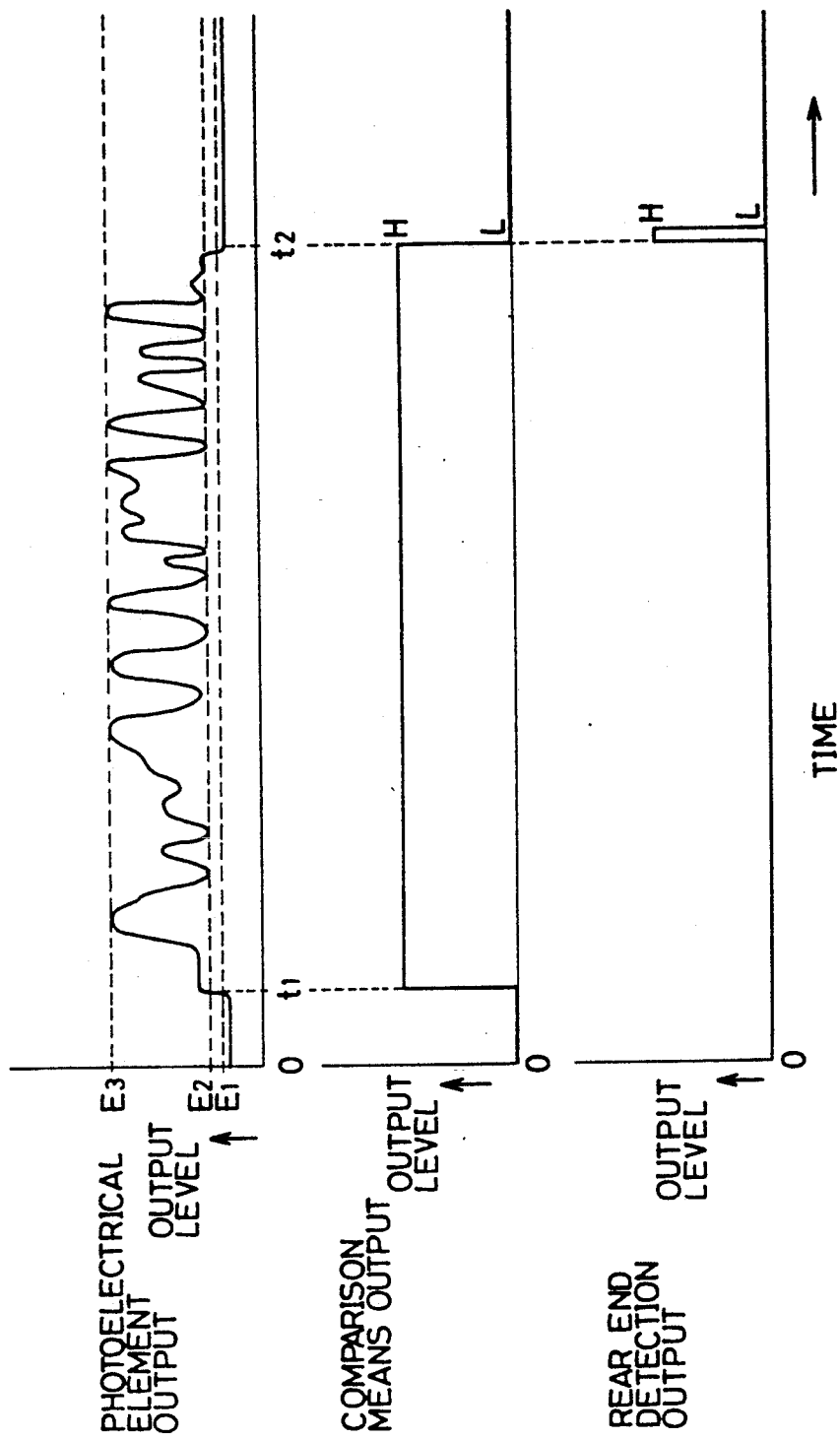

IMAGE READING APPARATUS CAPABLE OF DETECTING PAPER SIZE

BACKGROUND OF THE INVENTION

1. Field of the Invention

The present invention relates generally to image reading apparatuses, and more particularly to an image reading apparatus for detecting the size of paper such as an original.

2. Description of the Related Art

As a conventional image reading apparatus of this kind, the techniques disclosed in Japanese Patent Laying-Open No. 62-170948 can be proposed.

According to the above technique, colored light in spectral distribution in a complementary color relationship of color of a pressing plate for pressing an original is directed onto the original to be detected and to the pressing plate. Then, detecting the intensity of reflected light from the original and pressing plate decides whether the reflected light is from the original or the pressing plate so as to detect the presence and size of the original.

As another conventional image reading apparatus of this kind, the technique disclosed in Japanese Patent Publication No. 60-4974 can also be proposed.

In an original exposing device including a platen on which the original is placed and an optical system moving relatively with respect to the platen so as to expose the original on the platen, the above technique comprises a light receiving element on which reflected light from the platen is incident and which provides an output dependent on the intensity of the incident light, comparison means for comparing the output of the light receiving element with a reference value irrespective of the original size, detection means for relatively moving the platen and optical system before exposure of the original to detect a variation of an output of the comparison means at that time, and decision means responsive to a detection signal from the detection means for deciding the size of the original placed on the platen to output a size signal indicating the decided original size. According to this technique, the platen and optical system are relatively moved before the original exposure, so as to detect the variation of the output of the comparison means at that time and decide the size of the original placed on the platen 9 in response to the detection signal thereof.

The former conventional image reading apparatus thus structured premises the use of the colored light in spectral distribution in the complementary color relationship of the color of the pressing plate for pressing the original. Further, this image reading apparatus needs to calculate the size of the original and hence requires a long time for calculation of the original size.

The latter image reading apparatus thus structured decides whether the original is placed on the overall surface of the platen. Therefore, this image reading apparatus needs to decide the state of the overall surface of the platen in order to decide the original size despite the frequent use of an original of normal size in general. Thus, it spends an unnecessarily long time to decide the original size before the original exposure, which is a main object of this apparatus. Consequently, a long time period is required for calculation of the size of the original.

Moreover, recently, a designation of an area to be read is more often carried out for designating a range to be read on the original placed on the platen. Alternatively, such a case occurs more frequently that only a predetermined area is shifted to a designated position in edition mode.

When the area designation of this type is carried out, the detection and calculation of the original size virtually become not only unnecessary operations but also a lost of rising time, becoming a waste of time before the entry to a reading operation of the original such as a copying operation.

Even if it spends a long time to decide the original size, the occurrence of an error in deciding the original size because of a misplacement of the original results in a reading operation to be carried out in accordance with erroneous information, thereby, for example, causing miscopying in case with a copier. That is, even the long time period required for deciding the original size may simply become a waste of time.

In addition, in case of automatic density control by the image reading apparatus of this kind, it is necessary to carry out scanning for the automatic density control after the original size is read by scanning. As described above, in the image reading apparatus in which the decision of the original size and the automatic density control are carried out by scanning, a preliminary scanning time for carrying out such decision and automatic density control becomes unnegligible.

As another conventional image reading apparatus of this kind, the technique disclosed in Japanese Patent Laying-Open No. 60-100157 can be proposed.

This technique comprises size outputting means for outputting original size data, variable scale magnification outputting means for outputting variable scale magnification data, area deciding means responsive to data from the size outputting means and from the variable scale magnification outputting means for deciding a desired image forming area, and area controlling means responsive to data from the area deciding means for controlling a direction of feeding the original and a width direction of the original with respect to the desired area. This technique makes it possible to control an image forming area on a photoreceptor in response to the data from the size outputting means and from the variable scale magnification outputting means.

The above conventional image reading apparatus thus structured needs to evaluate an image forming area in accordance with an output of each of the size outputting means for outputting original size data and the variable scale magnification outputting means for outputting variable scale magnification data. However, the calculation is variable in accordance with the original size data and variable scale magnification data and hence requires a long calculation time period. Further, in case of selecting edition mode or the like to move a predetermined image area, it is possible that the calculation time becomes still increased.

Now, the image reading apparatus disclosed in the above-identified document No. 60-4974, as shown in FIG. 39 showing an output waveform diagram of the foregoing conventional image reading apparatus, relatively moves the platen and the optical system before original exposure, decides the size of the original placed on the platen by the deciding means in response to the detection signal from the detection means for detecting the variation of the output of the comparison means at that time, and outputs a size signal of a rear end detecting output indicating the decided size of the original. At this time, the comparison means compares an output of the light receiving element with a reference value E1 irrespective of the original size. When this reference value E1 is set as a value lower than a white detecting level of the original as a value irrespective of the original size, it is necessary to employ "white" lighter than the white detecting level of the original for an original pressing cover. However, when the white of the original pressing cover lighter than the white detecting level of the original becomes darker, a detection level irrespective of the original size becomes variable, so that the original size may not be satisfactorily detected. If the reference value is set at a white detecting level slightly lighter than the white detecting level of the original in order to cope with the above problem, the image reading apparatus may cause an erroneous operation due to noise or the like upon decision of the kind and size of the original.

SUMMARY OF THE INVENTION

An object of the present invention is to efficiently detect the size of an original in an image reading apparatus.

Another object of the present invention is to rapidly detect the size of an original in an image reading apparatus.

A further object of the present invention is to efficiently control a function of detecting the size of an original when a range in the original to be read is designated in an image reading apparatus.

A still further object of the present invention is to efficiently control a function of detecting the size of an original based on a state where the original is placed in an image reading apparatus.

A still further object of the present invention is to detect the size and density of an original in an image reading apparatus for a short period of time.

A still further object of the present invention is to remove original size data and unrequited areas in a variable scale magnification/moving processing in an image reading apparatus for a short period of time.

A still further object of the present invention is to prevent the occurrence of an error in detecting the size of an original due to a year-by-year change in color of an original pressing cover in an image reading apparatus.

A still further object of the present invention is to detect the size of an original without being affected by the kind of the original or noise in an image reading apparatus.

In order to achieve the above described objects, according to one aspect, an image reading apparatus in accordance with the present invention includes: an original placing platen formed of a rectangular transparent member on which an original is placed; photoelectrical conversion means for reading an image of the original placed on the transparent member; original pressing means having an original pressing surface for pressing the overall surface of the original placing platen, the original pressing surface having a first area formed at a portion opposing to a first side of the transparent member and a second area formed at a portion opposing to a second side crossing at a right angle to the first side of the transparent member, the first and second areas being determined as a predetermined color by the photoelectrical conversion means; and size detection means for reading the original sandwiched between the first and second areas on the original pressing surface and the transparent member by the photoelectrical conversion means so as to detect the size of the original based on the result of reading.

According to another aspect, the image reading apparatus in accordance with the present invention includes an original placing platen formed of a rectangular transparent member on which an original is placed; photoelectrical conversion means for converting an optical image into an electrical signal; movable optic means movable under the transparent member, for projecting an image of the original onto the photoelectrical conversion means as an optical image while moving; original pressing means having an original pressing surface for pressing the overall surface of the original placing platen, the original pressing surface having a first area formed at a portion opposing to a first side of the transparent member and a second area formed at a portion opposing to a second side crossing at a right angle to the first side of the transparent member, the first and second areas being determined as black by the photoelectric conversion means, while the other areas being determined as white; sampling means for sampling an image at a predetermined position on the original sandwiched between the first area of the original pressing surface and the transparent member, and further sampling an image at a predetermined position on the original sandwiched between the second area of the original pressing surface and the transparent member; and decision means for detecting the size of the original based on data sampled.

According to still another aspect, in the image reading apparatus in accordance with the present invention in which an image of an original placed on a transparent member formed of a rectangular transparent material and pressed by original pressing means is read by photoelectrical conversion means, an image reading method includes the steps of: providing a first area at a portion, opposing to a first side of the transparent member, on a pressing surface of the original pressing means and a second area at a portion thereon opposing to a second side crossing at a right angle to the first side of the transparent member, the first and second areas being determined as a predetermined color by the photoelectrical conversion means; setting the original on the transparent member along the first and second sides thereof; reading an image of a portion of the original pressed by the first and second areas; and deciding the size of the original based on image data read.

The image reading apparatus thus structured need not calculate the size of the original and hence can efficiently detect the size of the original.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 13 is a flow chart showing a main program of the operation of the copier according to the first embodiment of the present invention;

FIG. 26 is a data table showing the relation between original size data and unrequited areas of the first embodiment of the present invention;

FIG. 27 is a data table showing the relation between a flag A and flag B and the normalized size of an original according to the first embodiment of the present invention;

FIG. 39 is a diagram showing output waveforms of a conventional image reading apparatus.

DESCRIPTION OF THE PREFERRED EMBODIMENTS

An image reading apparatus of the present invention when employed for a copier will now be described.

Figure 2:
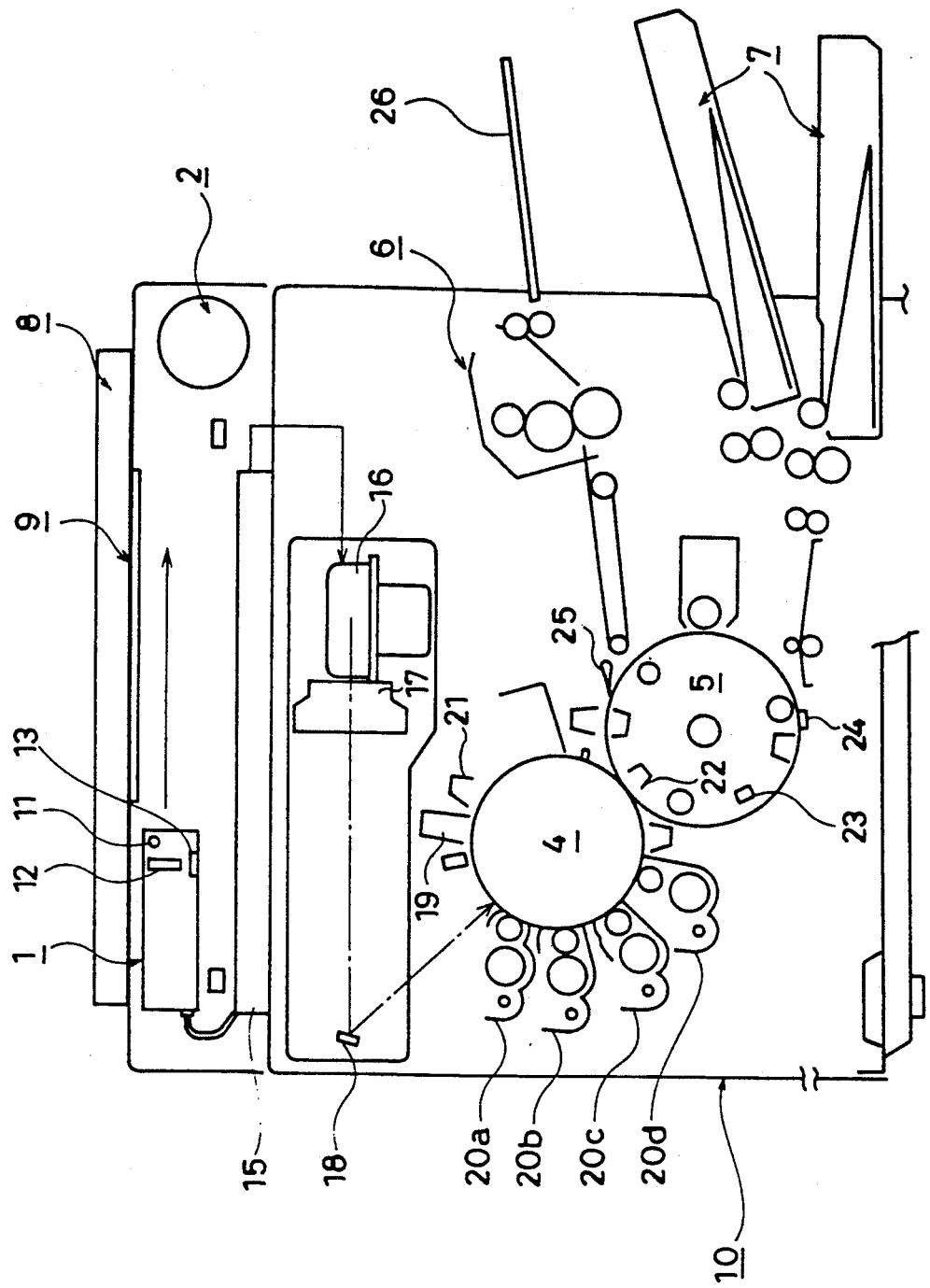
FIG. 2 is a front view showing a schematic internal structure of the entire copier of the first embodiment of the present invention.
Figure 3:
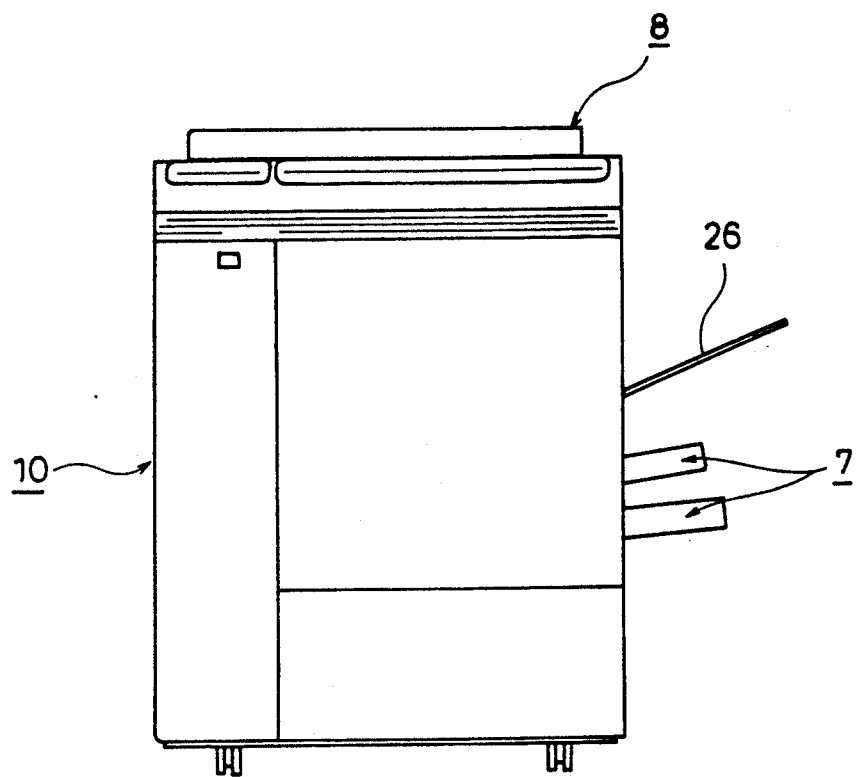
FIG. 3 is a front view of the entire copier of FIG. 2.
Figure 4:
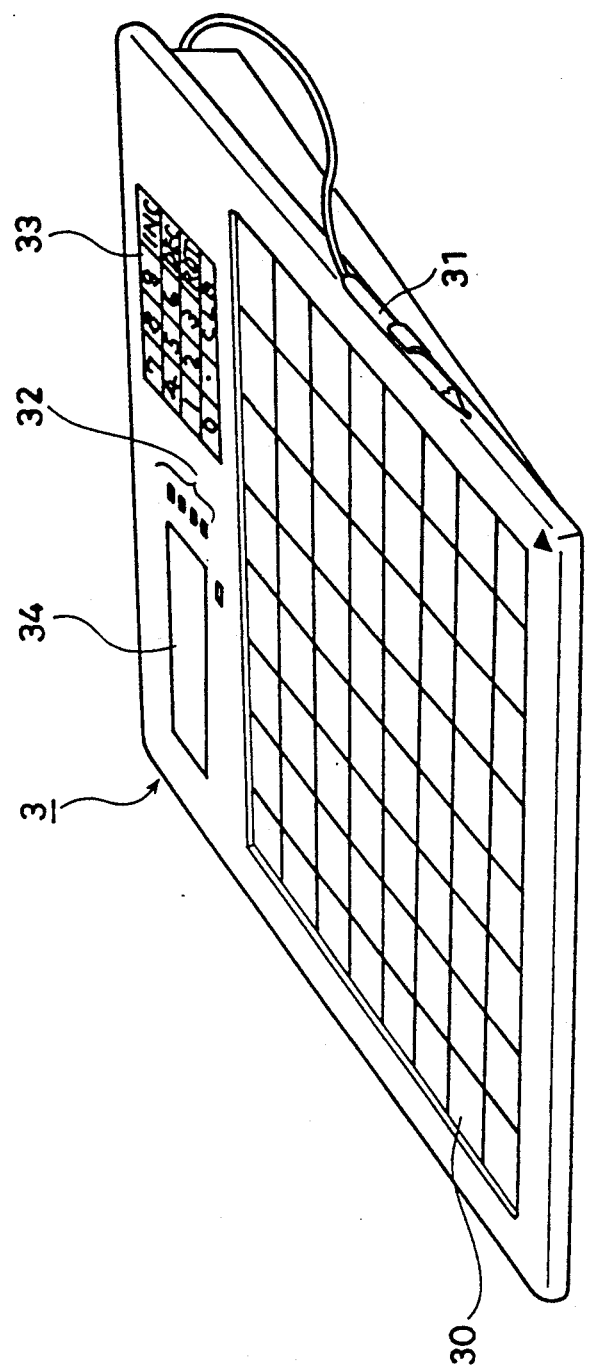
FIG. 4 is a perspective view of the entire of an editor used in the copier of FIG. 2.

FIG. 2 is a front view of a major portion showing a schematic internal structure of an entire copier of a first embodiment of the present invention; FIG. 3 is a front view of the entire copier of FIG. 2; and FIG. 4 is a perspective view of an entire editor employed in the copier of FIG. 2.

The copier of this embodiment converts an original image read by an image sensor into image data which is a digital signal and then prints an image on paper in correspondence with the image data by an electrophotographic system.

Referring to FIGS. 2 and 3, a scanner 1 comprises an exposure lamp 11 for directing light onto an original, a rod lens array 12 for converging reflected light from the original, and an image sensor 13 for color use, formed such as of CCD for converting the converged light into an electrical signal. For the exposure lamp 11 for directing light to the original according to this embodiment, one employed in general in the copier is available, and hence a special lamp is not required thereon. The scanner 1 is driven by a motor 2 upon reading an original image. An original placed on a platen 9 made of a transparent member is scanned by the scanner 1 while being pressed by an original pressing cover 8.

The original image irradiated with the exposure lamp 11 is photoelectrically converted by the image sensor 13 and then converted into a printing signal of any color, yellow, magenta, cyan or black by a signal processing portion 15. Am output of the image sensor 13 is used for determination of the size of the original.

In a print head portion 16, a driver of a semiconductor laser (not shown) operates according to a printing signal of each color transmitted from the signal processing portion 15, so that the semiconductor laser blinks. A laser beam generated from the semiconductor laser is reflected on a reflecting mirror 18 through an fθ lens 17 so as to expose a photoreceptor drum 4. The photoreceptor drum 4 has its surface uniformly charged by a corona charger 19. An electrostatic latent image is formed in the photoreceptor drum 4 with the above described exposure.

This electrostatic latent image is developed in any color, yellow, magenta, cyan or black by any of developing devices 20a-20b. The developed image is transferred onto paper wound around the circumference of a transfer drum 5 by a transfer charger 22.

After the foregoing steps are repeated with respect to at least one color or more out of yellow, magenta, cyan and black, the paper is separated from the transfer drum 5 by a paper separation claw 25, fixed by a fixing device 6 and then discharged onto a paper discharge tray 26. During this process, the scanner 1 repeats scanning in synchronization with rotating operations of the photoreceptor drum 4 and transfer drum 5. A position sensor 23 is provided in the transfer drum 5 so as to allow a detection signal thereof to control the synchronization with the scanner 1. The paper is fed from a paper cassette 7, and the end of the fed paper is chucked by a chucking mechanism 24 provided in the transfer drum 5, so as not to cause a positional deviation of the paper upon transferring of each color. An eraser lamp 21 erases a latent image in the photoreceptor drum 4.

These structures are built in a housing 10 for forming the exterior of a main body of the copier.

An editor 3 employed in the copier of this embodiment comprises, as shown in FIG. 4, a coordinate input tablet 30, a stylus pen 31 used for an input into this coordinate input tablet 30, a select key 32 for selecting paper, an input key 33, a liquid crystal display portion 34 for displaying an input state, etc.

Figure 5:
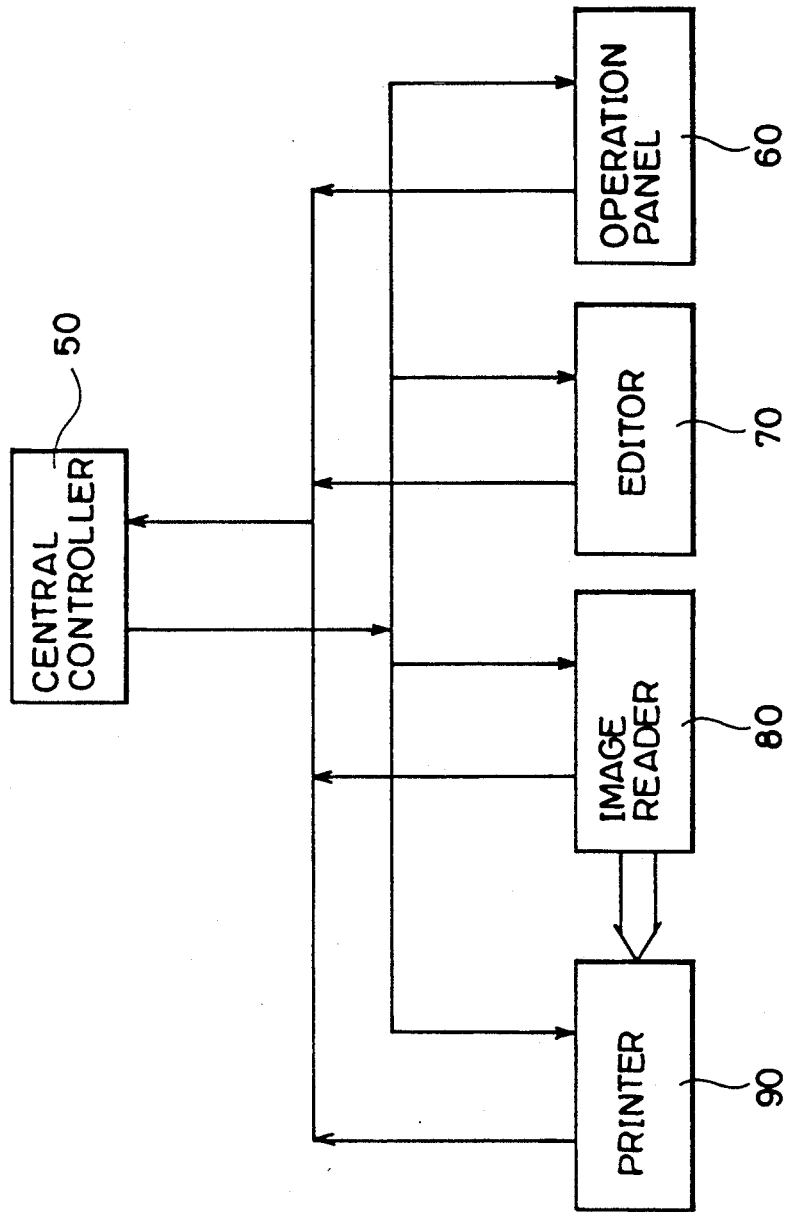
FIG. 5 is a block diagram showing the entire configuration of a control system of the copier of the first embodiment of the present invention.
Figure 6:
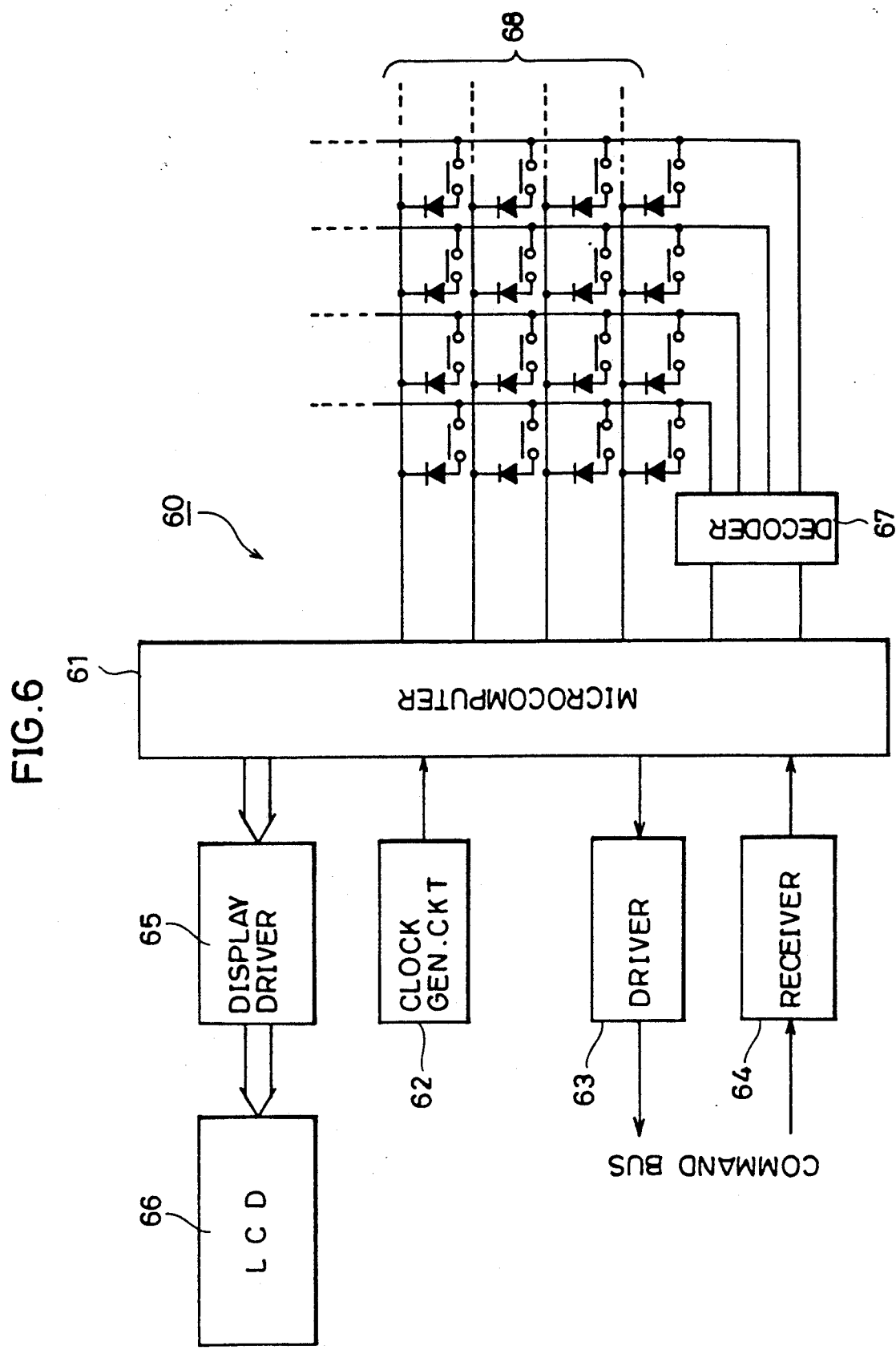
FIG. 6 is a diagram showing a circuit configuration of an operation panel of FIG. 5.
Figure 7:
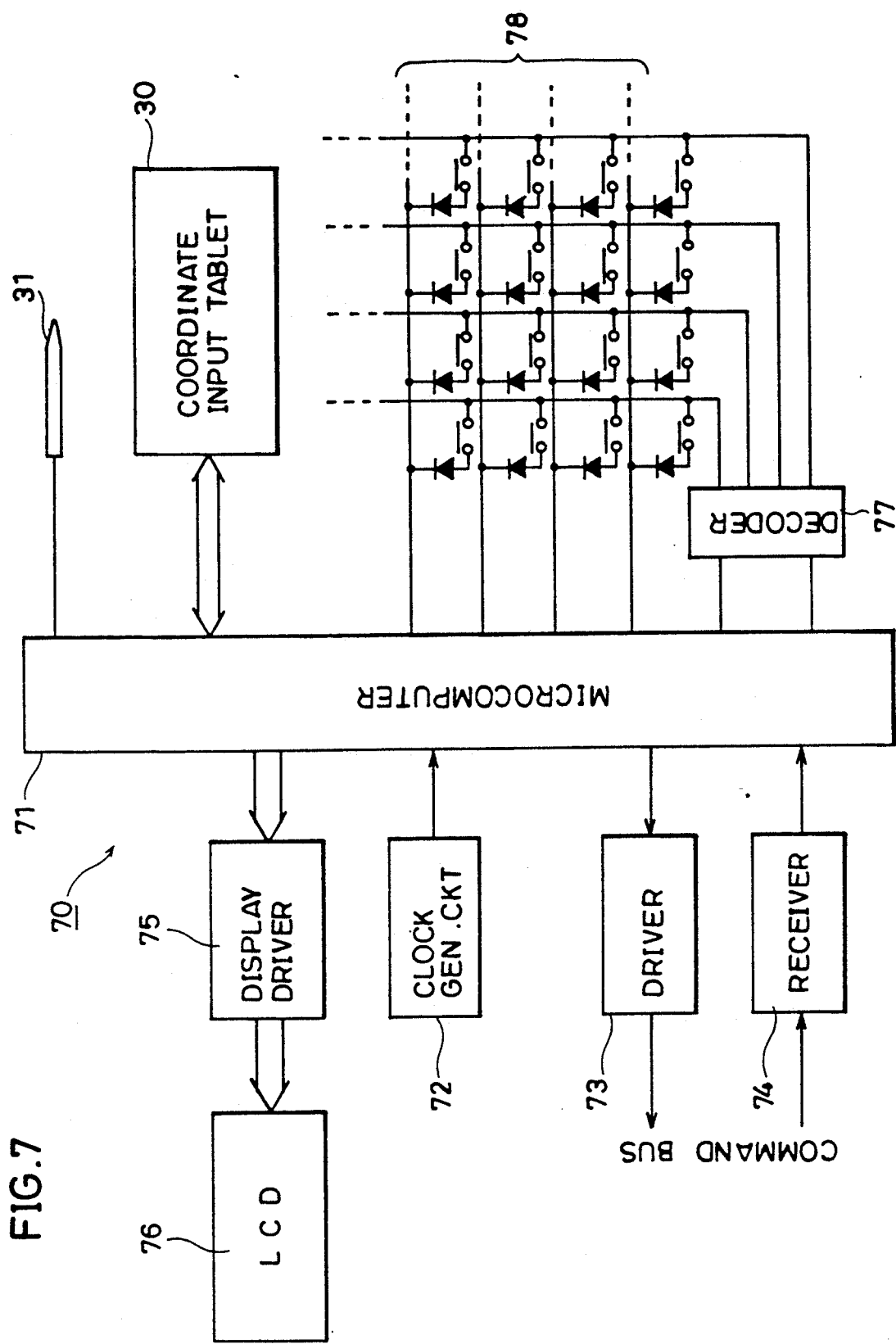
FIG. 7 is a diagram showing a circuit configuration of an editor of FIG. 5.
Figure 8:
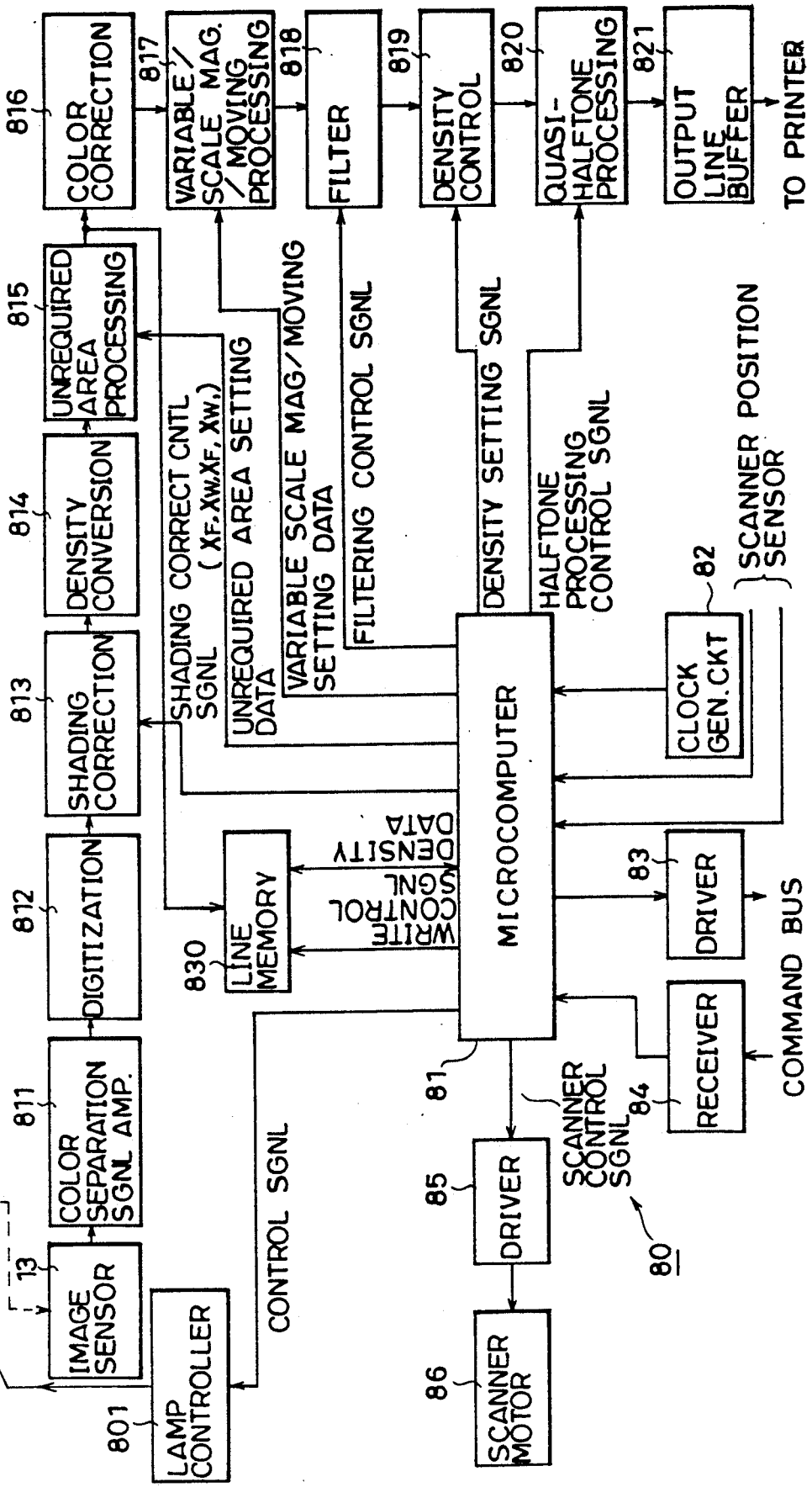
FIG. 8 is a diagram showing a circuit configuration of an image reader of FIG. 5.
Figure 9:
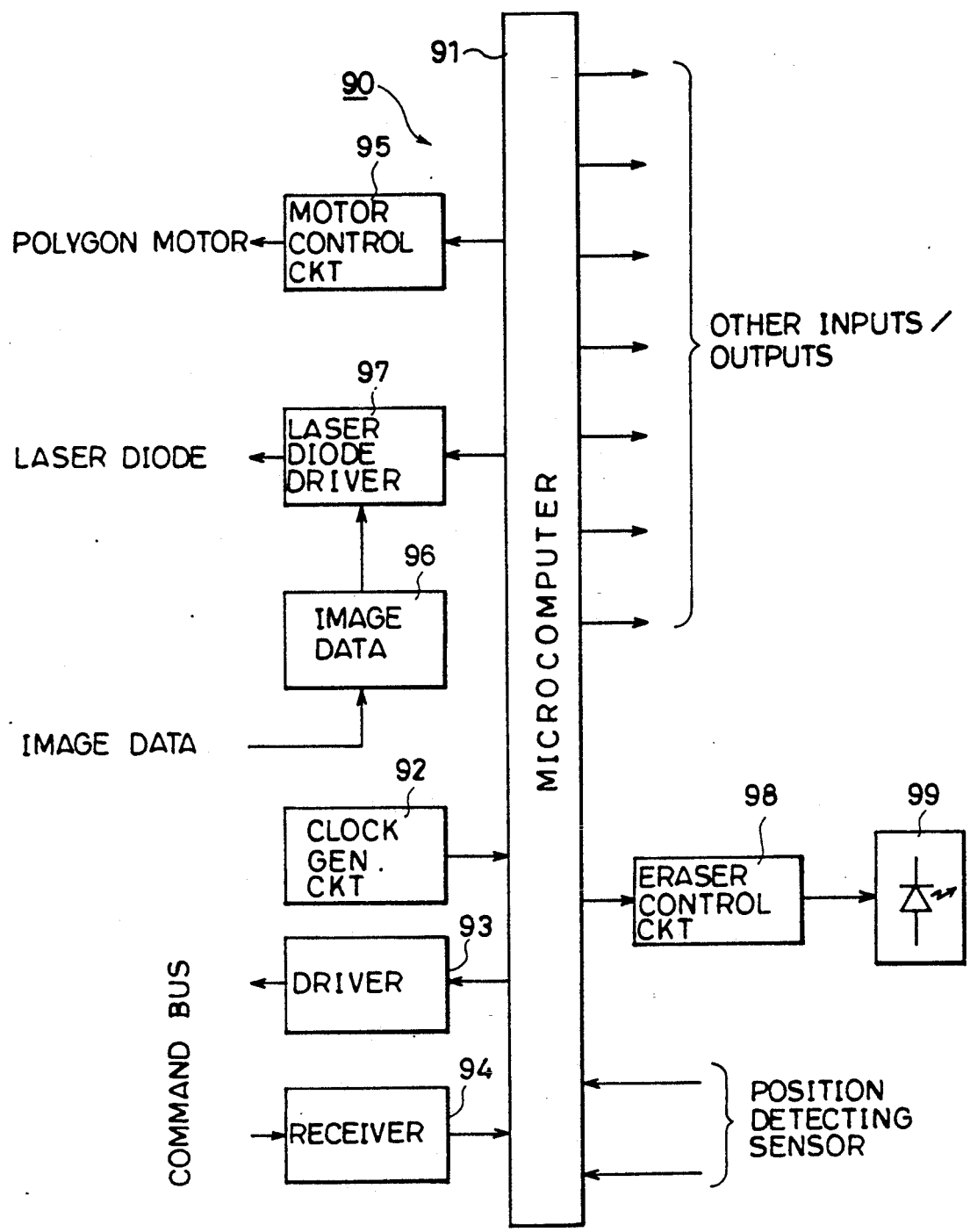
FIG. 9 is a diagram showing a partial circuit configuration of FIG. 5.

FIG. 5 is a schematic block diagram of the entire configuration of a control system of the copier according to the first embodiment of the present invention; FIG. 6 is a schematic diagram of a circuit configuration of an operation panel of FIG. 5; FIG. 7 is a schematic diagram of a circuit configuration of an editor of FIG. 5; FIG. 8 is a schematic diagram of a circuit configuration of an image reader of FIG. 5; and FIG. 9 is a schematic diagram of a circuit configuration of a printing portion of FIG. 5.

In FIG. 5, a central controller 50 causes a serial signal to integrally control an operation panel portion 60, an editor portion 70, an image reader portion 80 and a printing portion 90 so as to perform an overall control as a copier. The operation panel 60 principally inputs keys for operating the copier; the editor portion 70 carries out an edition input; the image reader portion 80 reads the original to convert the read data into an image signal; and the printing portion 90 records the image signal on paper.

A detailed description will now be given on the operation panel portion 60, editor portion 70, image reader portion 80 and printing portion 90.

The operation panel portion 60 comprises a microcomputer 61 and a clock generating circuit 62 for driving the microcomputer 61, and is connected through a driver 63 and a receiver 64 to a command bus. The microcomputer 61 is connected through a display driver 65 to a liquid crystal display portion 66 for message display. The microcomputer 61 outputs a scanning signal through a decoder 67 and inputs an operation signal of a touch key 68 formed together with a diode matrix circuit.

The editor portion 70, which comprises a microcomputer 71 and a clock generating circuit 72 for driving the microcomputer 71, is connected through a driver 73 and a receiver 74 to a command bus. The microcomputer 71 is connected through a display driver 75 to a liquid crystal display portion 76 for message display. The microcomputer 71 outputs a scanning signal through a decoder 77 and detects the operation of a touch key 78 formed together with a diode matrix circuit.

There are connected to the microcomputer 71 a coordinate input tablet 30 for inputting an X coordinate and a Y coordinate which edit an original to be copied, and a stylus pen 31 for instructing the X and Y coordinates.

The image reader portion 80, which comprises a microcomputer 81 and a clock generating circuit 82 for driving the microcomputer 81, is connected through a driver 83 and a receiver 84 to a command bus. The microcomputer 81 controls through a driver 85 a scanner motor 86 for scanning the original.

The microcomputer 81 causes the exposure lamp 11 to light up through a lamp controlling portion 801 and thus direct light to the original placed on the platen 9. An original image irradiated by the exposure lamp 11 is photoelectrically converted by the image sensor 13 so as to be converted into red, green, blue by a color separation signal amplifying portion 811. The signal of each color red, green, blue, which is subjected to the color separation, is A/D converted at a digitizing portion 812 and is then subjected to a shading correction for correcting the sensitivity of the image sensor 13, an evenness in light intensity distribution of the exposure lamp and so on at a shading correction portion 813. The shading-corrected signal is then converted into density conversion data at a density conversion portion 814.

Figure 25:
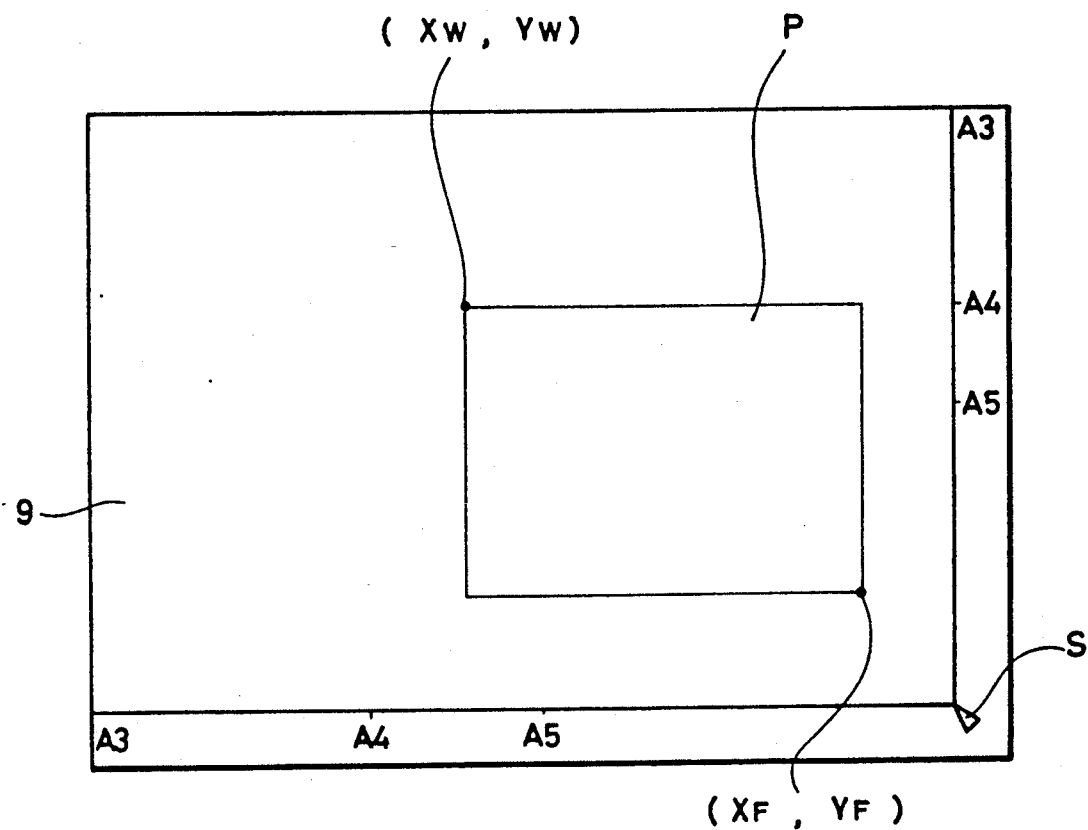
FIG. 25 is a diagram showing the relation between original size data and unrequited areas of the first embodiment of the present invention.

Next, as shown in a graph of FIG. 25 showing a relationship between unrequited areas and data indicating the size of an original (XF, XW, YF, YW) and in a data table of FIG. 26 showing the above relationship, unrequired areas are removed based on the original size data (XF, XW, YF, YW) in an unrequired-area processing portion 815. The reason why the original size data (XF, YF) of OHP paper in the above table is set to "90" is that in order to prevent an L-shaped area 8C in an elastic pressing member 8B of the original pressing cover 8 from becoming "black" data after transmitted through the OHP paper, with the original pressing cover 8 pressing the OHP paper. Therefore, "white" data processing is carried out by adding "90+ corresponding to the width of the L-shaped area 8C to the size of the original.

The unrequired-area processing portion 815, in which a processing for erasing areas other than the image area (replacing to "white" data) is carried out, performs an image data processing prior to a variable scale magnification/moving processing portion 817 which will be described later. That is, in case where an original size A4T (which means a case that an elongated direction of an A4-size paper goes along a main scanning direction) is printed with contraction on a copy paper larger in size than A4T, for example, when the processing for erasing the other areas than the image area by the unrequired-area processing portion 815 is carried out after contraction, since an unrequited image due such as to contamination of the surface of the elastic pressing member 8B of the original pressing cover 8 is simultaneously contracted and then the areas outside the original size are replaced by white data, the unrequited image is consequently printed outside the contracted image of the original. Preventing this phenomenon requires a correction in consideration for magnification, the amount of movement, original size, printing paper size and so on, and also requires a complicated calculation, resulting in a loss in calculation time required for the calculation. Therefore, as in this embodiment, performing the processing for erasing the other areas than the image area by the unrequired-area processing portion 815 prior to the processing carried out by the variable scale magnification/moving processing portion 817 or the like allows such a complicated calculation to be eliminated and further results in an uncontaminated image output without being affected by magnification, the amount of movement, original size, printing paper size and so on.

Next, in a color correction portion 816, undercolors are removed from an image signal of each color, red, green, blue. By combining the property of developing toner with an image signal corresponding to each printing color, yellow, magenta, cyan or black, signals of yellow, magenta, cyan and black are each produced. An output from which unrequired areas are removed at the unrequited-area processing portion 815, is inputted to a line memory 830 as image data for each line by one main scanning. The microcomputer 81 can read the image data for each line inputted to the line memory 830 and also allows image data, in reading the original, to be designated at an arbitrary position of the line memory 830. An output of the color correction portion 816 sets a position based on a predetermined magnification and editing information in the variable scale magnification/moving processing portion 817. A filtering portion 818 carries out a filtering such as a predetermined edge processing and a smoothing. A density control portion 819 processes the density of prints. Further, a quasi-halftone processing portion 820 carries out a dither processing and a multiple-valued processing to output the result of processing to the printing portion 90 through an output line buffer 821.

The printing portion 90 which comprises a microcomputer 91 and a clock generating circuit 92 for driving the microcomputer 91 is connected through a driver 93 and a receiver 94 to a command bus. The microcomputer 91 outputs a control signal through a motor controlling circuit 95 to a polygon motor 16. The image data outputted from the output line buffer 821 in the image reader portion 80 enters through image data I/F (interface) 96 so as to cause a laser diode (not shown) to emit through a laser diode driver 97 controlled by the microcomputer 91. The microcomputer 91 controls an eraser lamp 99 through an eraser control circuit 98. In addition, input/output of another apparatus and another sensor required for operating the copier of this embodiment is connected to the microcomputer 91.

Moreover, a description will now be given particularly on the unrequited-area processing portion 815 employed in the embodiment of the present invention, in the above described block configuration, by way of a detailed circuit example.

Figure 10:
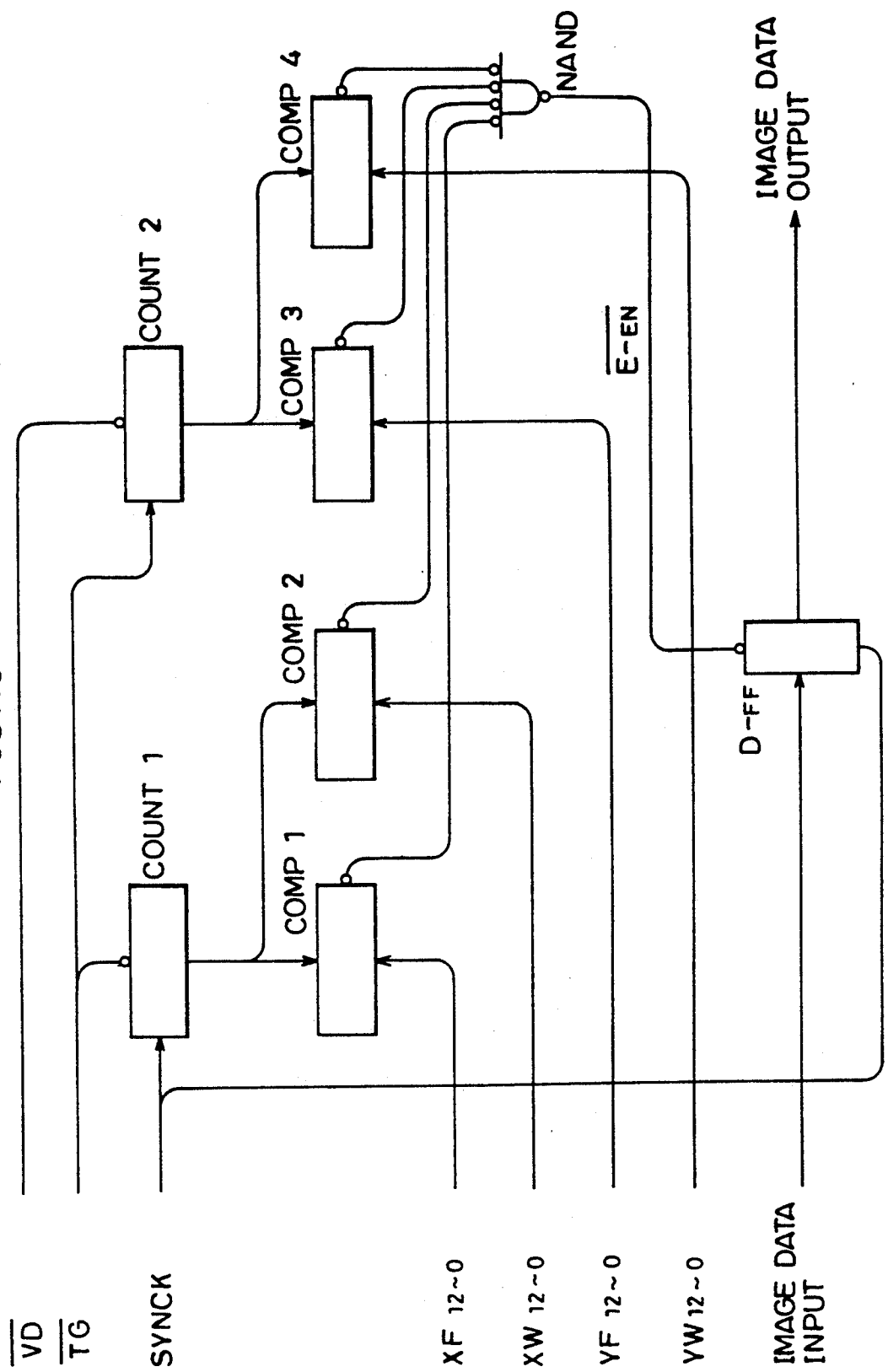
FIG. 10 is a detailed circuit diagram of an unrequited-area processing portion employed in the first embodiment of the present invention.

FIG. 10 is a detailed circuit diagram of the unrequired-area processing portion 815 employed in the first embodiment of the present invention.

In this figure, a counter COUNT 1 is employed for designation of addresses XA12-0 for the original of pixels to be read in the main scanning direction. A counter COUNT 2 is employed for designation of addresses YA12-0 for the original of pixels to be read in the subscanning direction. At this time, an address of a reference position of the original is $XA12\text{-}0 \leq YA12\text{-}0 = 000$. Comparators COMP 1-4 generate an E-EN signal which erases a signal outside the area of the original. The comparator COMP 1 determines a reading start position in the main scanning direction. The comparator COMP 2 determines a reading end position in the main scanning direction. The comparator COMP 3 determines a reading start position in the subscanning direction. The comparator COMP 4 determines a reading end position in the subscanning direction. Thus, the comparators COMP 1-4 are provided with the following addresses and dimensions from the microcomputer 81.

XF12-0; leading addresses to be read in the main scanning direction

YF12-0; leading addresses to be read in the subscanning direction

XW12-0; dimensions to be read in the main scanning direction

YW12-0; dimensions to be read in the subscanning direction

As described above, an output of each of the comparators COMP 1-4 becomes the E-EN signal, which erases a signal outside the area of the original, by a NAND gate NAND so as to be supplied to a clear signal outputting terminal of a D-flipflop D-FF. This supplied signal, in case with the area outside the original size, determines image data of an output from a Q terminal of the D-flipflop D-FF as "white" data independently of image data to be an input into a D terminal of the D-flipflop D-FF.

That is, in the unrequited-area processing portion 815, determining the areas other than the original region as "white" data upon detection of the original size no longer needs useless printing processing, and hence the unrequired-area processing portion 815 detects the address of the original size in the main scanning and subscanning directions.

A TG signal which is a synchronizing signal for each line in main scanning is a timing pulse for generating one pulse when moving one step in the subscanning direction. A VD signal indicates a range of the original to be reproduced in the subscanning direction.

Figure 1A:
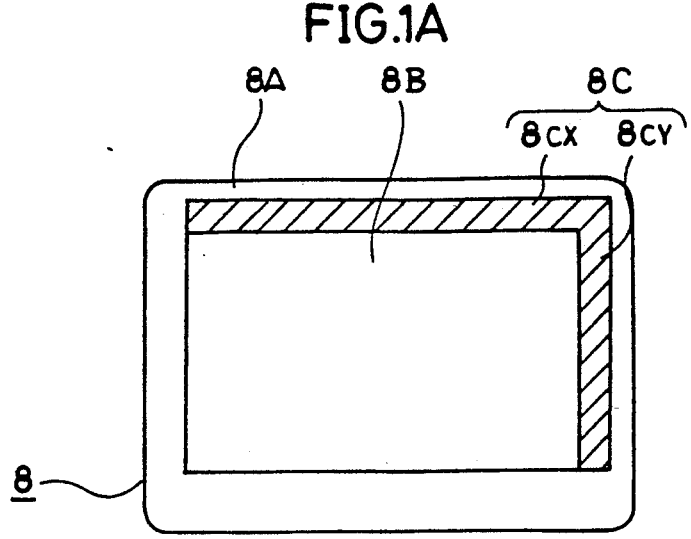
FIGS. 1A-1C are diagrams for describing a principle in case where an image reading apparatus according to a first embodiment of the present invention is applied to a copier.
Figure 1B:
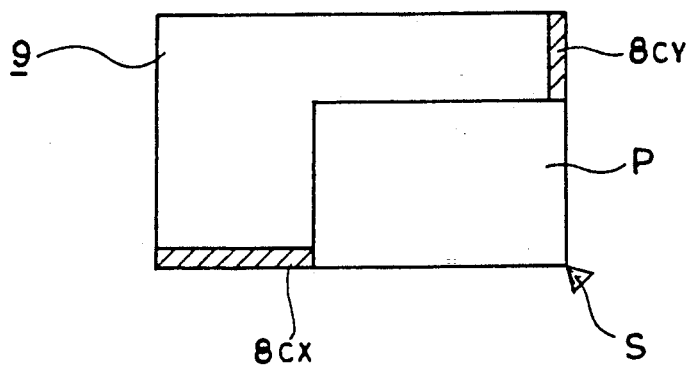
Figure 1C:
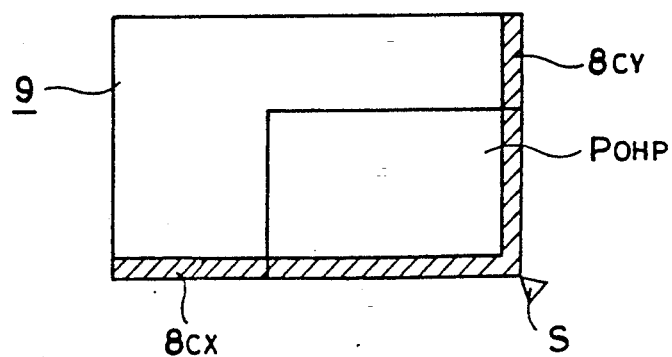
Figure 11:
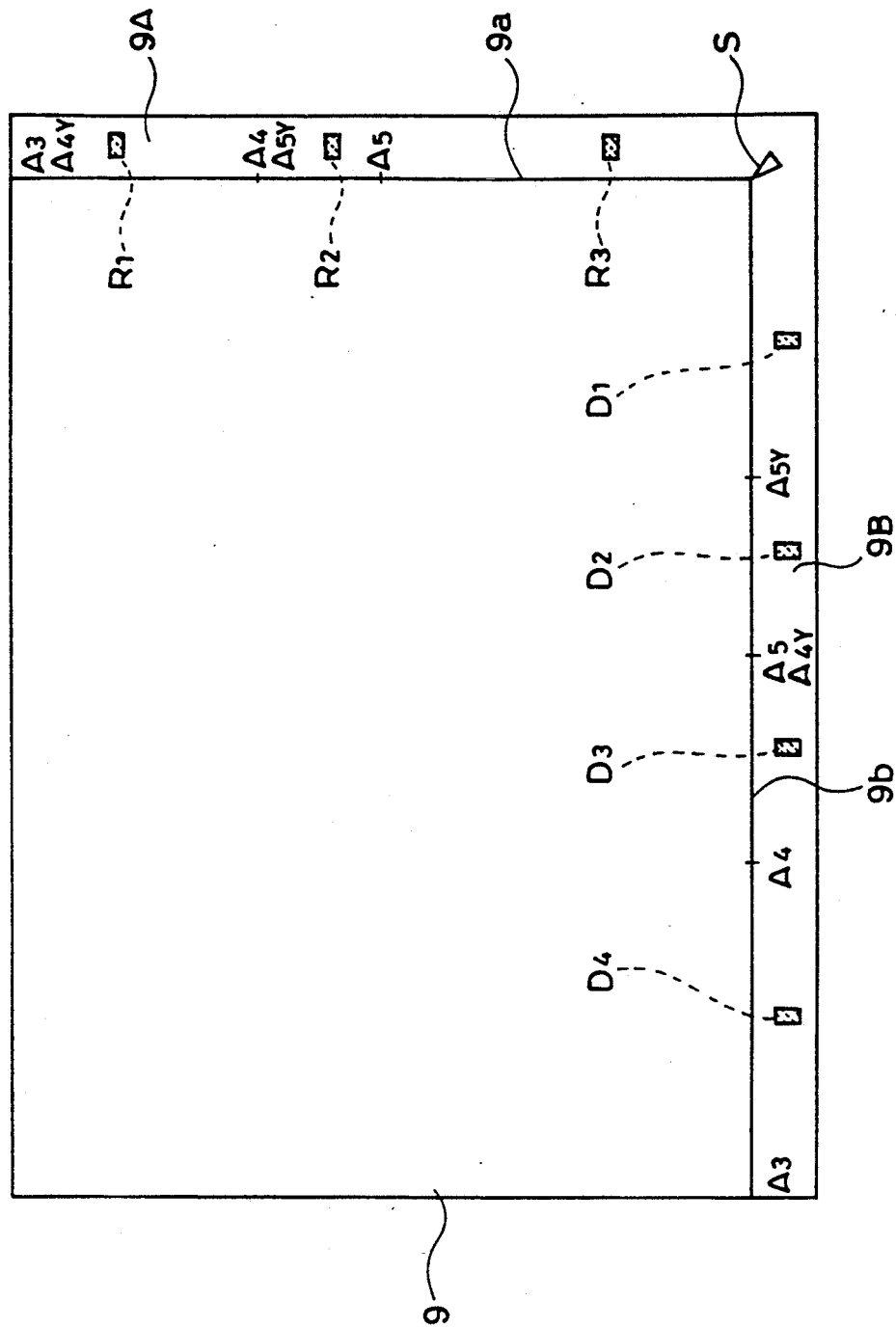
FIG. 11 is a plan view of a platen of the copier of the first embodiment of the present invention.
Figure 12:
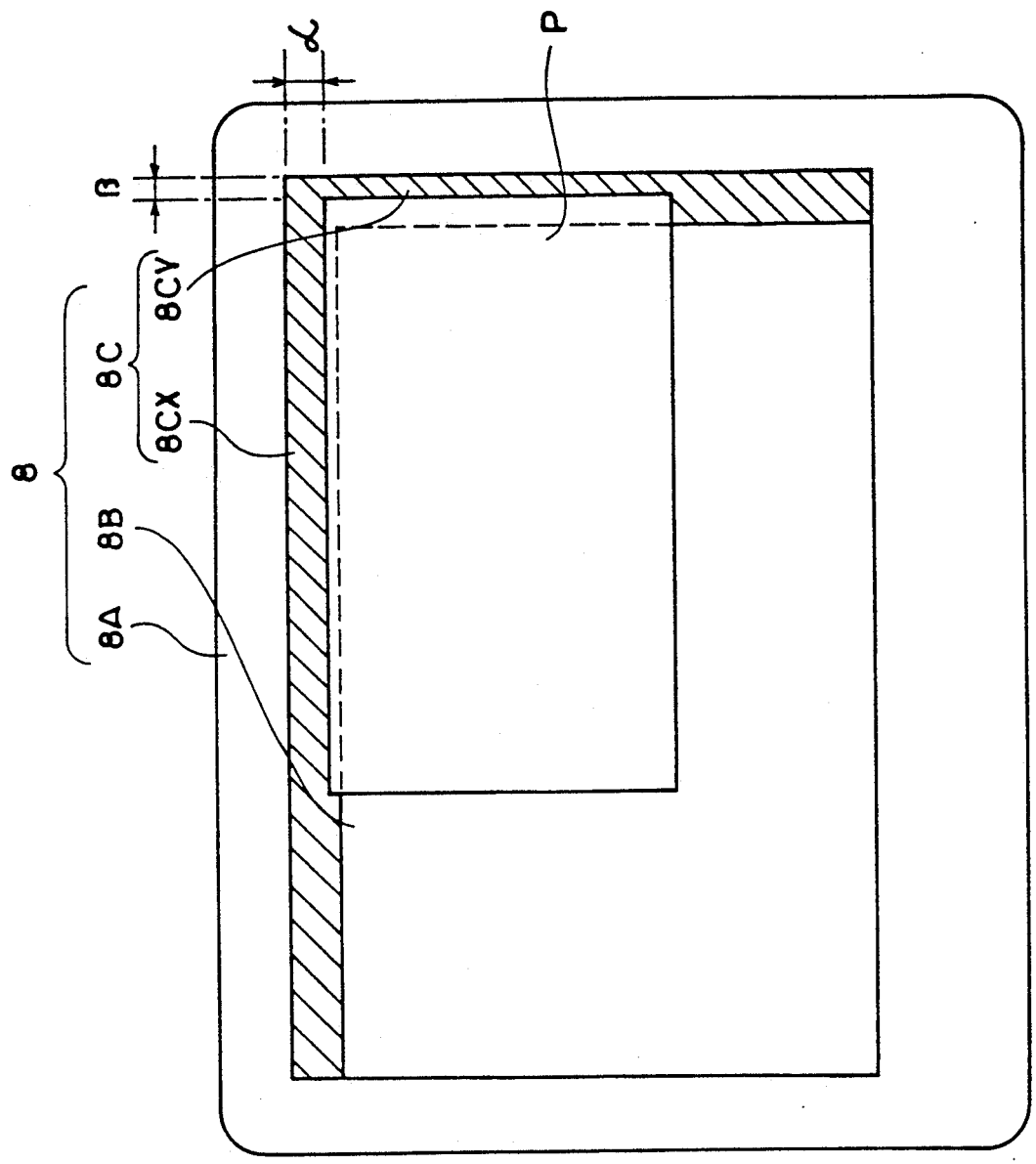
FIG. 12 is a diagram showing a relation between an original pressing cover and an original in case where the original is set out of right place in the first embodiment of the present invention.

A principle of the image reading apparatus of the first embodiment of the present invention will now be described with reference to FIG. 1. FIGS. 1A-1C are diagrams for describing the principle of the image reading apparatus of the present invention when applied to the copier. FIG. 1A is a front view of the original pressing cover 8; FIG. 1B is a front view, viewed from scanner 1 side, of a state that the original pressing cover is closed over an original of a white background plain paper placed on the platen 9; and FIG. 1C is a front view, viewed from scanner 1 side, of a state that the original pressing cover is closed over a transparent original POHP such as of OHP placed on the platen 9. FIG. 11 is a plan view of the platen 9 of the copier of this embodiment. FIG. 12 is a view for describing a positional relationship between the original pressing cover 8 and an original P when the original P is out of right position.

Referring to FIG. 1, the original pressing cover 8 comprises a main cover body 8A made such as of synthetic resin, including a frame formed around the circumference of a plate thereof, and an elastic pressing member 8B formed of an elastic member, provided within the frame body. Along two sides of the elastic pressing member 8B is formed an L-shaped area 8C including a main scanning direction 8CY and a subscanning direction 8CX. This L-shaped area 8C is determined by electrical detection means, for example, as a black area with a predetermined width by the image sensor 13 in the above embodiment of the copier. Further, the L-shaped area 8C is formed so that a crossing point thereof is positioned at an original reference position S (see FIG. 11) which is one predetermined corner of the platen 9.

Areas on the elastic pressing member 8B of the original pressing cover 8 except for the L-shaped area 8C are colored as readable as white color by the image sensor 13.

As shown in FIG. 1B, for example, an original P of plain paper is placed in registration with the original reference position S on the platen 9 formed of a transparent member. When a state that the original of plain paper is placed on the platen 9 is viewed from scanner 1 side, while the original P on the platen 9 is being pressed by the original pressing cover 8, a predetermined distance, within the L-shaped area 8C of the elastic pressing member 8B, from the original reference position S is veiled with the original P. The length of the L-shaped area 8C veiled with the original P in the main scanning direction 8CY and in subscanning direction 8CX is determined depending on the type of the original P and the like.

As shown in FIG. 1C, in a case where a transparent original P OHP such as of OHP paper is placed on the platen 9, when viewed from scanner 1 side, the L-shaped area 8C of the elastic pressing member 8B is not veiled.

Therefore, in order to detect both the original P of plain paper and the transparent original POHP such as of OHP paper placed on the platen 9, it is necessary to set unconstant the angle of incidence of light from a light source with respect to the original P or transparent original POHP and a reflection angle on photodetecting side to detect scattered light from the original P or transparent original POHP. Thus, in this embodiment, the original placed on the platen 9 made of a transparent member is scanned while being pressed by the original pressing cover 8, and the scattered light of the original P or transparent original POHP is detected by the image sensor 13 for color use including CCD and the like constituting the scanner 1. As a matter of course, the L-shaped area 8C of the elastic pressing member 8B is required, in general, to be formed of a material presenting a mirror-like total reflection. This is possible because since only the scattered light need be received from the original P of plain paper or the transparent original POHP such as of OHP paper, the L-shaped area 8C need surely be read as black by the image sensor 13.

Preferably, the original P has its specified corner positioned at the original reference position S and its two sides abutted on an original size scale 9A along a longitudinal side 9a of the platen 9 and on an original size scale 9B along a lateral side 9b thereof, respectively, so as to be set at a normal position. However, the original P is not always fixed at a predetermined normal position due to errors by human, or air flows upon operation of the original pressing cover 8. In addition, due to an unsteadiness of the original pressing cover 8 resulting from an imprecise attachment thereof or the like, there sometimes occurs a deviation between a predetermined position of the platen 9 and a position of the L-shaped area 8C of the elastic pressing member 8B.

For this reason, the L-shaped area 8C of the elastic pressing member 8B has a width of approximately 5 mm when viewed from scanner 1 side. Further, an error $\alpha$ in the main scanning direction 8CY of the L-shaped area 8C and an error $\beta$ in the subscanning direction 8CX are set as can be absorbed by an electrical processing.

A description will be given on the operation of the image reading apparatus thus structured when applied to a copier with reference to flow charts of FIGS. 13 through 19.

Figure 15:
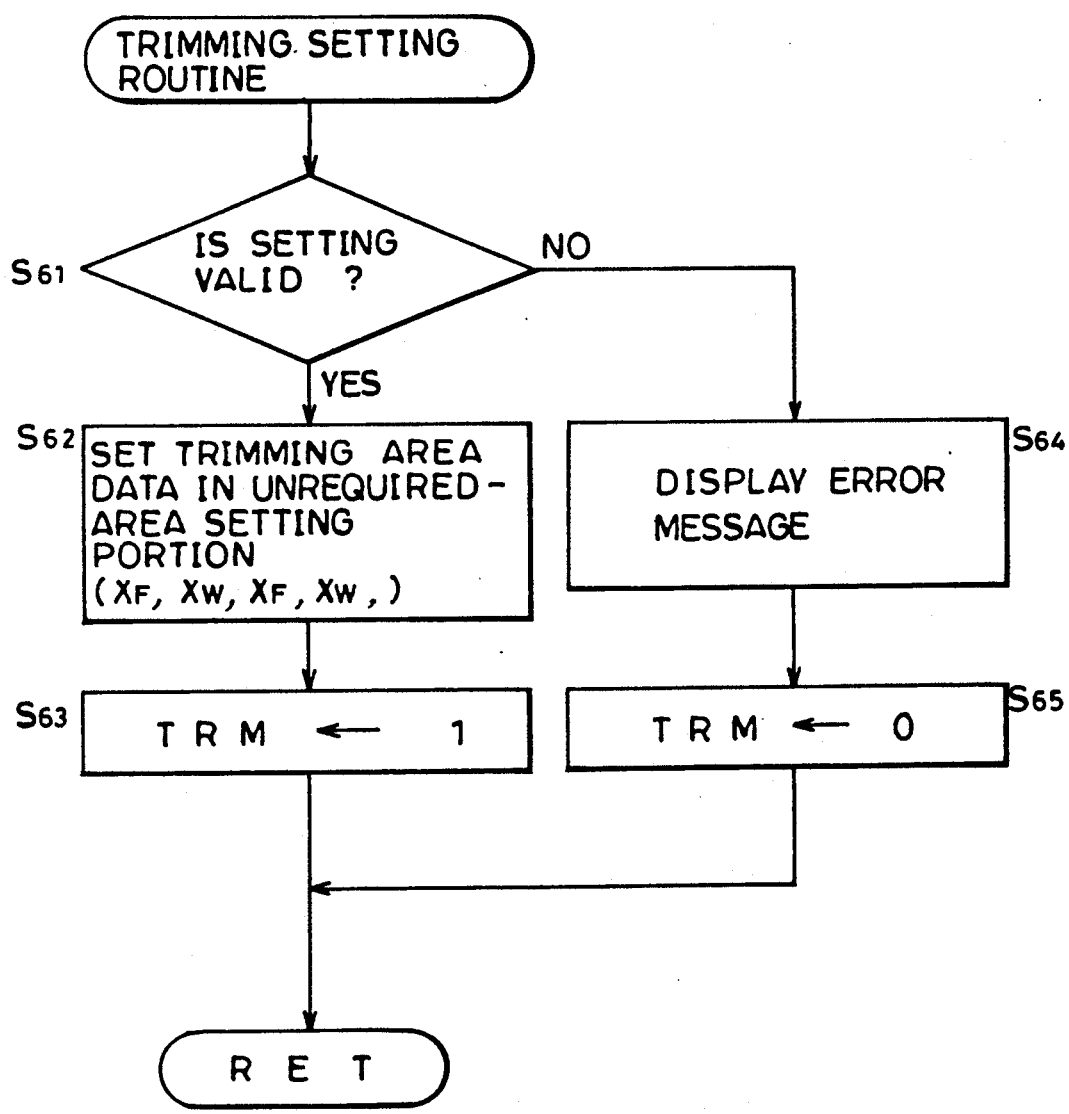
FIG. 15 is a flow chart of "trimming setting routine" of FIG. 13.
Figure 16:
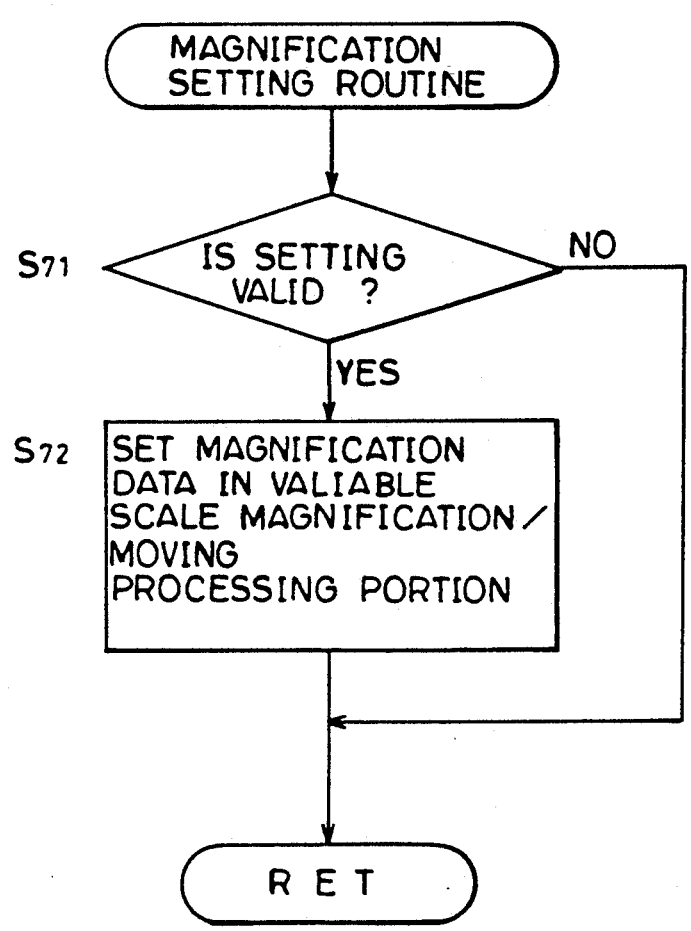
FIG. 16 is a flow chart of "magnification setting routine" of FIG. 13.
Figure 17:
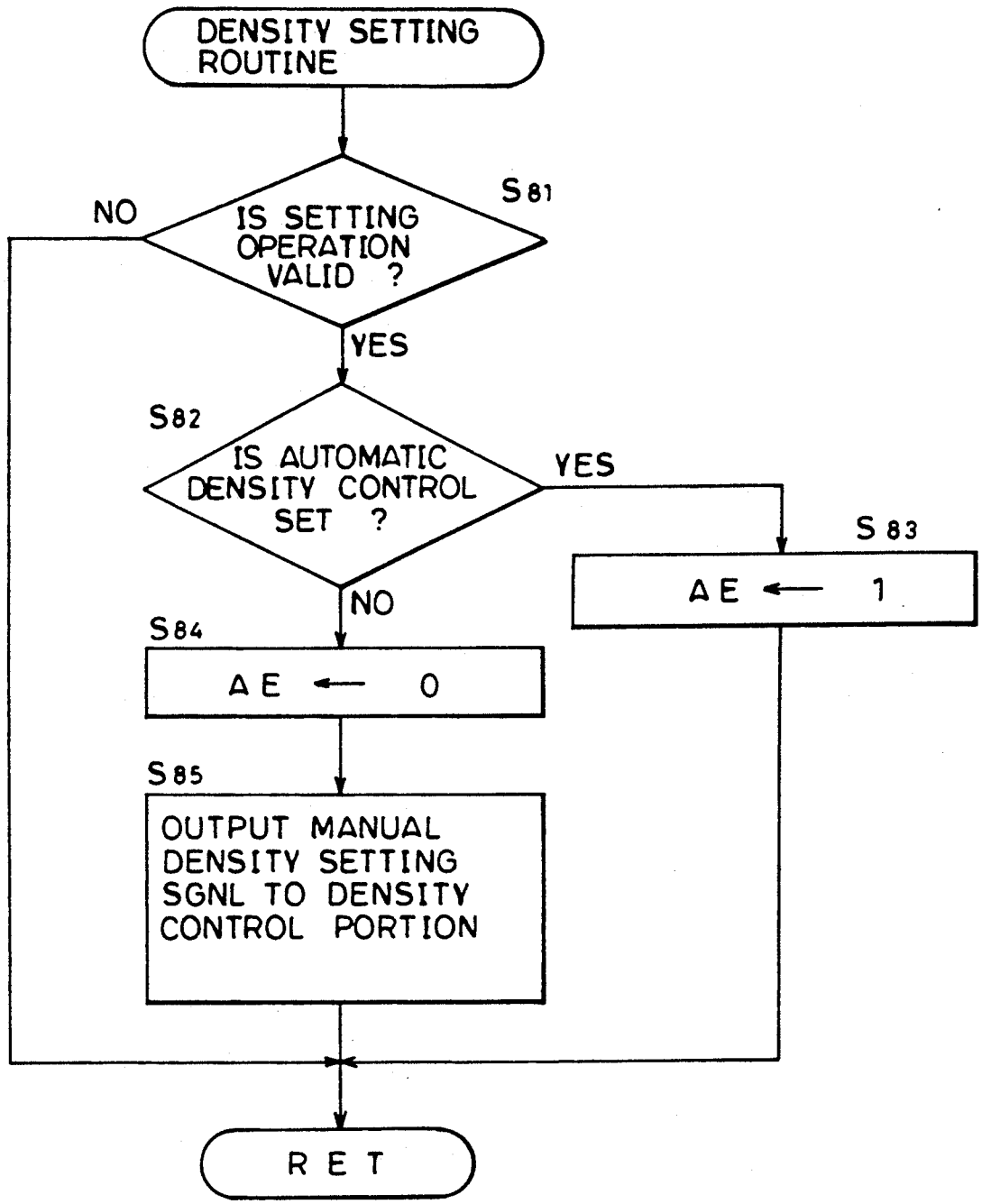
FIG. 17 is a flow chart of "mode setting routine" of FIG. 13.
Figure 18:
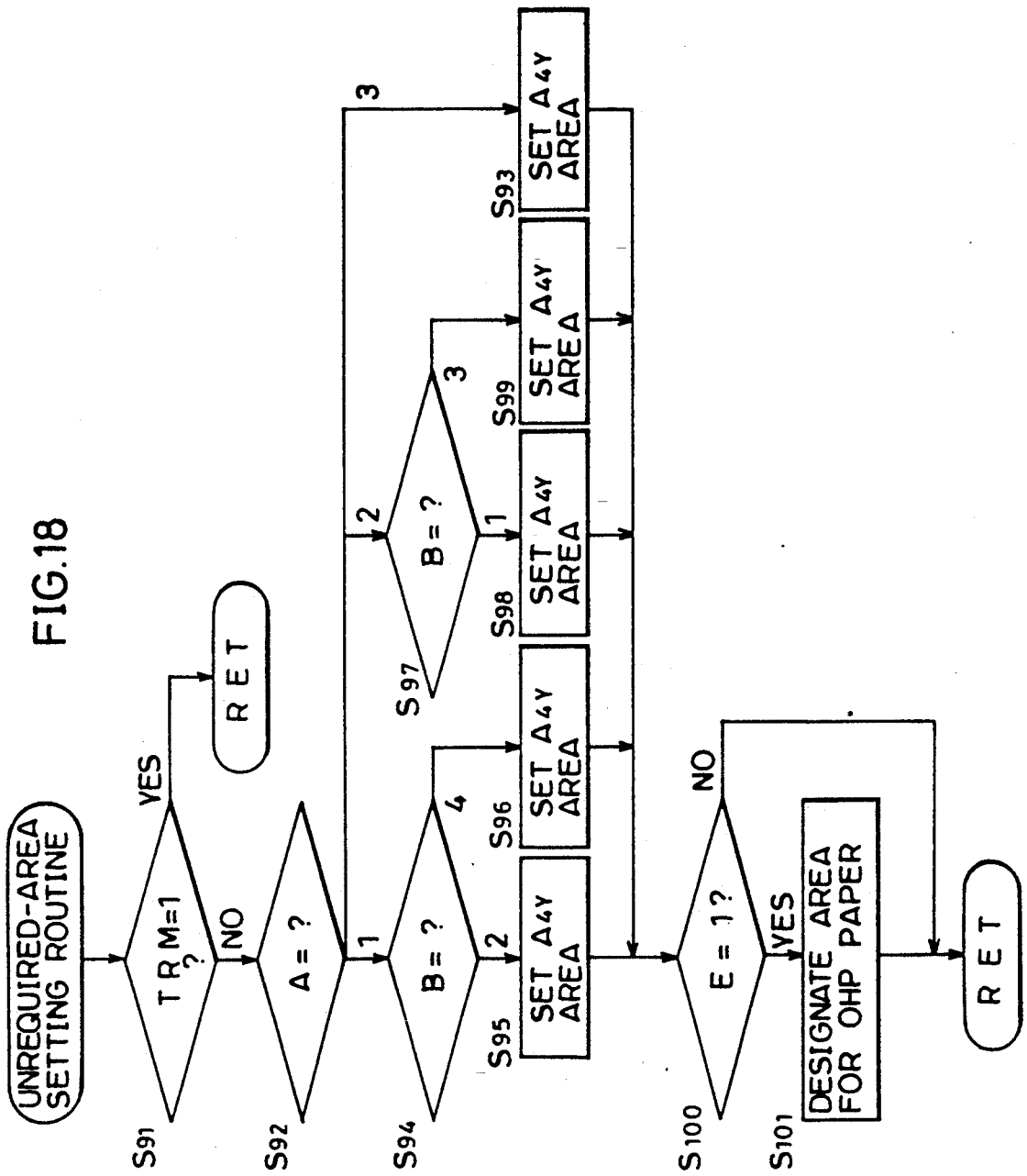
FIG. 18 is a flow chart of "unrequited-area setting routine" of FIG. 13.
Figure 19:
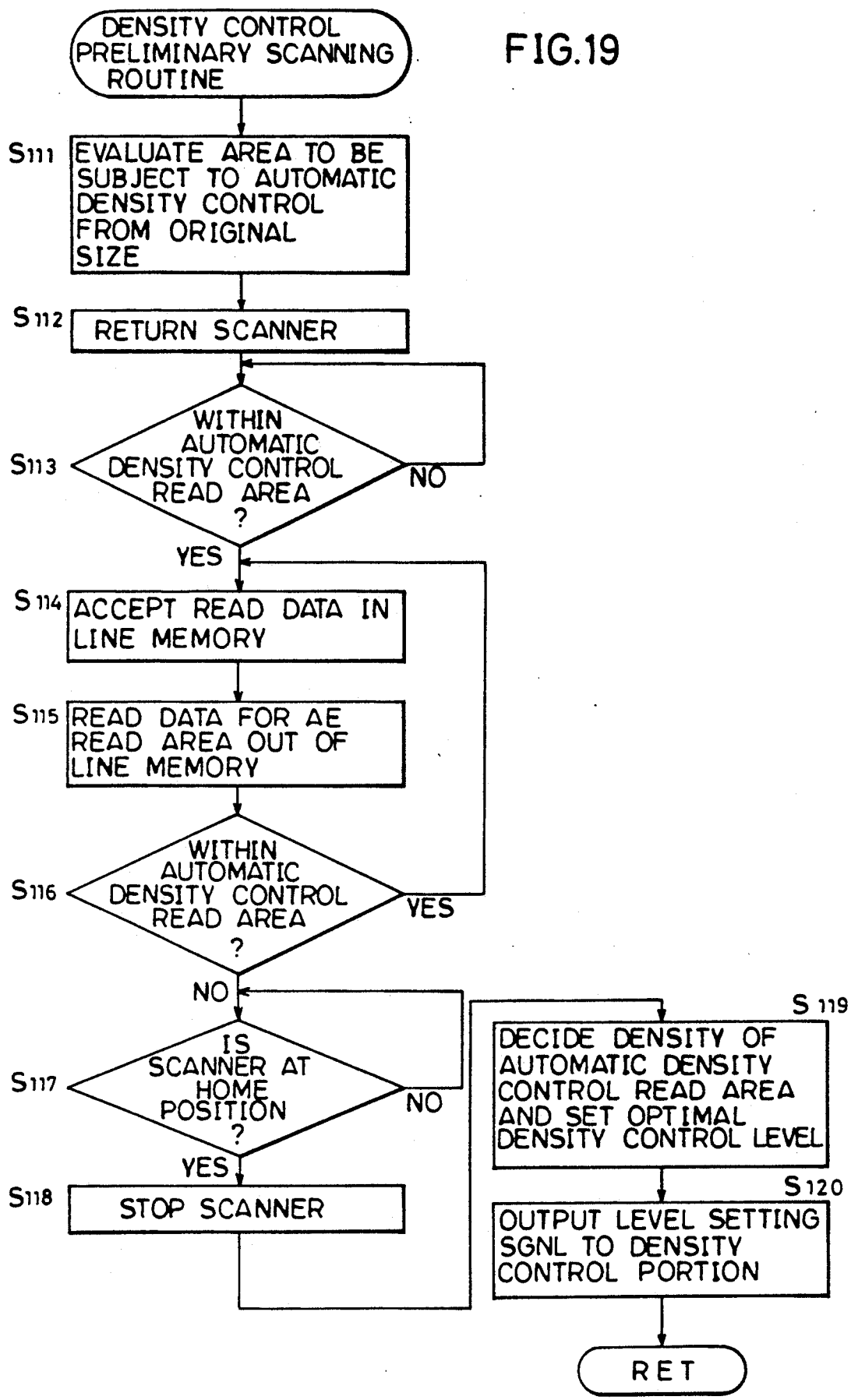
FIG. 19 is a flow chart of "density control preliminary scanning routine" of FIG. 13.

FIG. 13 is a flow chart showing a main program of the operation of the copier of this embodiment; FIG. 14 is a flow chart of "reading/printing routine" called in the main program; FIG. 15 is a flow chart of "trimming setting routine"; FIG. 16 is a flow chart of "magnification setting routine"; FIG. 17 is a flow chart of "density setting routine"; FIG. 18 is a flow chart of "unrequired-area setting routine"; and FIG. 19 is a flow chart of "density control preliminary scanning routine".

The routine shown in FIGS. 13 through 19 indicates the main program of the operation of the copier of this embodiment and selects predetermined modes by keying operation.

First, when power is supplied, the microcomputer starts this routine. Initialization is carried out in step S1, and in step S2, it is confirmed that there is no trouble occurring in the central controller 50, operation panel portion 60, editor portion 70, image reader portion 80 or printing portion 90, so that the microcomputer waits until a predetermined warm up time passes in step S5. When it is determined that any troubles occur in step S2, the troubles are displayed on the liquid crystal display portion 66. In step S4, it is determined whether or not a reset is made by eliminating the troubles. When it is determined that the reset is made, the routine returns to step S1.

When it is confirmed that the warm up time has passed in step S5, a decision is made as to whether or not the keying operation is carried out in the operation panel portion 60 or in the editor portion 70 in step S6. In case that the keying operation is carried out, it is decided which kind of keys is operated in step S7. In a case that the operated key is a print key, the "reading/printing routine" is called in step S8. The "trimming setting routine" is called in step S9 in the case of an editor key. The "magnification setting routine" is called in step S10 in the case of a zoom key. The "density setting routine" is called in step S11 in the case of a density key.

When the "reading/printing routine" is called by the operation of the print key, a program shown in the flow chart of FIG. 14 is executed.

This routine is, as copier, to read an image of the original and print data of the read image.

It is decided whether or not automatic original size detection mode is selected in step S21. When the automatic original size detection mode is selected, it is decided whether or not a trimming is designated in step S22, that is, a flag TRM is "1" or not. When the trimming is designated in step S22, it is decided whether or not a flag AE indicating automatic density control mode is "1" in step S23. When the microcomputer is not in the automatic density control mode, it reads an image of the original and prints the read image in the printing portion in accordance with the image data read in step S32, and thereafter leaves this routine. When the microcomputer is in the automatic density control mode, it moves the scanner 1 to the rear end of the original in step S24 and calls the "density control preliminary scanning routine" for carrying out automatic density control in step S25. After performing the preliminary scanning of automatic density control, the microcomputer reads an image of the original and prints the read image in the printing portion in accordance with the image data read in step S32, and thereafter leaves this routine. That is, when the trimming is designated, the microcomputer enters the decision of the automatic density control mode without calling "original size detecting routine" in step S26.

When the trimming is not designated in step S22, the "original size detecting routine" which will be described later is called to be executed in step S26. Looking at a flag A and a flag B in step S27, when either the flag A or B is not "0", namely, when original size detection is satisfactorily carried out, the microcomputer calls the "unrequired-area setting routine" to carry out an unrequired-area setting in step S28. Then, it is decided whether a flag AE indicating the automatic density control mode is "1" in step S29. When the microcomputer is not in the automatic density control mode, it decides whether the scanner 1 is at home position at step S30. When the scanner 1 is not at the home position, the microcomputer causes the scanner 1 to return in step S31, reads an image of the original in step S32 and prints the read image in the printing portion in accordance with the image data read, and thereafter leaves this routine.

When the flag AE indicating the automatic density control mode is "1", and the microcomputer is in the automatic density control mode in step S29, the microcomputer decides whether the scanner 1 is at the rear end of the original in step S33. When the scanner 1 is not at the rear end of the original, the microcomputer moves the scanner 1 to the rear end of the original in step S34 and calls the "density control preliminary scanning routine" to carry out the automatic density control preliminary scanning in step S35. In step S32, the microcomputer reads an image of the original and prints the read image in the printing portion in accordance with the image data read, and thereafter leaves this routine.

Looking at the flags A and B in step S27, when either the flag A or B is "0", namely, when original size detection is not satisfactorily carried out, the microcomputer decides whether a main scanning error occurs with a flag C being "1" and a flag B being "0" in step S36 and whether a subscanning error occurs with the flag C being "0" and the flag D being "1" in step S37. When there is any error, the microcomputer displays the fact that the size detection is impossible on the liquid crystal display portion 66 in step S38 and then leaves this routine. When it is decided that there is neither main scanning error in step S36 nor subscanning error in step S37, the microcomputer displays the fact that the original of deformed size is detected on the liquid crystal display portion 66 in step S39 and enters a processing in step S40.

Next, when the microcomputer decides that the automatic original size detecting mode is not selected in step S21, it demands keying of the original size in step S40. When the keying is confirmed in step S41, the microcomputer decides the keyed designated size of the original in step S42. When the designated size from step S43 to step S47 varies as follow, the flag A or B is set as shown below:

A3T, flag A←1, flag B←4;
A4Y (which denotes that the elongated direction of A4-size paper is along the subscanning direction), flag A←1, flag B←2;
A4T, flag A←2, flag B←3;
A5Y, flag A←2, flag B←1; and
A5T, flag A←3, flag B←2.

Then, the microcomputer demands keying of the type of the original whether the original is plain paper or OHP paper in step S48. When the keying is confirmed in step S49, it decides the keyed type of the original in step S50, and sets a flag E to "1" in step S51 in the case of OHP paper and to "0" in step S52 in the case of plain paper, thereafter returning to the routine starting from step S28.

The flow chart of "trimming setting routine" will now be described.

In this routine, the editor 70 selects a predetermined area which is to be copied.

In step S61, it is decided whether a setting made by the editor 70 is valid or not according to a setting decision made by the editor 70, for example, a setting decision as to whether a setting procedure is correct, or whether an area is not zero. When the setting is valid, data of a trimming area (XF, XW, YF, YW) is set at the unrequired-area setting portion in step S62. In step S63, the microcomputer sets "1" to the flag TRM so as to store an instruction that trimming is to be carried out, and then leaves this routine. When the setting made by the editor 70 is invalid, the microcomputer displays an error massage on the liquid crystal display portion 76 in step S64 and sets "0" to the flag TRM so as to store the fact that the trimming setting is not carried out in step S65, thereafter leaving this routine.

The flow chart of "magnification setting routine" will now be described.

This routine is to set a magnification of a predetermined object to be copied.

In step S71, it is decided whether a magnification setting is valid, for example, a magnification is within a range of a predetermined designated paper, which can be copied. When this setting is invalid, the microcomputer leaves this routine. When this setting is valid, the microcomputer sets magnification data in the magnification/moving processing portion in step S72 and then leaves this routine.

The flow chart of "density setting routine" will now be described.

This routine is to set a density of a predetermined object to be copied by sampling detection.

It is decided whether a density setting operation is correct in step S81. When this operation is invalid, the microcomputer leaves this routine. When the operation is valid, it is decided whether an automatic density control key is operated in step S82. When the automatic density control key is operated, the microcomputer sets a flag AE, which stores the fact that the automatic density control mode is selected, to "1" and leaves this routine. When it is decided that the automatic density control key is not operated in step S82, a flag AE, which stores the fact that the automatic density control mode is not selected, is set to "0". The microcomputer outputs a density setting signal which is manually designated for the density control portion in step S85 and leaves this routine.

The flow chart of "unrequired-area setting routine" will now be described.

In this routine, only an area of predetermined original size is an object to be copied and/or detected in density, and hence only this region is determined.

In step S91, it is decided whether a trimming is set from "1" of a flag TRM. When a trimming designation is selected, since the trimming removes unrequited areas, the microcomputer leaves this routine. When trimming is not set, the value of a flag A is decided in step S92. When the flag A=3, an area of A5T is set as the size of the original in step S93. When the flag A=1, a value of a flag B is decided in step S94. When the flag B=2, an area of A4Y is set as the original size in step S95. When the flag B=4, an area of A3T is set as the original size in step S96. When the flag A=2, the value of the flag B is decided in step S97. If the flag B=1, an area of A5Y is set as the original size in step S98. If the flag B=3, an area of A4T is set as the original size in step S99. Next, it is decided whether a flag E indicating that OHP is selected is "1" in step S100. When the OHP paper is selected, the microcomputer carries out designation of an area for the OHP paper in step S101. That is, in case of an original of OHP paper, as an area for preventing the L-shaped area 8C from being read as black, in reading scanning, a 5 mm width of the L-shaped area 8C is processed to be white. Thereafter the microcomputer leaves this routine.

The flow chart of "density control preliminary scanning routine" will now be described.

In this routine, density data is detected by sampling only an area within a predetermined original size or an area designated as a trimming area.

In step S111, the microcomputer calculates a sampling area for reading density data to be subject to automatic density control, from the original size which is automatically read or manually set or from the data for designating a trimming area, which is set in step S9. The microcomputer allows the scanner 1 to return in step S112. That is, the detection operation of the original size which has been carried out by forward scanning is converted into a backward scanning operation by shifting the moving direction of the scanner 1. Then, the microcomputer decides in step S113 whether it enters the sampling area calculated in step S111, for reading the density data to be subject to automatic density control. When it enters the sampling area, the microcomputer accepts read data in the line memory 830 in step S114 and then reads out of the line memory 830 the sampling data in the reading area to be subject to automatic density control in step S115. The operation from step S114 to step S115 continues until the read data falls out of the reading area calculated in step S111, in step S116. When it is decided that the read data falls out of the reading area to be subject to automatic density control in step S116, it is decided whether the scanner 1 is at home position in step S117. When the scanner 1 reaches home position, the microcomputer stops the scanner 1 in step S118 and determines, in step S119, the density read out of the line memory portion 830 in step S115 so as to evaluate an optimal density control level and output the same to the density control portion 820 in step S120.

A description will now be given on an image reading operation of the image reading apparatus according to the first embodiment of the present invention when applied to the copier with reference to flow charts of FIGS. 20A and 20B through 24.

Figure 20A:
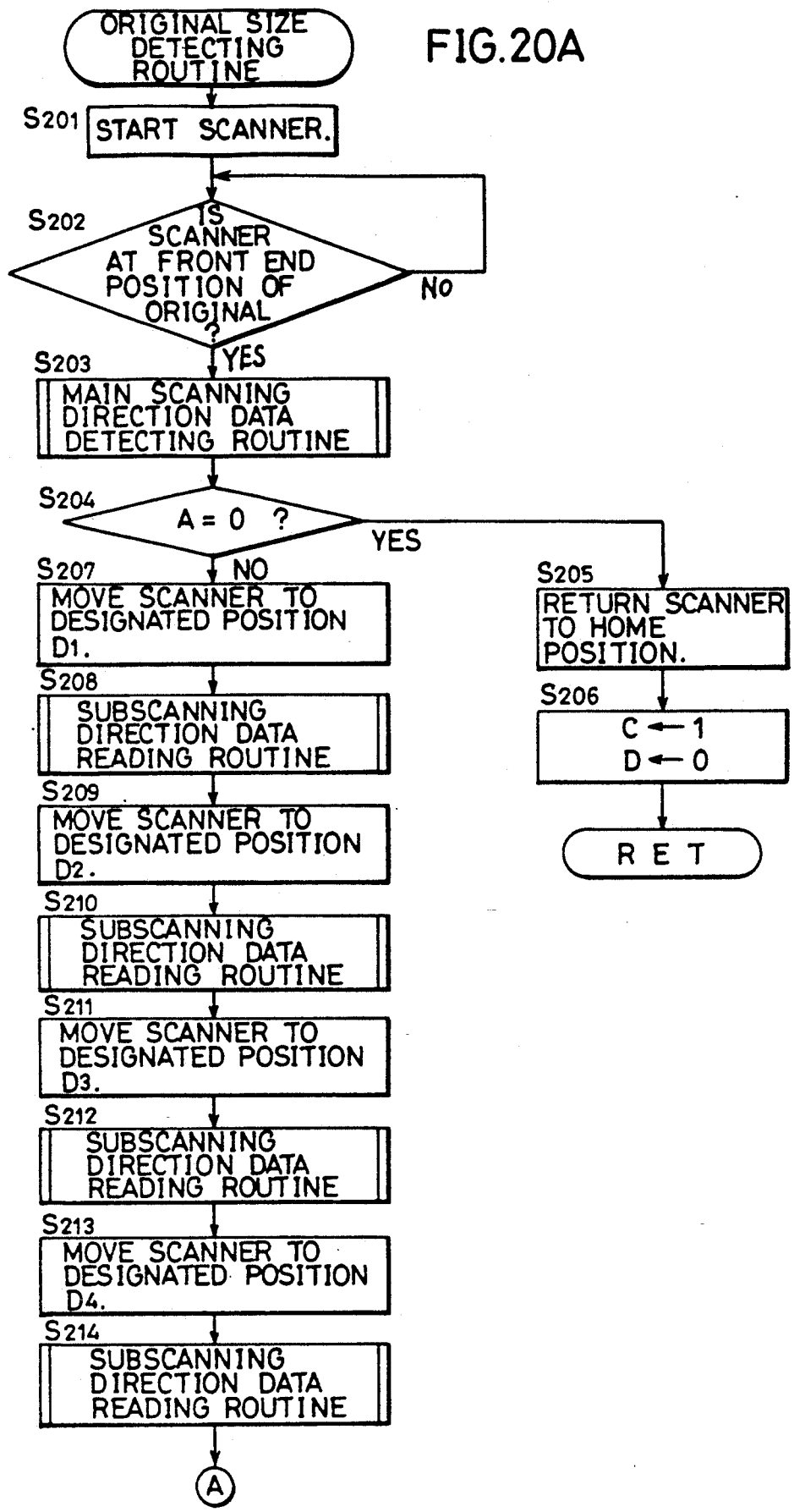
FIGS. 20A and 20B are flow charts of "original size detecting routine" corresponding to the main program of the image reading apparatus employed in the copier of the first embodiment of the present invention.
Figure 20B:
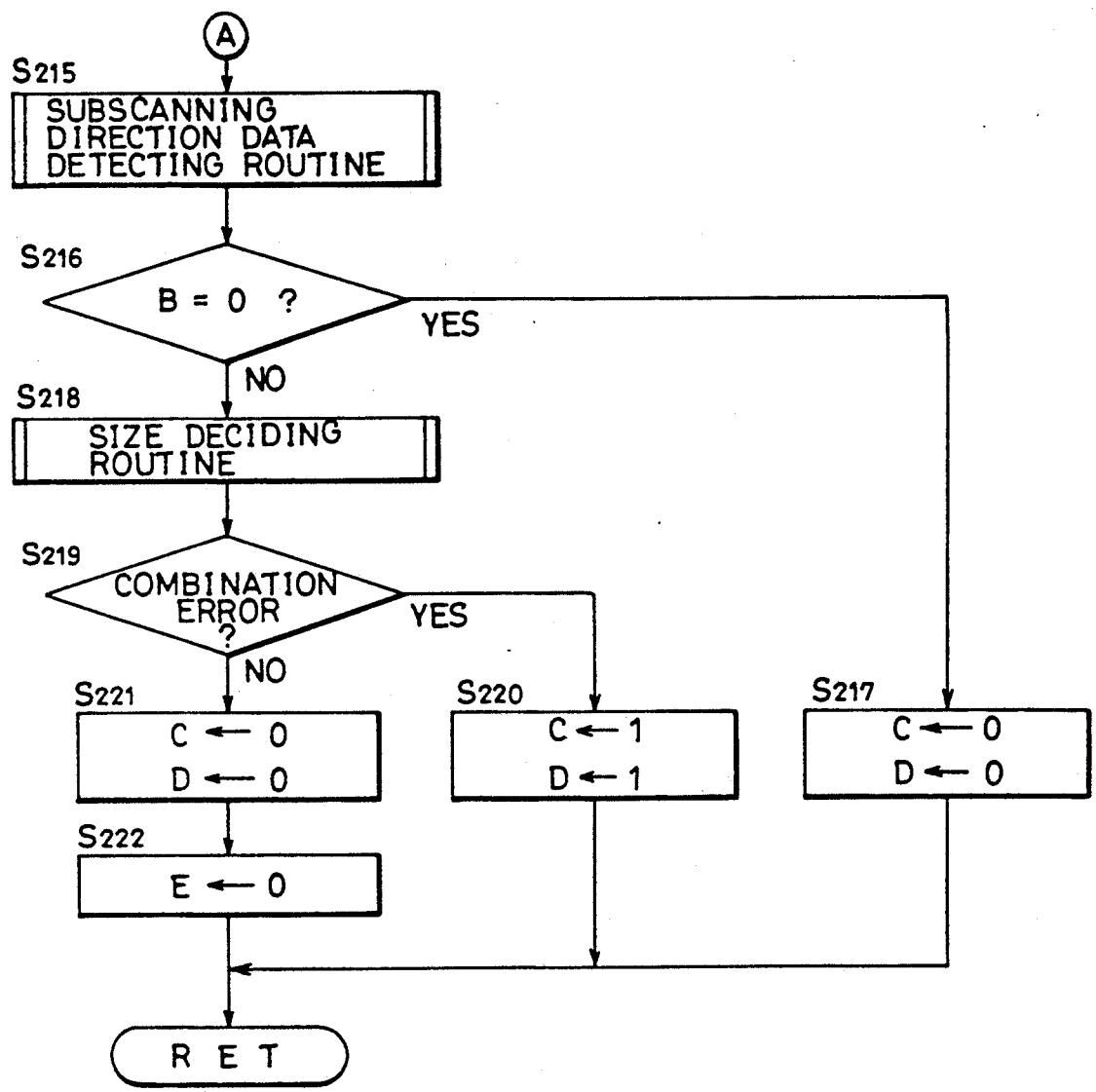
Figure 21:
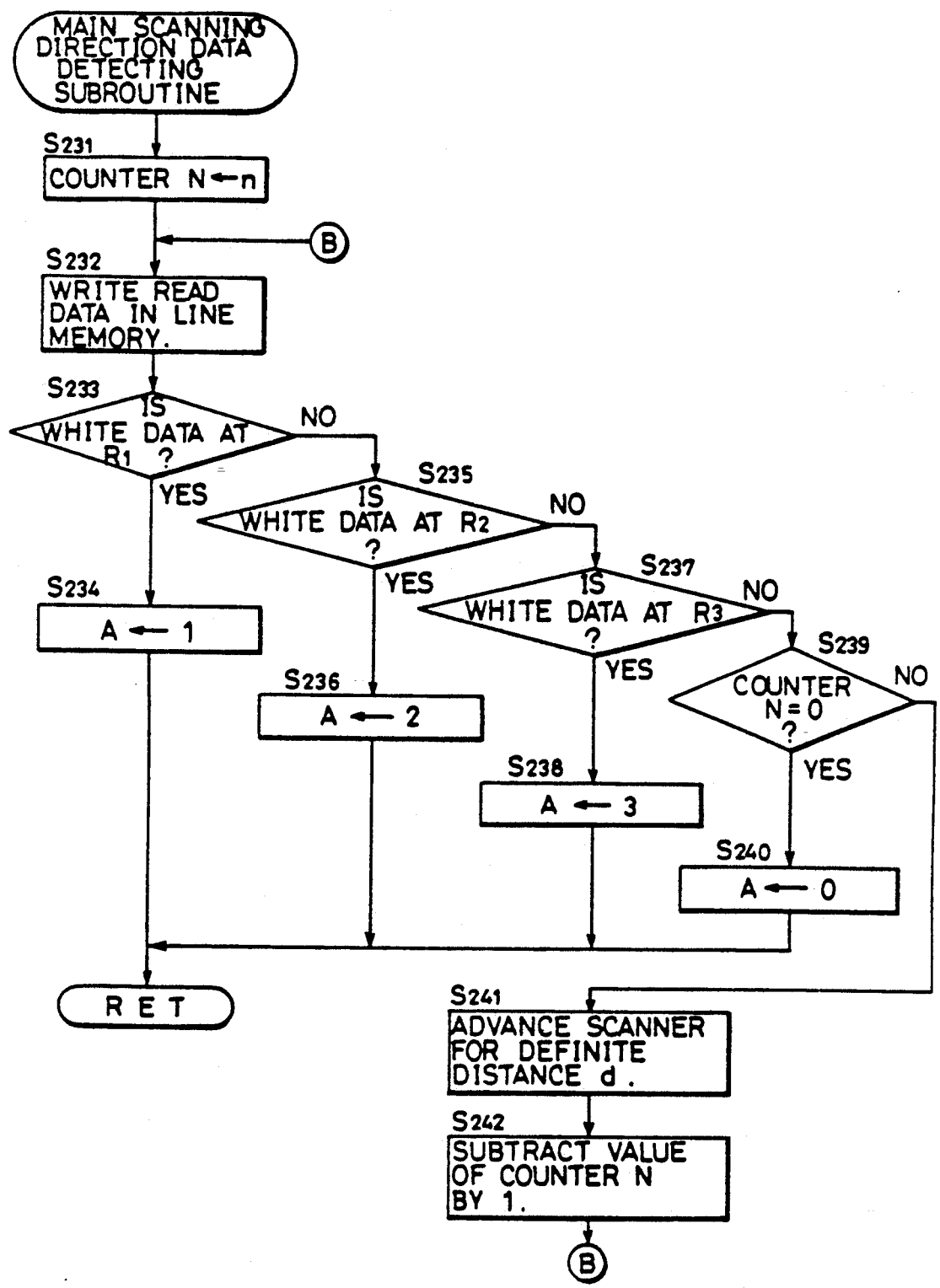
FIG. 21 is a flow chart of "main scanning direction data detecting subroutine" of FIG. 20A.
Figure 22:
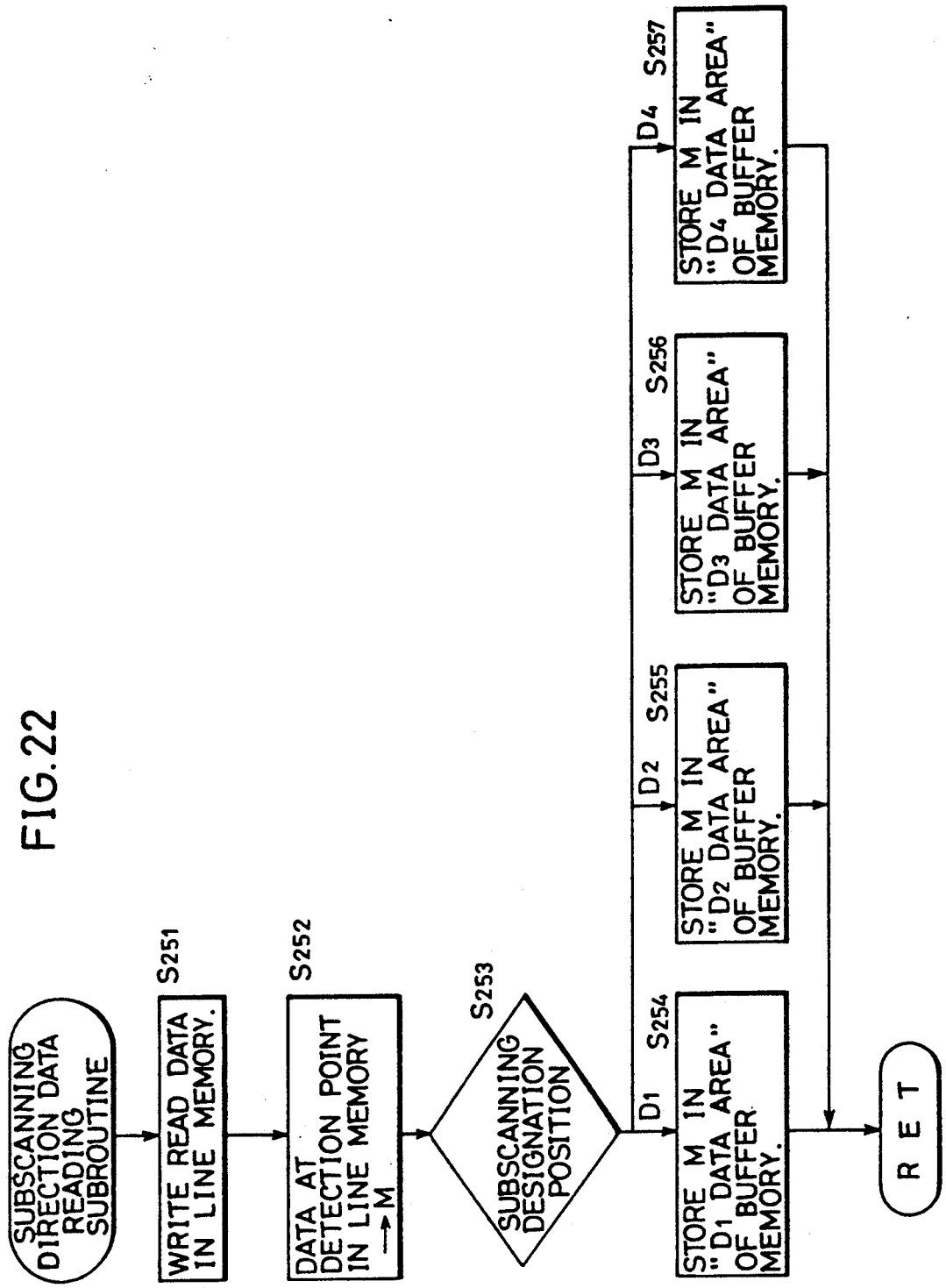
FIG. 22 is a flow chart of "subscanning direction data reading subroutine" of FIG. 20A.
Figure 23:
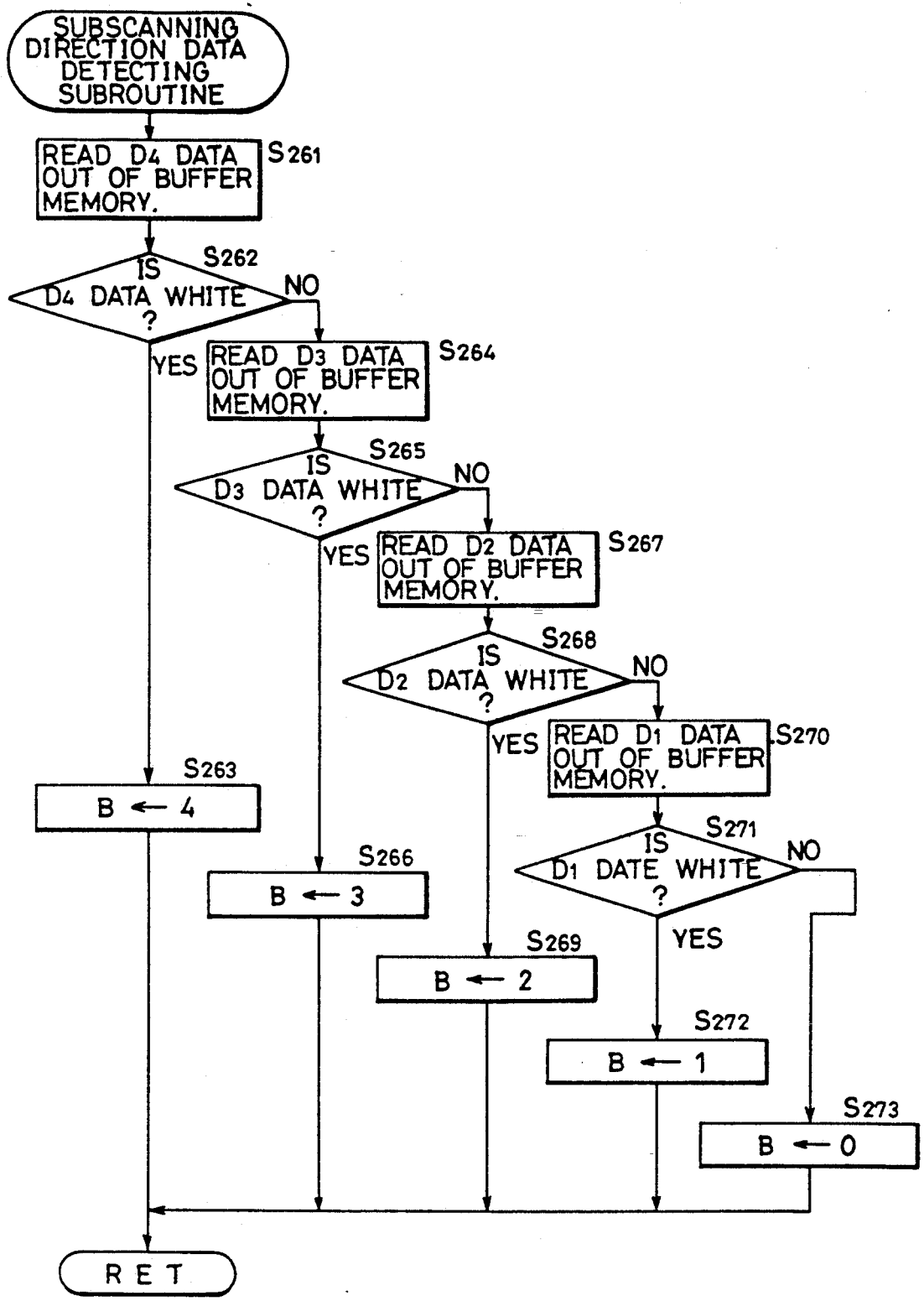
FIG. 23 is a flow chart of "subscanning direction data detecting subroutine" of FIG. 20B.
Figure 24:
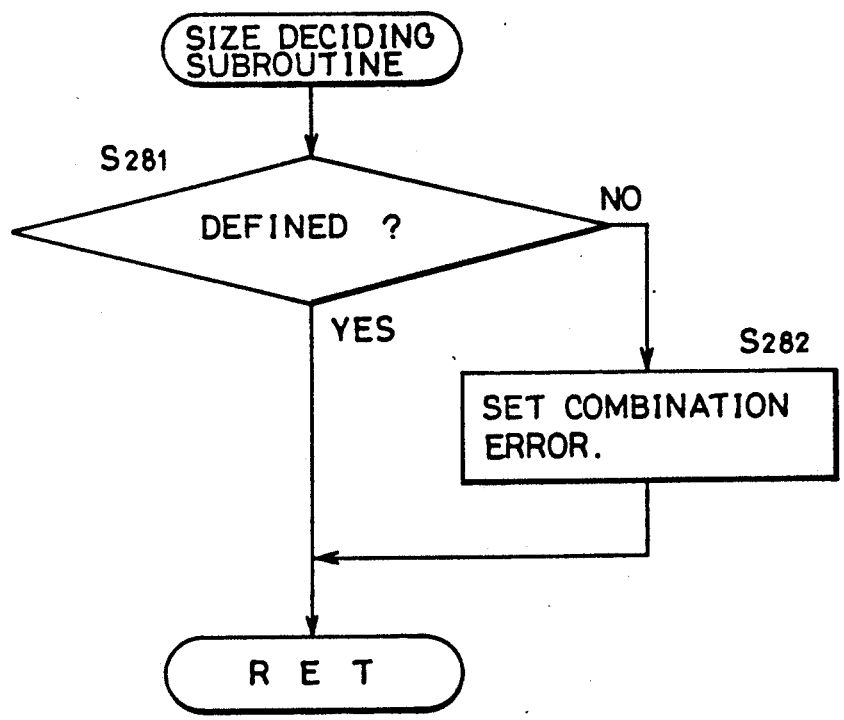
FIG. 24 is a flow chart of "size deciding subroutine" of FIG. 20B.

FIGS. 20A and 20B are flow charts of "original size detection routine" corresponding to a main program of the image reading apparatus according to the first embodiment of the present invention when employed in the copier; FIG. 21 is a flow chart of "a subroutine for detecting data in the main scanning direction" used in the main program; FIG. 22 is a flow chart of "a subroutine for reading data in the subscanning direction"; FIG. 23 is a flow chart of "a subroutine for detecting data in the subscanning direction"; and FIG. 24 is a flow chart of "a subroutine for deciding the size of the original".

The flow chart of the "original size detection routine" will first be described.

In this routine, the scanner carries out a forward scanning for detecting image data at positions designated in the main scanning direction and in the subscanning direction. When the original size in the main scanning direction or subscanning direction can be detected or not, the detected original size is stored in a flag.

When this routine is called in step S26, the microcomputer causes the scanner 1 to start scanning in the forward direction which goes away from the original reference position S in step S201, and decides whether the scanner 1 is at the original reference position S, namely at the end position of the original in step S202. When the scanner 1 reaches the original reference position S, the microcomputer calls the "main scanning direction data detection routine". Then, it decides in step S204 whether a flag A indicating that nothing is detected in the main scanning direction is "0". When none is detected in the main scanning direction, the microcomputer returns the scanner 1 to home position in step S205. It then sets a flag C indicating that the detection in the main scanning direction is impossible to "1" and a flag D to "0" in step S206, and thereafter leaves this routine.

When it is decided that the detection in the main scanning direction is possible in step S204, the scanner 1 is shifted to a designated position D1 which is evaluated from the normalization of paper in step S207. The microcomputer calls the "subscanning direction data reading subroutine" to read data in the subscanning direction in step S208. The microcomputer shifts the scanner 1 to a designated position D2 in step S209 and calls the "subscanning direction data reading subroutine" in step S210. It then shifts the scanner 1 to a designated position D3 in step S211 and calls the "subscanning direction data reading subroutine" in step S212. Further, it shifts the scanner 1 to a designated position D4 in step S213 to call the "subscanning direction data reading subroutine" and read the data in the subscanning direction in step S214.

The microcomputer subsequently calls the "subscanning direction data detecting subroutine" in step S215 to replace the original size in the subscanning direction with a flag. It is decided whether a flag B indicating that the number of detecting points of the original size in the subscanning direction is zero is "0" in step S216. When the flag B is "0", the microcomputer sets the flag C indicating that the detection of the original size in the subscanning direction is impossible to "0" and the flag D to "1" in step S217, and then leaves this routine. When the detecting points of the original size in the subscanning direction exist in step S216, the "original size deciding subroutine" is called in step S218 to be checked whether the detecting points match a predetermined original size of a table storing a normalized original size. It is decided whether the result of checking is a combination error in step S219. In the case of combination error, the microcomputer sets the flag C to "1"

and the flag D to "1" so as to store the fact that the original size cannot be defined, in step S220, and then leaves this routine. In step S221, the microcomputer sets the flag C to "0" and the flag D to "0" so as to store the fact that the original size can be defined. In step S222, it sets the flag E to "0" so as to store the fact that the original size is normal size, thereafter leaving this routine.

The flow chart of the "main scanning direction data detection routine" will now be described.

In this routine, it is decided whether image data at designated positions R1, R2 and R3 in the main scanning direction by forward scanning are "white" data, so as to store the position of "white" data in a flag.

In step S231, a detecting frequency n of detecting the width of the L-shaped area plural times is set in a counter A. This detecting frequency n is evaluated by dividing the width of the L-shaped area in the subscanning direction by a distance d along which the scanner moves in the subscanning direction. Read data is written in the line memory 830 in step S232, and it is decided whether the white data is at the designated position R1 evaluated from the normalization of paper by shifting the scanner 1 in step S233. When the white data is at the designated position R1, the flag A is set to "1" in step S234. It is decided whether the white data is at the designated position R2 in step S235. When the white date is at the designated position R2, the flag A is set to "2" in step S236. It is decided whether the white data is at the designated position R3 in step S237. When the white date is at the designated position R3, the flag A is set to "3" in step S238, so that the microcomputer leaves this routine.

When it is decided that there is no white data along a distance between the designated positions R1 and R3 in steps S233, S235 and S237, it is decided whether the counter A is "0" in step S238. When the counter A is not "0", the scanner 1 is moved by the subscanning direction scanner shifting distance d which is equal to an interval for scanning in the main scanning direction in step S241. Then, the value of the counter A is subtracted by "1" in step S242 so as to repeat the routine starting from step S232. When it is decided that the counter A is not "0" in step S239, the microcomputer sets "0" to the flag A in step S240 and then leaves this routine.

The flow chart of the "subscanning direction data reading subroutine" will now be described.

In this routine, image data at designated positions D1, D2, D3 and D4 in the subscanning direction by forward scanning are stored in a memory M.

In step S251, read data is written in the line memory 830, and data indicating the width of the L-shaped area in the main canning direction is written in the memory M from the line memory 830 in step S252. A designated position in the subscanning direction is decided in step S253. In case of the designated position D1 in the subscanning direction, the microcomputer stores the data written in the memory M in a designated area of the designated position D1 of a buffer memory in step S254, and thereafter leaves this routine. In the case of the designated position D2 in the subscanning direction, the microcomputer stores the data written in the memory M in a designated area of the designated position D2 of the buffer memory in step S255, and thereafter leaves this routine. In the case of the designated positions D3 and D4 in the subscanning direction, the microcomputer similarly stores the data written in the memory M in designated areas of the designated positions D3 and D4 of the buffer memory in steps S256 and S257, and thereafter leaves this routine.

The flow chart of the "subscanning direction data detection subroutine" will now be described.

In this routine, it is decided whether the image data at the designated positions D1, D2, D3 and D4 in the subscanning direction are "white" data, so as to store the position of "white" data in a flag.

The data at a predetermined designated position D4 is read out of the buffer memory in step S261 so as to be decided whether the designated position D4 is white data in step S262. When the read data is white data, "4" is set to a flag B in step S263. When the data at the designated position D4 is not white data, data at a predetermined designated position D3 is read out of the buffer memory in step S264. It is decided whether the data at the designated position D3 is white data in step S265. When the read data is white data, "3" is set to the flag B in step S266, so that the microcomputer leaves this routine. When the data at the designated position D3 is not white data, data at a predetermined designated position D2 is read out of the buffer memory in step S267. The microcomputer decides whether the data at the designated position D2 is white data in step S268. When the read data is white data, it sets "2" to the flag B in step S269 and then leaves this routine. Similarly, when the data at the designated position D2 is not white data, data at a predetermined designated position D1 is read out of the buffer memory in step S270. It is decided whether the data at the designated position D1 is white data in step S271. When the read is white data, the microcomputer sets "1" to the flag B in step S272 so as to leave this routine. When deciding that the data at the designated position D1 is not white data in step S271, the microcomputer sets "0" to the flag B indicating that the detection in the subscanning direction cannot be done in step S273, and then leaves this routine.

The flow chart of the "original size deciding subroutine" will now be described.

In this routine, it is decided whether or not the original size detected is normal size, and if the original size is not normal size with respect to the detection positions in the main scanning and subscanning directions, an output of a combination error is set.

Referring to FIG. 27, in step S281, with respect to a relationship between the flag A and flag B for storing the normalized original size and the normalized original size, it is checked whether or not the table shown in FIG. 27 matches the original size detected this time. If there is any match therebetween, the microcomputer immediately leaves this routine. If there is no match, the microcomputer sets a combination error in step S282 and then leaves this routine.

In the image reading apparatus according to the first embodiment of the present invention applied to the copier, the original pressing cover 8 is provided over the platen 9 made of a transparent member on which the original P of plain paper, the transparent original POHP or the like is placed. The roughly overall surface of the original pressing cover 8 corresponding to the top surface of the platen 9 is formed in such a color as readable as white by a photoelectric conversion element formed of the image sensor 13 or the like. The L-shaped area 8C is formed in the roughly overall surface of the cover 8 such that a crossing point of the L-shaped area readable as black by the photoelectric conversion element is positioned at a point corresponding to the original reference position S of the platen 9. The original placed between the L-shaped area 8C and the top surface of the platen 9 is detected by detecting means comprising the photoelectric conversion element formed such as of the image sensor 13.

Therefore, the detection means for detecting the original placed between the top surface of the platen 9 and the L-shaped area 8C formed on the original pressing cover 8 for pressing the original can decide the size of the original such as the original P of plain paper or the transparent original POHP of OHP paper and the like, placed on the platen 9. This is possible because determination of the original reference position S makes it possible to detect a state in which a range of the L-shaped area 8C readable as black varies in the main scanning direction 8CY and in the subscanning direction CX.

The L-shaped area 8C for detecting the original size in the above embodiment has its width, which is already known, provided in advance along the sides of the original. Therefore, it is possible to electrically process as white the range of the L-shaped area 8C readable as black by the detection means, and simultaneously remove noise around edges of the original. Further, it is possible to set the overall surface of the original pressing cover 8 facing to the original without regard to spectral distribution. Since the detected original size is not evaluated by calculation, processing speed thereof can be increased.

Further, the image reading apparatus of the first embodiment decides the original provided between the L-shaped area 8C and the top surface of the platen 9 made of a transparent member by a preliminary scanning for detecting the original size by the scanner 1. Thus, the preliminary scanning before an image reading scanning of the normal copying operation makes it possible to detect the size of the original only by an electrical processing without especially adding mechanical components for detecting the original size.

Moreover, in the image reading apparatus of the first embodiment, the placement of the L-shaped area 8C with respect to the platen 9 made of a transparent member is parallel to the main scanning direction 8CY and subscanning direction 8CX. This enables the length and/or width of the L-shaped area to be minimized with respect to the main scanning direction and subscanning direction, thereby facilitating determination of an erasing area of the L-shaped area.

In addition, in the image reading apparatus of the first embodiment, the placement of the L-shaped area 8C with respect to the platen 9 is in parallel to the main scanning and subscanning directions, and also the width of the area 8C from the end of the transparent member is set at approximately 5 mm, so that a blank space (margin) on the normal original serves as a space for reading the original size. Therefore, this configuration matches a general way of making margins on the original. And hence even if OHP paper is used as the original, or alternatively the L-shaped area 8C is electrically processed as white, it does not affect the content of the original. Although the width of the area 8C from the end of the transparent member is set at approximately 5 mm in the first embodiment, setting the width thereof at 10 mm or less does not cause any loss of information in the original, with regard to the way of making margins on the original in general.

As described in the foregoing, in the image reading apparatus of the first embodiment employed in the copier, the original pressing cover 8 is provided over the platen 9 made of a transparent member on which the original is placed. Further, the roughly overall surface of the original pressing cover 8 corresponding to the top surface of the platen 9 is formed in such a color as readable as white by the photoelectric conversion element formed such as of the image sensor 13. The L-shaped area 8C is formed in the roughly overall surface of the cover 8 such that the crossing point of the L-shaped area readable as black by the photoelectric conversion element is positioned at the point corresponding to the original reference position S of the platen 9. In association with the above described subject of the present invention, however, when viewed from the scanner 1 side of the platen 9, an area in the main scanning and subscanning directions, which is readable as black by the photoelectric conversion element, may exist on the original pressing cover 8 side. Thus, the L-shaped area of the first embodiment can be determined as an area extending in the main scanning and subscanning directions.

That is, the image reading apparatus of the present invention can comprise the original pressing cover 8 provided over the platen 9, the surface of which corresponding to the top surface of the platen 9 is determined as white that can be read by the photoelectric conversion element, and on the surface of which the crossing of the main scanning direction and subscanning direction that can be read as black by the photoelectric conversion element is positioned at the original reference position S of the platen 9, and comprise the detection means for detecting the original placed between the top surface of the transparent member and the area readable as black by the photoelectric conversion element. As a matter of course, this structure also can achieve the effect of the first embodiment.

In addition, the original pressing cover 8 included in the image reading apparatus of the embodiment of the present invention is provided over the platen 9 made of a transparent member on which the original P of plain paper, the transparent original POHP or the like is placed. The surface of the pressing cover 8 corresponding to the top surface of the platen 9 is determined as a white area and a black area which are readable by the photoelectric conversion element formed such as of the image sensor 13. One predetermined corner of the platen 9 is determined as the original reference position S. An area which is readable as a black area by the photoelectric conversion element is formed in parallel to the main scanning direction 8CY and subscanning direction 8CX, with a position corresponding to the original reference position S set as a reference. Further, optical detection means such as the scanner 1 included in the image reading apparatus detects reflected light in a portion of the area of the original pressing cover 8 readable as black by the photoelectric conversion element corresponding to a normal length of paper in the main scanning direction 8CY and subscanning direction 8CX, with the original reference position S of the platen 9 used as a starting point.

Therefore, detecting the reflected light in the above described portion corresponding to the normal length of paper in the main scanning and subscanning directions 8CY and 8CX in the "main scanning direction data detecting routine" and in the "subscanning direction data detecting subroutine" makes it possible to detect whether a predetermined original is normal size paper and also detect predetermined original size without calculation. Accordingly, during execution of the "main scanning direction data detecting routine" and "subscanning direction data detecting subroutine", it becomes possible to detect the original size having a normal length, which is most frequently used in general, without any calculations by detecting the presence of the original size having a predetermined normal length. That is, only detecting the presence or absence of the original placed at a predetermined position on the platen 9 enables the detection of the original size of normal size and thus enables the saving of calculation time for calculating the original size.

As described above, in the image reading apparatus of the first embodiment of the present invention, it is possible to determine the surface of the original pressing cover 8 corresponding to the top surface of the platen 9 as white and determine the black area for detecting the original as the surface which surrounds the white surface. Consequently, the black area in the original pressing cover 8 can be formed without being limited to L-shape, thereby enhancing degrees of freedom in design thereof.

Moreover, in the image reading apparatus of the first embodiment, it is possible to determine white and black, which can be read by the photoelectric conversion element, as a black frame which surrounds three sides or more of the white surface of the original pressing cover 8 facing to the platen 9. Thus, the black area in the original pressing cover 8 can be formed along three sides or four sides of the white surface without being limited to roughly L-shape. Therefore, the image reading apparatus can be designed as a structure including a detection function which is unnoticeable to the user.

Further, in the image reading apparatus of the first embodiment, detecting the original placed between the L-shaped area and the top surface of the transparent member by the detection means is carried out by the preliminary scanning before the copying operation by the scanner 1. However, since the detection by the scanner 1 in the first embodiment is to detect the presence of the original at a designated position, the detection means can be structured as shown in FIG. 28 showing another example of the optical detection means used in the image reading apparatus according to the first embodiment of the present invention.

Figure 28:
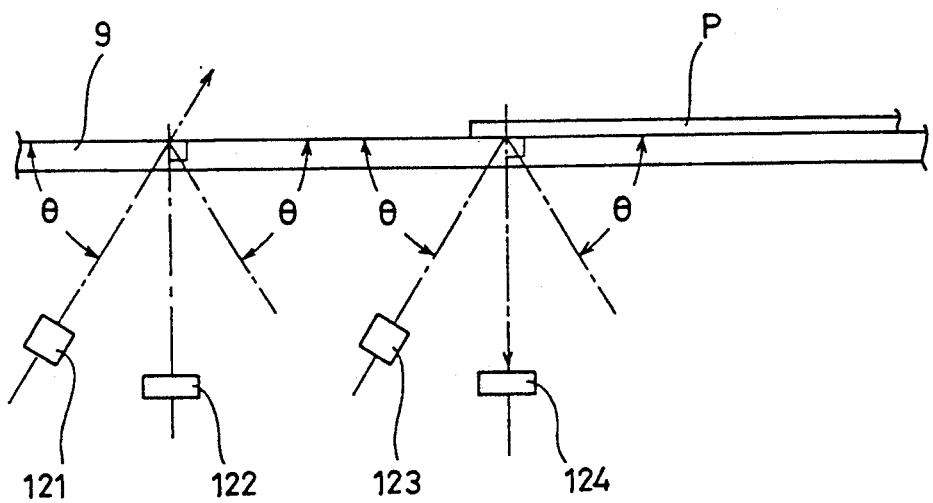
FIG. 28 is a diagram for describing another example of optical detection means employed in the image reading apparatus according to the first embodiment of the present invention.

As shown in FIG. 28, light emitting elements 121, 123 formed such as of LEDs direct light at an incident angle θ to the surface of the original placed on the top surface of the platen 9. Light receiving elements 122, 124 formed such as of phototransistors set the angle of incidence perpendicularly to the original surface and detect the presence of the original by random reflection at the original surface.

That is, when the original exists on the platen 9, the light receiving elements 122, 124 receive scattered light from the original. When the original does not exist on the platen 9, the emitted light is totally reflected at a reflection angle θ by an L-shaped area (not shown), that the light receiving elements 122, 124 receive no light.

The light emitting elements 121, 123 and the light receiving elements 122, 124 constitute a photocoupler.

For this kind of embodiment, even if the image reading apparatus of the present invention is employed in the copier, there is no need to carry out preliminary scanning. Opening and closing of the original pressing cover 8 makes it possible to immediately determine the placement of the original and thus eliminate useless time required for preliminary scanning.

The detection means shown in FIG. 28 constitutes a photocoupler formed of the light emitting elements 121, 123 and light receiving elements 122, 124, and allows light emitted from the light emitting elements 121, 123 to be directed directly to the original. Since the synthetic resin such as of OHP paper has a polarization function, providing a polarizing filter between the light emitting elements 121, 123 and light receiving elements 122, 124 enables more enhanced sensitivity in detecting OHP paper and the like.

Further, provision of the polarizing filter therebetween enables the photoelectric conversion element to determine the difference between the presence of the original and the L-shaped area, which is recognizable as the same color by the eye. Therefore, the difference between the presence of the original and the L-shaped area is not uniquely determined as "white", "black"- which is determined by the eye, but determined by the photoelectric conversion element for converting light into an electrical signal. This enhances degrees of freedom in design and also facilitates the detection of OHP paper.

While such a case has been described that the image reading apparatus of the first embodiment of the present invention is employed in the copier, the present invention is also applicable to an image processing apparatus in general such as an image scanner, a facsimile device and so on.

Moreover, while the case that the scanner in the copier is employed and the case that the photocoupler is employed have been described as the examples of detection means, optical detection means may be employed in implementing the present invention.

The second embodiment of the present invention will now be described. Since the descriptions of FIGS. 1A-1C through FIG. 19 and FIGS. 24-28 presented in the explanation the first embodiment are common with the second embodiment, a description thereof will not be repeated. The following description of the second embodiment will refer to those figures appropriately.

Figure 29:
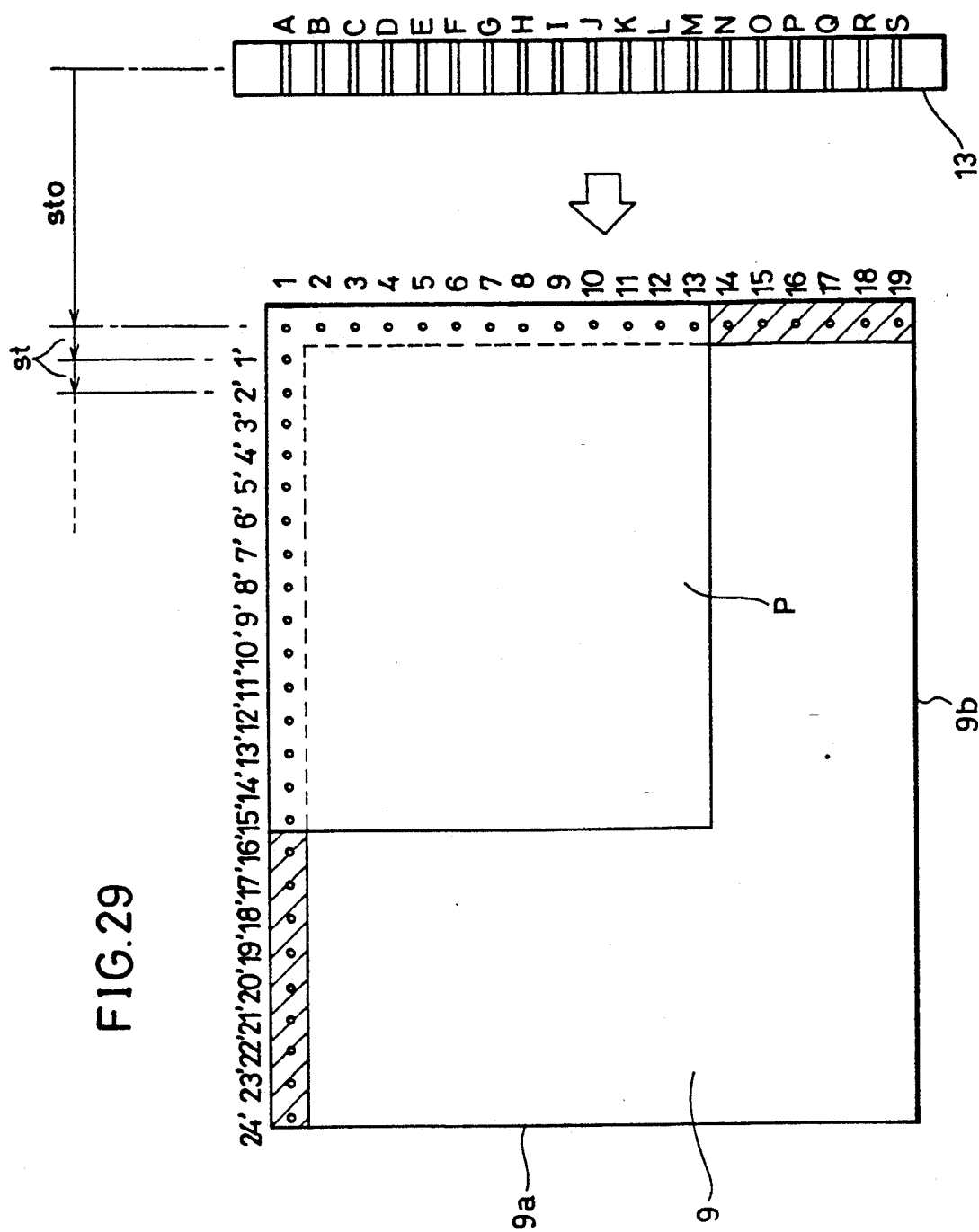
FIG. 29 is a diagram showing a position for detecting the length of an original according to a second embodiment of the present invention.
Figure 30:
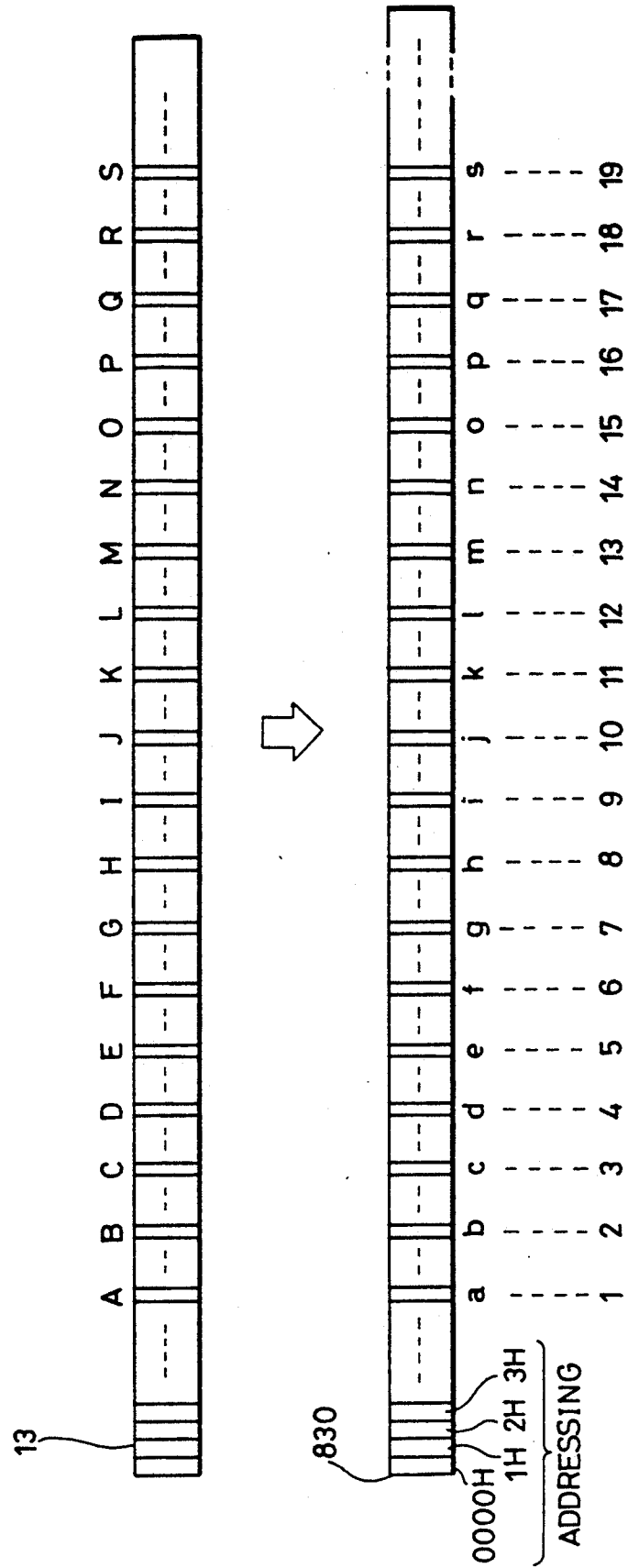
FIG. 30 is a diagram for describing an image sensor for detecting the original length detecting position of FIG. 29 and the content stored in a line memory.

FIG. 29 is a diagram for description showing a position for detecting the length of the original according to the second embodiment of the present invention; and FIG. 30 is a diagram for describing contents stored in a line memory and an image sensor for detecting the original length detecting position of FIG. 29.

As shown in FIG. 29 showing the original length detecting position, the image sensor 13 is provided along a longitudinal side 9a of the platen 9 on the original size scale 9A side to carry out main scanning for each line. In this embodiment, the longitudinal side 9a of the platen 9 is evenly divided into twenty portions, and original detection area points of the image sensor 13 corresponding to the divided points "1" through "19" are denoted with A through S, respectively. That is, it is decided which position the original P is placed at out of twenty divisions on the longitudinal side 9a of the platen.

Further, the image sensor 13 carries out subscanning along a lateral side 9b of the platen 9 on the original size scale 9B side. In this embodiment, the lateral side 9b of the platen 9 is divided evenly into twenty-five divisions. By the original detecting area point A of the image sensor 13 corresponding to the divided points "1'" through "24'", it is decided which position out of twenty-five divisions on the lateral side 9b of the platen 9 the original P is placed at.

As shown in FIG. 29, a distance sto which represents how long the image sensor 13 is deviated from positions corresponding to the points "1" through "19" on the longitudinal side 9a of the platen 9 is a distance for which the image sensor 13 is distant from the longitudinal side 9a of the platen in an initial state. A distance st which is made by equally dividing the lateral side 9b of the platen 9 into twenty-five divisions represents a distance between each of the points "1'" through "24'", which is to be shifted for detecting the length of the original by the image sensor 13.

Detection outputs of the image sensor 13 corresponding to the points "1" through "19" on the longitudinal side 9a of the platen 9 are stored in the line memory 830 through a signal processing step. In the line memory 830, as shown in FIG. 30, when the positions of the image sensor 13 corresponding to the points "1" through "19" on the longitudinal side 9a of the platen 9 are addressed, detection outputs a through s of the original detecting area points A through S can be obtained. The detection outputs a through s of the original detecting area points A through S while being stored in the line memory 830 are written in a work memory incorporated in the microcomputer 81 by predetermined addressing.

Further, detection outputs corresponding to the points "1'" through "24'" on the lateral side 9b of the platen 9 are stored in the line memory 830 through a signal processing step. Thus, the detection output a of the original detecting area point A corresponding to any of the points "1'" through "24'" is obtained by addressing of the corresponding position of the original detecting area point A on the longitudinal side 9a of the platen 9. The detection output a of the original detecting area point A is, while being stored in the line memory 830, written in the work memory incorporated in the microcomputer 81 by predetermined addressing.

A description will now be given on the operation of the image reading apparatus thus structured when applied to the copier, with reference to the following flow charts; however, since FIGS. 13-19 of the first embodiment are common with this embodiment, a description thereof will not be repeated.

Figure 31:
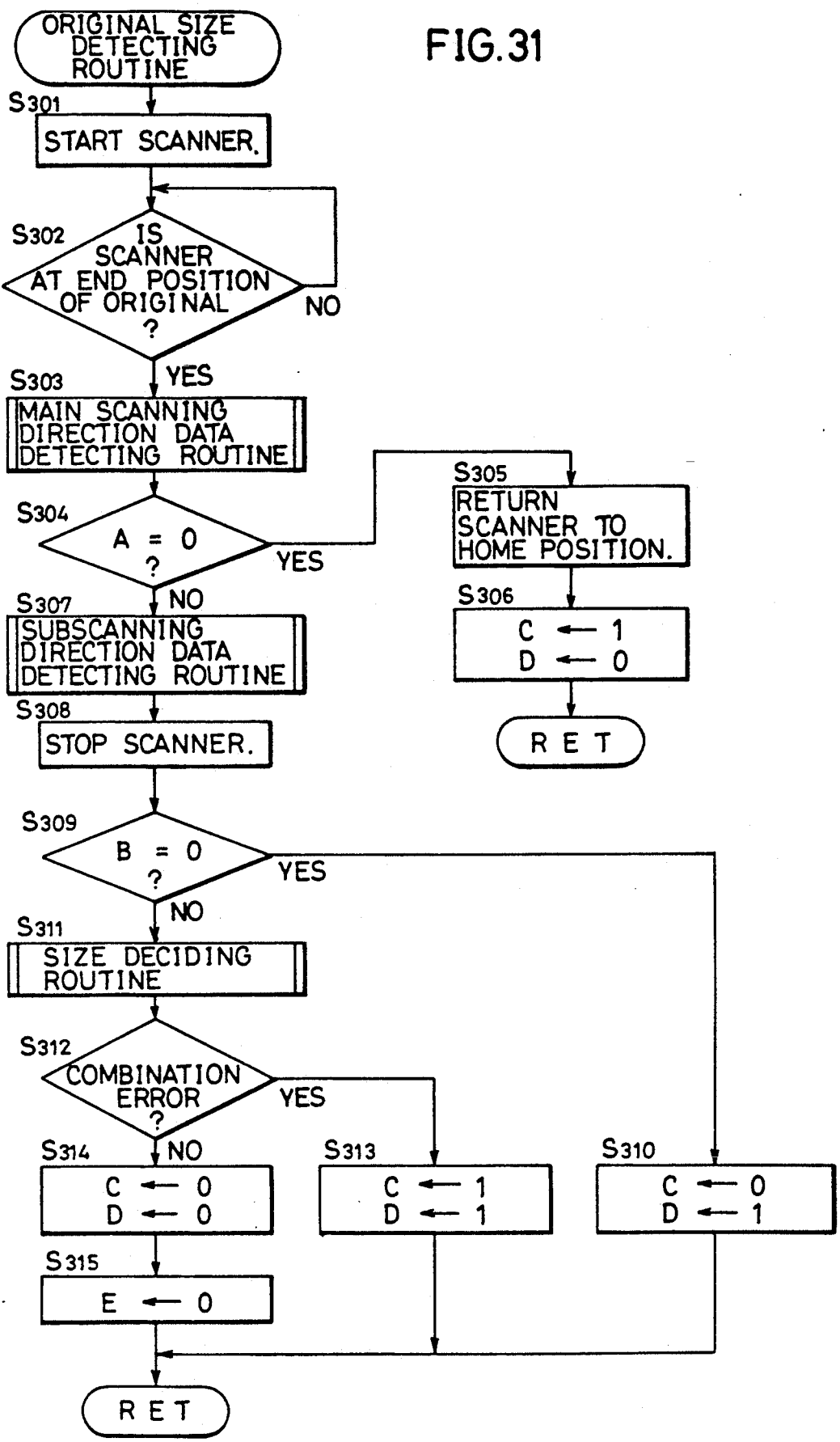
FIG. 31 is a flow chart of "original size detecting routine" corresponding to a main program of an image reading apparatus employed in a copier of the second embodiment of the present invention.
Figure 32:
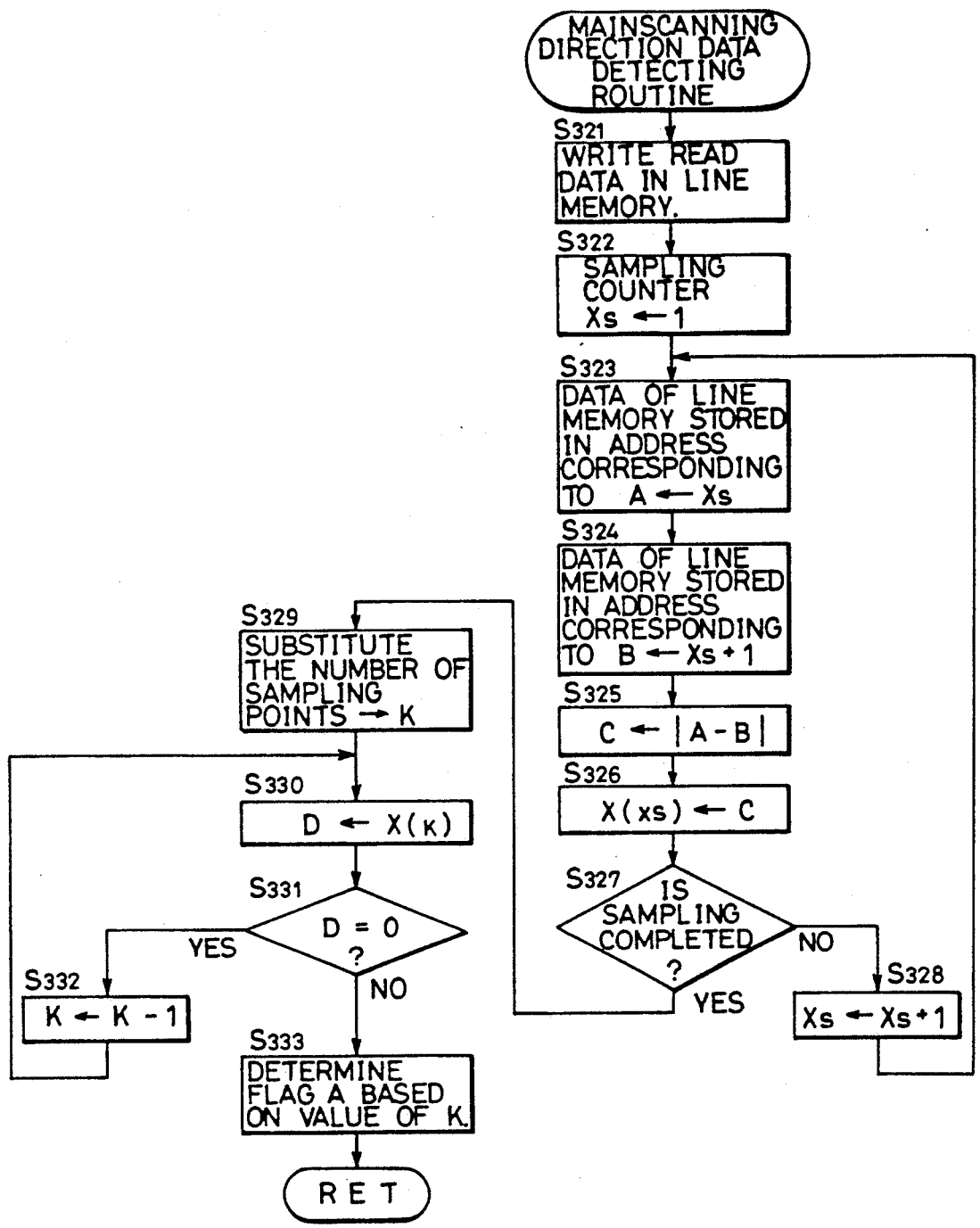
FIG. 32 is a flow chart of "main scanning direction data detecting routine" of FIG. 31.
Figure 33:
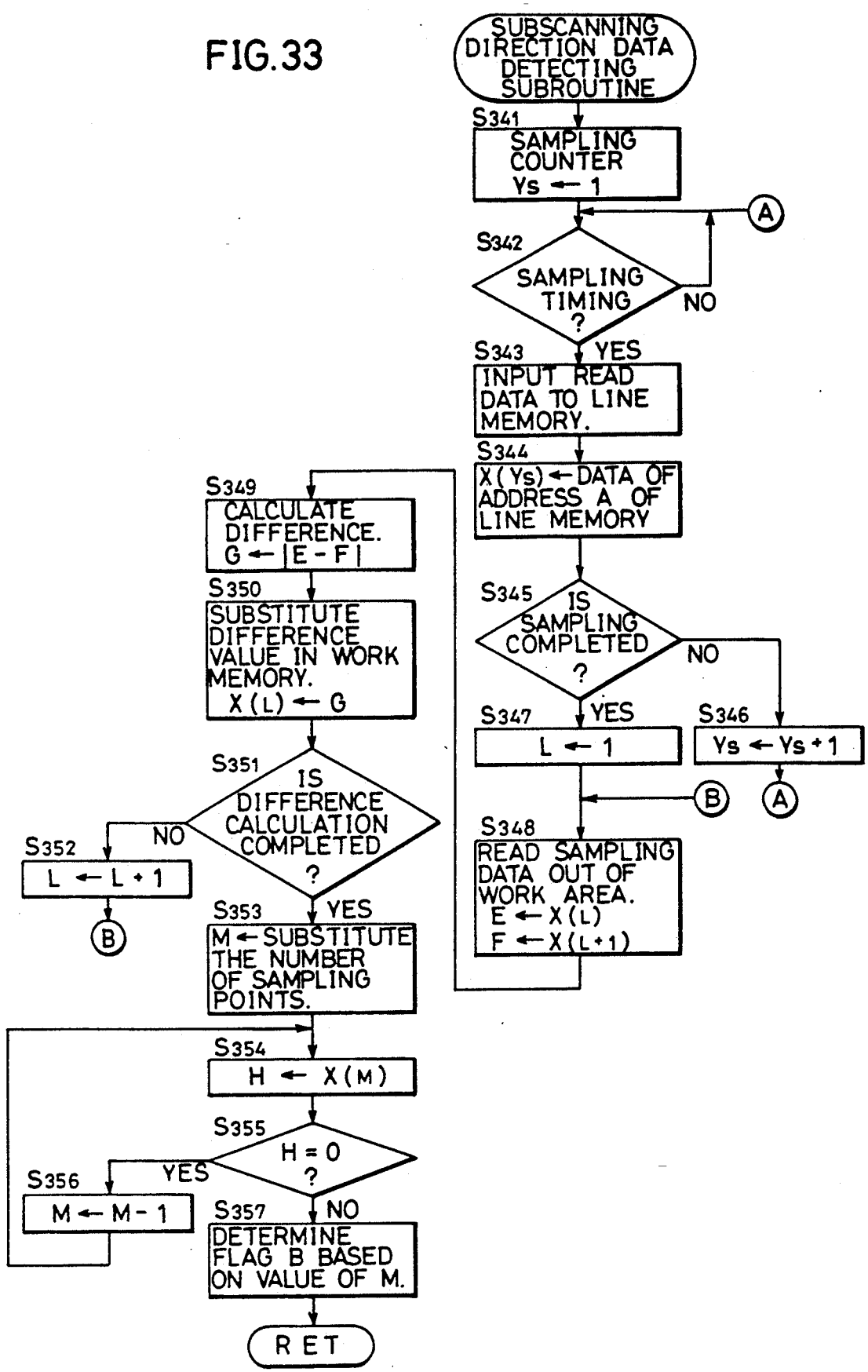
FIG. 33 is a flow chart of "subscanning direction data detecting routine" of FIG. 31.

FIG. 31 is a flow chart of "original size detecting routine" corresponding to a main program of the image reading apparatus of the second embodiment employed in the copier; FIG. 32 is a flow chart of "main scanning direction data detecting routine" employed in the main program; and FIG. 33 is a flow chart of "subscanning direction data detecting routine" similarly employed in the main program.

The flow chart of "original size detecting routine" of FIG. 31 will first be described.

In this routine, the scanner carries out a forward scanning for detecting image data at a designated position in the main scanning and subscanning directions, so as to store the detected image data in a flag when the original size in the main scanning or subscanning direction can be or cannot be detected.

Figure 14A:
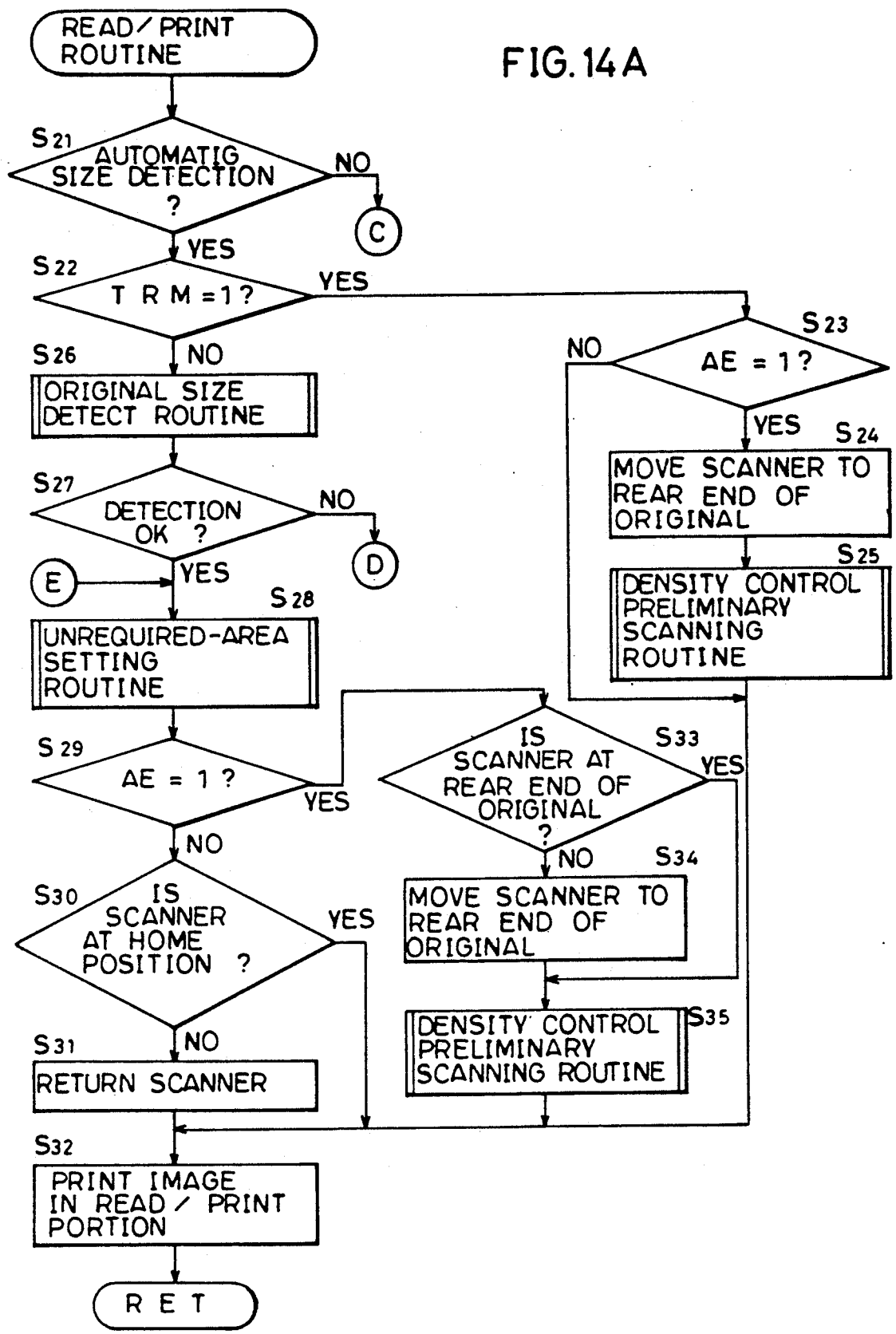
FIGS. 14A and 14B is a flow chart of "reading/printing routine" of FIG. 13.
Figure 14B:
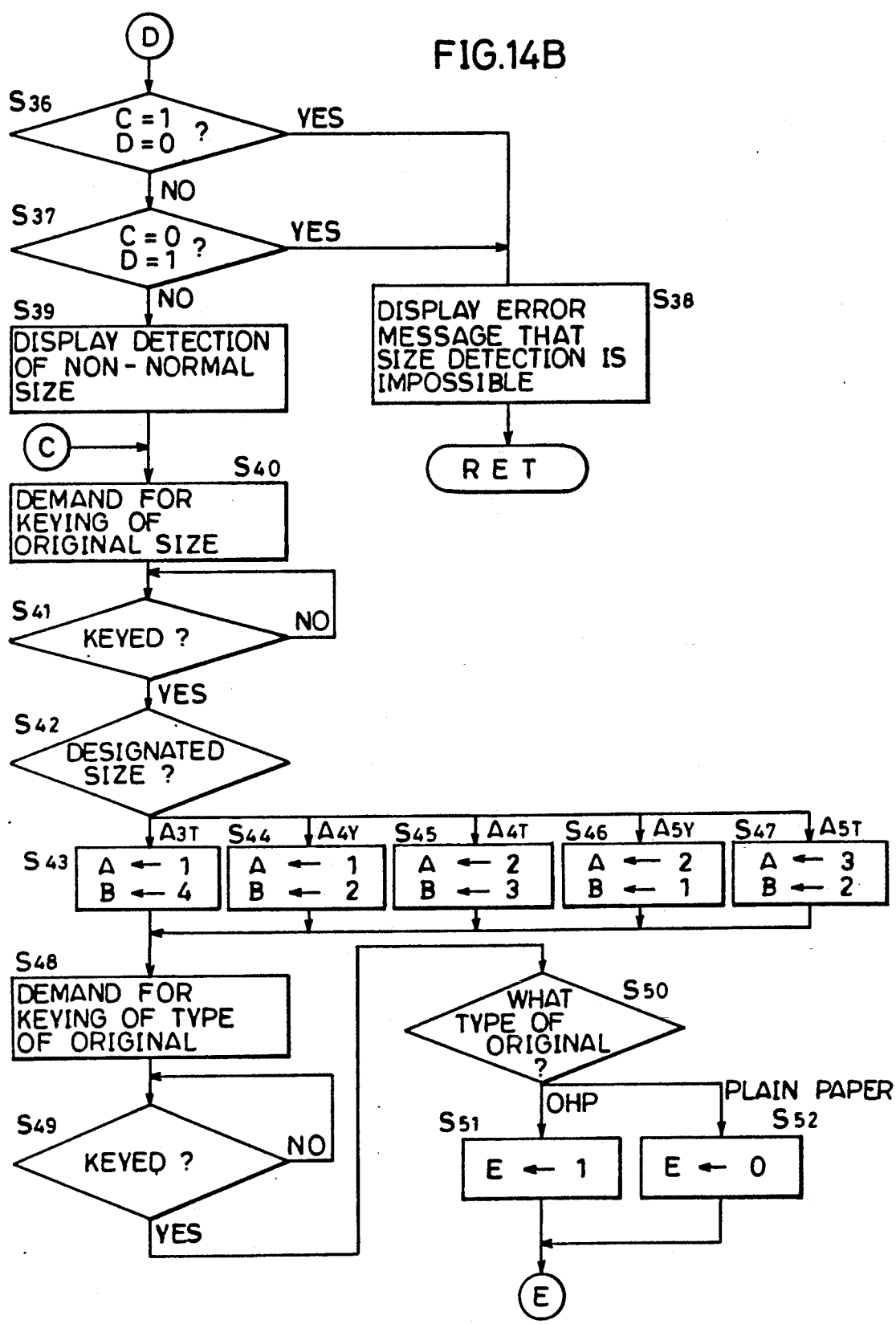

When this routine is called in the step S26 of FIG. 14A, the microcomputer moves the scanner 1 in step S301 so as to decide that the scanner 1 is moved by a distance sto from an original reference position S0 in step S302. That is, the microcomputer decides whether the scanner 1 is at the original reference position S0, namely, at the end position of the original. When the scanner 1 reaches the original reference position S0, it calls the "main scanning direction data detecting routine" to execute this routine. Then, it decides whether a flag A indicating that nothing is detected in the main scanning direction is "0" in step S304. When none is detected in the main scanning direction, the microcomputer returns the scanner 1 to home position in step S305 and sets a flag C indicating that the detection is impossible in the main scanning direction to "1" and a flag D to "0" in step S306, and thereafter leaves this routine.

When deciding that the detection is possible in the main scanning direction in step S304, the microcomputer calls the "subscanning direction data detecting routine" to execute this routine in step S307. It stops the scanner 1 at a designated position in step S308.

Then, the microcomputer decides whether a flag B indicating that the number of detecting points of the original size in the subscanning direction is zero is "0" in step S309. When the flag B is "0", the microcomputer sets the flag C indicating that the detection of the original size in the subscanning direction is impossible to "0" and the flag D to "1" in step S 310, and then leaves this routine. When the detecting points of the original size in the subscanning direction exist in step S309, the microcomputer calls "original size deciding subroutine" to check whether the original size matches a predetermined original size in a table storing a normalized original size in step S311. It decides whether the result of checking is a combination error in step S312. When the result is a combination error, the microcomputer sets the flag C to "1" and the flag D to "1" so as to store the fact that the original size cannot be defined in step S313, and then leaves this routine. When deciding that the result of checking is not a combination error in step S312, the microcomputer sets the flag C to "0" and the flag D to "0" so as to store the fact that the original size can be defined in step S314, and then sets a flag E to "0" so as to store the fact that the original size is normal size in step S315, thereafter leaving this routine.

The flow chart of "main scanning direction data detecting routine" of FIG. 32 will now be described.

In this routine, the microcomputer decides up to which position the original exists in the main scanning direction and the decided result is shown by a flag A.

Read data of the image sensor 13 is written in the line memory 830 in step S321, and "1" is set in a sampling counter Xs in step S322. The sampling counter Xs (=1) addresses a detection position of the image sensor 13 corresponding to the point "1" out of the points "1" through "19" on the longitudinal side 9a of the platen 9. In step S323, the data addressed in the sampling counter Xs (=1 at the first time) out of the read data stored in the line memory 830 is written in a memory .A. The data addressed in the sampling counter Xs+1 (=2 at the first time) out of the read data stored in the line memory 830 is written in a memory B in step S324. In step S325, an absolute value which is the result of subtracting the value of the memory B from the value of the memory A, namely, a difference value between the values of the memories A and B is written in a memory C. In step S326, the value of the memory C is stored in a work memory X (Xs) addressed in the sampling counter Xs. In step S327, the microcomputer decides whether the corresponding addressing of the points "1" through "19" on the longitudinal side 9a of the platen 9 is completed. That is, it decides whether or not the sampling counter Xs=19. When the sampling counter Xs is "19" or less, the microcomputer increments the sampling counter Xs by "1" so as to determine the next address to be sampled in step S328, and thereafter repetitively executes the routine from steps S323 to S327 and S328.

When the completion of sampling is decided in step S327, the number of divisions on the longitudinal side 9a of the platen 9, namely, the number of sampling points in the main scanning direction is stored in a memory K in step S329. Then, in step S330, the difference value addressed in the sampling counter Xs and stored in the work memory X (Xs) is addressed by the number of sampling in the main scanning direction stored in the memory K and then stored in a memory D. It is decided in step S331 whether or not the difference value stored in the memory D is zero. When the difference value is zero, it means that the data at adjacent detection positions addressed by the sampling counter Xs are approximate. In this state, the read data of the image sensor 13 is not variable but monotonous, and consequently, it is decided that the original P is not placed on the platen 9. Thus, the value of the memory K is decremented by "1" in step S332, and then the routine of steps S330 through S332 is repetitively executed. When it is decided that the value stored in the memory D is not zero in step S331, it means that the data at the adjacent detection positions addressed by the sampling counter Xs are variable. In this state, the read data of the image sensor 13 is discontinuous and makes an abrupt change, and it is consequently decided that the original P is placed on the platen 9. In step S333, the value of a flag A is determined by the value of the memory K in case where it is decided that the value stored in the memory D is not zero. This determination of the flag A is carried out in a table in which the relationship between the value of the memory K and that of the flag A is determined as follows:

When
$K > 17$, flag $A = 0$
$17 > K \geq 13$, flag $A = 1$
$13 > K \geq 9$, flag $A = 2$
$9 > K \geq 6$, flag $A = 3$
$6 > K$, flag $A = 0$ where the flag $A = 0$ indicates that the detection is not well carried out.

As in the foregoing, after determining the value of the flag A in step S333, the microcomputer leaves this routine.

Next, the flow chart of "subscanning direction data detecting routine" of FIG. 33 will now be described.

In this routine, it is decided at which position in the subscanning direction of forward scanning the original exists, and the result of decision is shown by a flag.

In step S341, the microcomputer sets "1" to a sampling counter Ys for setting a sampling position in the subscanning direction, and then decides whether movement of the scanner 1 is at a timing position for sampling, namely, at a position of "1'" through "24'" in step S343 When it is at the sampling position, read data is written in the line memory 830 in step S343. The detection output a of the original detecting area point A is stored in a work memory X (Ys) addressed by the sampling counter Ys by addressing the position of the image sensor 13 written in the line memory 830, which position corresponds to the point "1" on the longitudinal side 9a of the platen 9, in step S344. In step S345, the microcomputer decides whether the addressing corresponding to the points "1'" through "24'" on the lateral side 9b of the platen 9 is completed. That is, it decides whether the sampling counter Ys=24. When the sampling counter Ys is "24" or less, the sampling counter Ys is incremented by "1" so as to determine the next address to be sampled in step S346. Thereafter, the routine from steps S342 to S345 and S346 is repetitively executed.

When deciding that the sampling is completed in step S345, the microcomputer addresses the work memory X (Ys) in which the read data is stored and sets "1" to a counter L for designating an address for storing a difference value, in step S347. In step S348, the microcomputer addresses the work memory X (Ys) in which the read data is stored by the counter L, and then stores a work memory X (L) in a memory E and a work memory X (L+1) in a memory F. The microcomputer subtracts the read data stored in the memory F from the read data stored in the memory E in step S349. By evaluating an absolute value which is the result of subtraction, the difference value between each of the adjacent sampling positions is obtained to be stored in a memory G. In step S350, the difference value stored in the memory G is transferred to the work memory X (L) addressed by the counter L. The microcomputer decides whether the calculation of the difference value in the subscanning direction is completed in step S351. That is, the calculation of the difference value is completed when the counter L=24, in this embodiment. When it is decided that the calculation is not completed in step S351, the value of the counter L is incremented by "1" in step S352, and then the routine from steps S348 to S351 and S352 is repetitively executed.

When it is decided that the calculation is completed in step S351, the number of divisions on the lateral side 9b of the platen 9, namely, the number of sampling points in the subscanning direction is stored in a memory M in step S353. In step S354, the difference value addressed by the counter L and then stored in the work memory X (L) in step S 350 is addressed by the number M of the sampling points in the subscanning direction, and the difference value of a work memory X (M), is then stored in a memory H. In step S355, it is decided whether the difference value stored in the memory H is zero. When the stored difference value is zero, it means that the data at adjacent detection positions addressed by a counter M are approximate, and consequently it is decided that the original P is not placed on the platen 9. Thus, the value of the memory M is decremented by "1" in step S356, and then the routine from steps S354, S355 and S356 is repetitively executed. When it is decided that the value stored in the memory H is not zero in step S355, it is consequently decided that the original P is placed on the platen 9. Therefore, in step S357, the value of a flag B is determined by the value of the memory M in case where it is decided that the value stored in the memory H is not zero. This determination of the flag B is carried out in a table, in which the relationship between the value of the memory M and that of the flag B is represented as follows:

When
$M > 23$, flag $B = 0$
$23 \geq M \geq 18$, flag $B = 4$
$18 > M \geq 13$, flag $B = 3$
$13 > M \geq 8$, flag $B = 2$
$8 > M \geq 6$, flag $B = 1$
$6 > M$, flag $B = 0$ where the flag $B = 0$ means that the detection is not satisfactorily carried out.

As in the foregoing, after determining the value of the flag B in step S357, the microcomputer leaves this routine.

Since the flow chart of "original size deciding subroutine" is the same as FIG. 24 of the first embodiment, a description thereof will not be repeated.

As has been described, the image reading apparatus of the second embodiment comprises photoelectrical conversion means, sampling means, difference detecting means, and original size deciding means. The photoelectrical conversion means is provided under the platen 9 made of a transparent member on which the original P is placed, and having a light emitting portion including the exposure lamp 11 provided on the transparent member side, which is employed in general in the copier and directs light onto the original P on the platen 9 and having the image sensor 13 as a light receiving portion for receiving reflected light from the original P. The sampling means is controlled by the routine including the steps S321 through S328 of the "main scanning direction data detecting routine" except for the steps S325 and S326 and including the steps S341 through S346 of the "subscanning direction data detecting routine", in which routine an output of the photoelectrical conversion means is detected by sampling as read data from the line memory 830 storing an output of the image sensor 13, based on predetermined position information corresponding to the length of the platen 9 made of a transparent member, namely, position information of the points "1" through "19" on the longitudinal side 9a of the platen 9 and position information of the points "1'" through "24'" on the lateral side 9b of the platen 9. The difference detecting means is controlled by the routine including the steps S323 through S326, the routine including the steps S348 through S350, and the like, in which routines an output of the sampling means is converted into a plurality of signals each having different timing, so that the differences among these signals are obtained by predetermined timing. The original size deciding means determines a flag A of "main scanning direction data detecting routine" and a flag B of "subscanning direction data detecting routine", by which the size of the original placed on the transparent member is decided, based on an output of the difference detecting means and on the relationship between the time when the output thereof is obtained and predetermined timing, and decides whether or not the original size is predetermined normal size by the flag A and flag B in the "original size deciding subroutine".

Therefore, in the image reading apparatus of this embodiment, since the original placed on the platen 9 made of a transparent member and the original pressing cover is distinguished by shifting the phase of the position of the original placed on the platen 9 so as to detect the difference therebetween, a discontinuity point occurs at a turning point from presence to absence of the original, thereby enabling an increase in the difference therebetween. Further, even if white which is lighter than a white detecting level of the original is not employed for the original pressing cover, the detection of the end portion of the original is facilitated.

In addition, it is not necessary as is the conventional to carry out a signal processing, with the white lighter than the white detecting level of the original determined as a threshold level of the original pressing cover. Moreover, even if the color of the original pressing cover becomes darker year by year, the existence of a discontinuity point at the turning point from the presence to absence of the original facilitates the detection of the end portion of the original. Particularly, it is desirable for the color of the original pressing cover to be more distinguishable from the original. Therefore, preferably, a difference in lightness therebetween is set larger in a complementary color relationship. Accordingly, as shown in FIG. 13 of the first embodiment, it is desirable that the color of the original pressing cover is set to a color which is determined as black having a predetermined width by the image sensor 13 (where colorlessness is here regarded as a color) in a state that the original is being placed by the original pressing cover 8, in the same manner as the L-shaped area 8C of the elastic pressing member 8b.

Thus, it is also possible to avoid an erroneous operation due to noise or the like upon deciding the type and size of the original.

Further, in the second embodiment, the photoelectrical conversion means comprises the exposure lamp 11, which constitutes the copier, serving as the light emitting portion for directing light onto the original P on the platen 9, and the image sensor 13 serving as the light receiving portion for receiving reflected light. Thus, the image reading apparatus of the second embodiment can correspond to the detection of the size of the original merely with such an alteration of allotting memories and hence can be used without special additional circuit components.

Further, in the image reading apparatus of the second embodiment, the operation of the photoelectrical conversion means for detecting the original placed between the L-shaped area 8C and the top surface of the transparent member is carried out by the preliminary scanning by the scanner 1 before the copying operation. However, since the operation of the photoelectrical conversion means carried out by the scanner 1 is to detect the presence of the original at a designated position, the photoelectrical conversion means can be structured as shown in FIG. 30 showing another example of the photoelectrical conversion means employed in the image reading apparatus of the first embodiment of the present invention.

Referring to FIG. 28, the light emitting elements 121, 123 formed such as of LEDs direct light at an incident angle $\theta$ onto the surface of the original placed on the platen 9 made of the transparent member. The light receiving elements 122, 124 formed such as of phototransistors determine an incident angle perpendicularly to the surface of the original and detect the presence of the original by a random reflection at the original surface. This photoelectrical conversion means may be provided, as shown in FIG. 29, at a corresponding position of the points "1" through "19" on the longitudinal side 9a of the platen 9 and at a corresponding position of the points "1'" through "24" on the lateral side 9b of the platen 9. Then, in the same manner as the above embodiment, signals corresponding to those positions, after subjected to the signal processing step, may be stored in a memory having a predetermined capacitance such as the line memory 830.

In the photoelectrical conversion means employed in the image reading apparatus of this embodiment, when the original is placed on the platen, the light receiving elements 122, 124 receive scattered light from the original. When the original is not placed on the platen 9, the light from the original is totally reflected at a reflection angle $\theta$ by an L-shaped area (not shown) and hence does not enter the receiving elements 122, 124.

In this kind of embodiment, even if the image reading apparatus of the present invention is employed in the copier, there is no need to carry out preliminary scanning. Therefore, opening/closing of the original pressing cover makes it possible to immediately decide the placement of the original and thus eliminate useless time required for preliminary scanning.

In addition, the photoelectrical conversion means shown in FIG. 28 constitutes a photocoupler formed of the light emitting elements 121, 123 and light receiving elements 122, 124, and allows the light emitted from the light emitting elements 121, 123 to be directly directed onto the original; however, the synthetic resin such as of OHP paper has a polarization function, and hence providing a polarizing filter between the light emitting elements 121, 123 and light receiving elements 122, 124 makes it possible to enhance a sensitivity in detecting OHP paper or the like.

Further, the provision of the polarizing filter therebetween enables the photoelectric conversion element to decide the difference between the presence of the original and the L-shaped area, which is recognized as the same color by the eye. Thus, the difference between the presence of the original and the L-shaped area is not uniquely determined as "white", "black" to be determined by the eye. It is determined by the photoelectric conversion element for converting light into an electrical signal. This enhances degrees of freedom in design and also facilitates the detection of OHP paper.

However, the photoelectrical conversion means employed in the image reading apparatus in case of implementing the present invention comprises a plurality of light emitting portions and light receiving portions for receiving reflected light from the light emitting portions dependently on the number of sampling points; however, the photoelectrical conversion means can also scan in longitudinal and lateral directions on the platen 9. For example, it can be structured as shown in FIG. 34 showing another example of the photoelectrically converting means employed in the image reading apparatus of the present invention.

Figure 34:
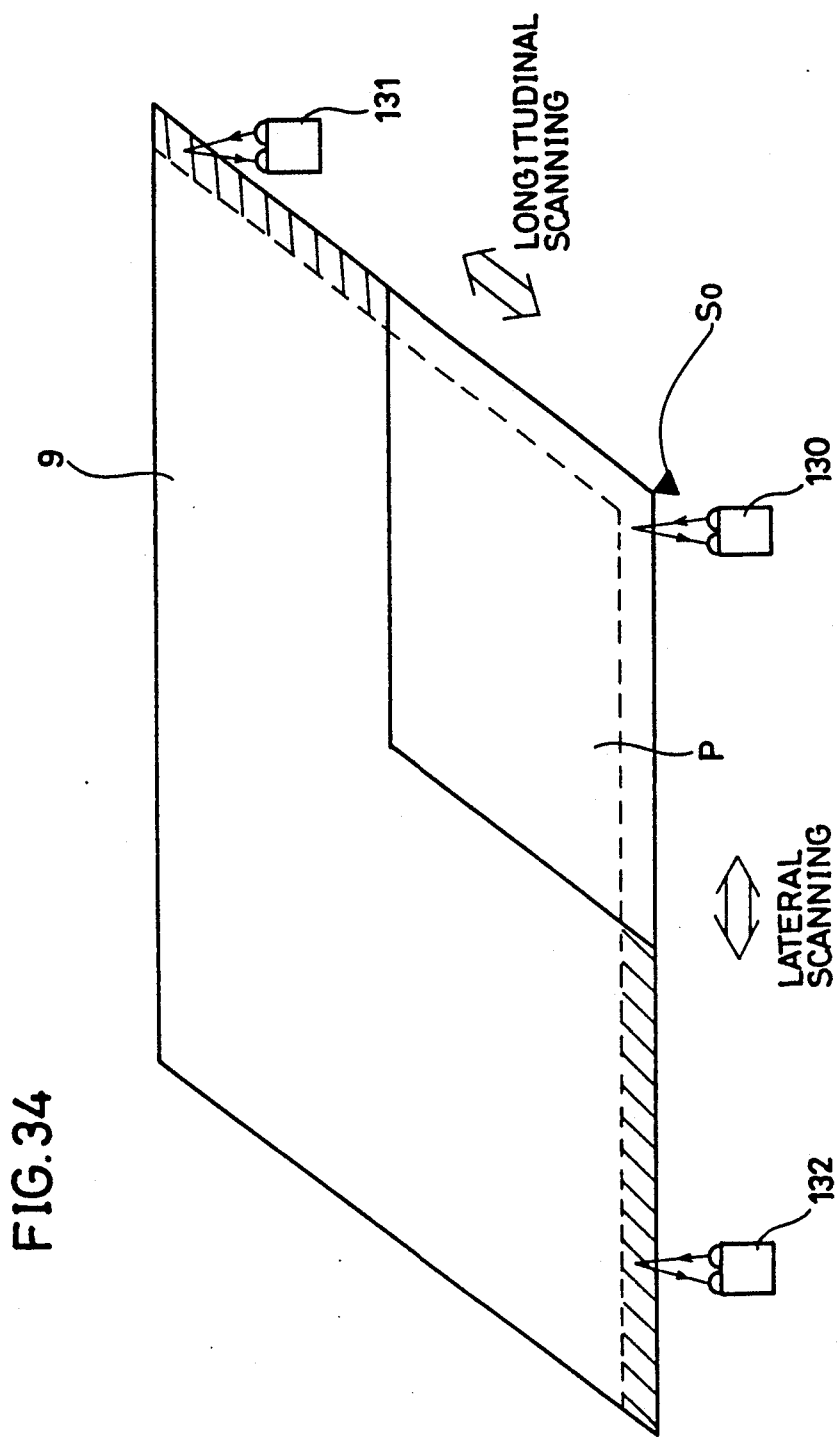
FIG. 34 is a diagram for describing another example of the photoelectrical conversion means employed in the image reading apparatus according to the second embodiment of the present invention.

Referring to FIG. 34, photoelectrical conversion means 130 is fixed at an original reference position S0 on the platen 9, photoelectrical conversion means 131 is movable in the longitudinal direction of the platen 9, and photoelectrical conversion means 132 is movable in the lateral direction of the platen 9, so as to sample signals therefrom. Similarly to the above described embodiment, each of the signals may be stored in a memory of a predetermined capacitance through the signal processing step.

In this kind of embodiment, it is possible to carry out scanning independently of the scanning by the scanner 1. Further, the above described photoelectrical conversion means 130, 131 and 132 can be mounted on the scanner 1.

Figure 35:
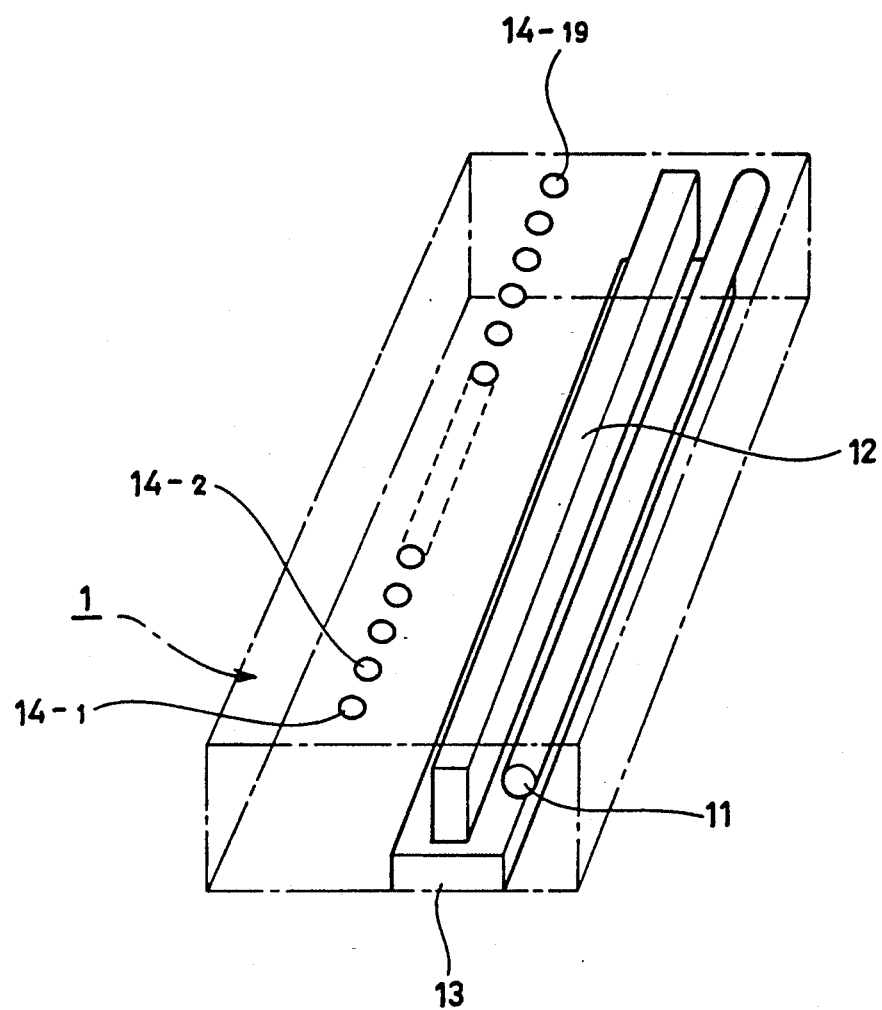
FIG. 35 is a view for describing still another example of the photoelectrical conversion means employed in the image reading apparatus of the second embodiment of the present invention.

The photoelectrical conversion means employed in the image reading apparatus of the second embodiment of the present invention can also be structured as shown in FIG. 35.

FIG. 35 is a diagram for describing another example of the photoelectrical conversion means employed in the image reading apparatus of the second embodiment of the present invention.

Referring to FIG. 35, a scanner 1 which corresponds to the scanner 1 of FIG. 2 of the first embodiment comprises an exposure lamp 11 for directing light to the original, a rod lens array 12 for converging reflected light from the original, and an image sensor 13 for color use formed such as of CCD for converting the converged light into an electrical signal. A housing of the scanner 1 comprises 19 light emitting elements 14-1 through 14-19 at positions corresponding to the points of sampling positions "1" through "19" on the longitudinal side 9a of the platen 9.

In this kind of embodiment, it is possible to obtain a sampling value of a predetermined position on the longitudinal side 9a of the platen 9 by detection of the light receiving elements 14-1 through 14-19 positioned on the longitudinal side 9a by the main scanning with the scanner 1. Further, it is possible to obtain a sampling value of the lateral side 9b of the platen 9 by detection of the light receiving element 14-1 positioned on the lateral side 9b by the subscanning with the scanner 1.

As described above, there are a variety of implementations available for the photoelectrical conversion means, provided under the platen 9 and having the light emitting portions for directing light to the platen 9 and the light receiving portions for receiving reflected light therefrom.

As for the sampling means for detecting by sampling the output of the photoelectrical conversion means based on predetermined position information corresponding to the length of the platen 9, the difference detecting means for converting the output of the sampling means into a plurality of signals having mutually different timing to obtain a difference between each of the signals at predetermined timing, the original size deciding means for deciding the size of the original placed on the transparent member in accordance with the output of the difference detecting means and the relationship between the time to obtain the output thereof and the predetermined timing, those means are already described in the case where the microcomputer is used; however, they can have another circuit configuration in case of implementation of the present invention, as shown in the following example.

Figure 36:
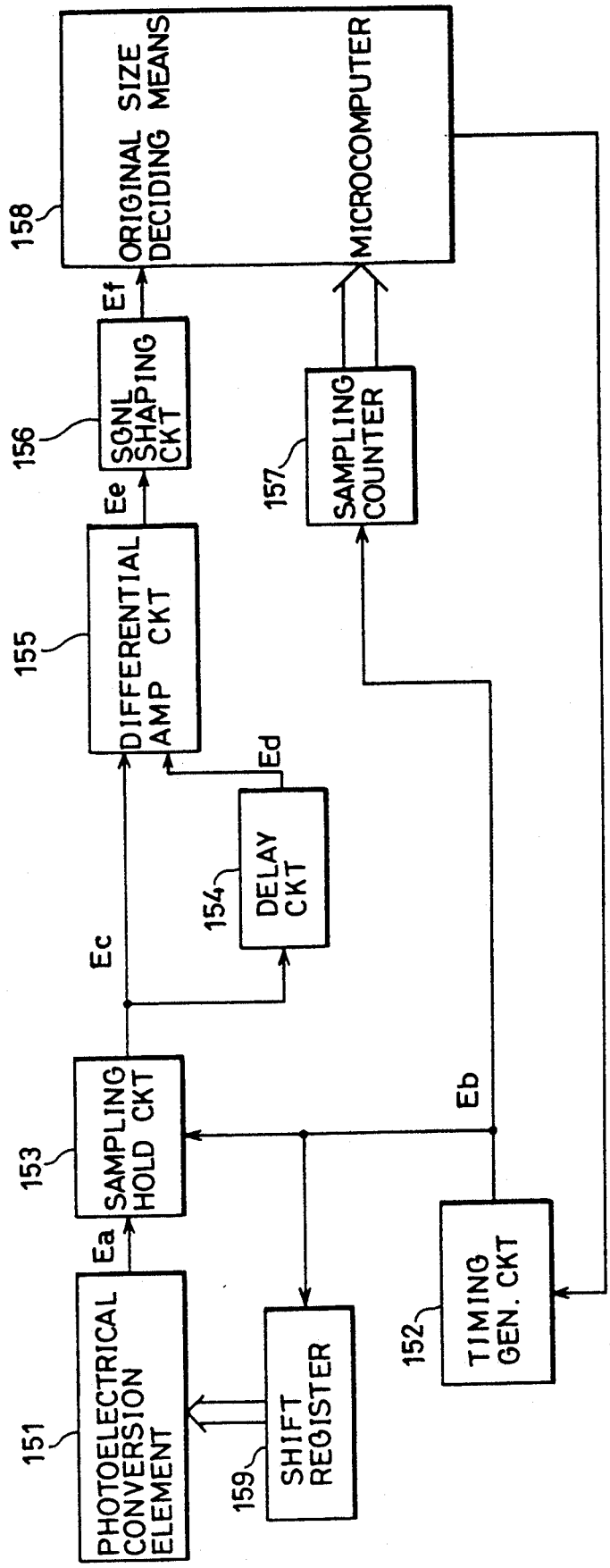
FIG. 36 is a block diagram showing the entire circuit configuration of an image reading apparatus of a third embodiment of the present invention.
Figure 37:
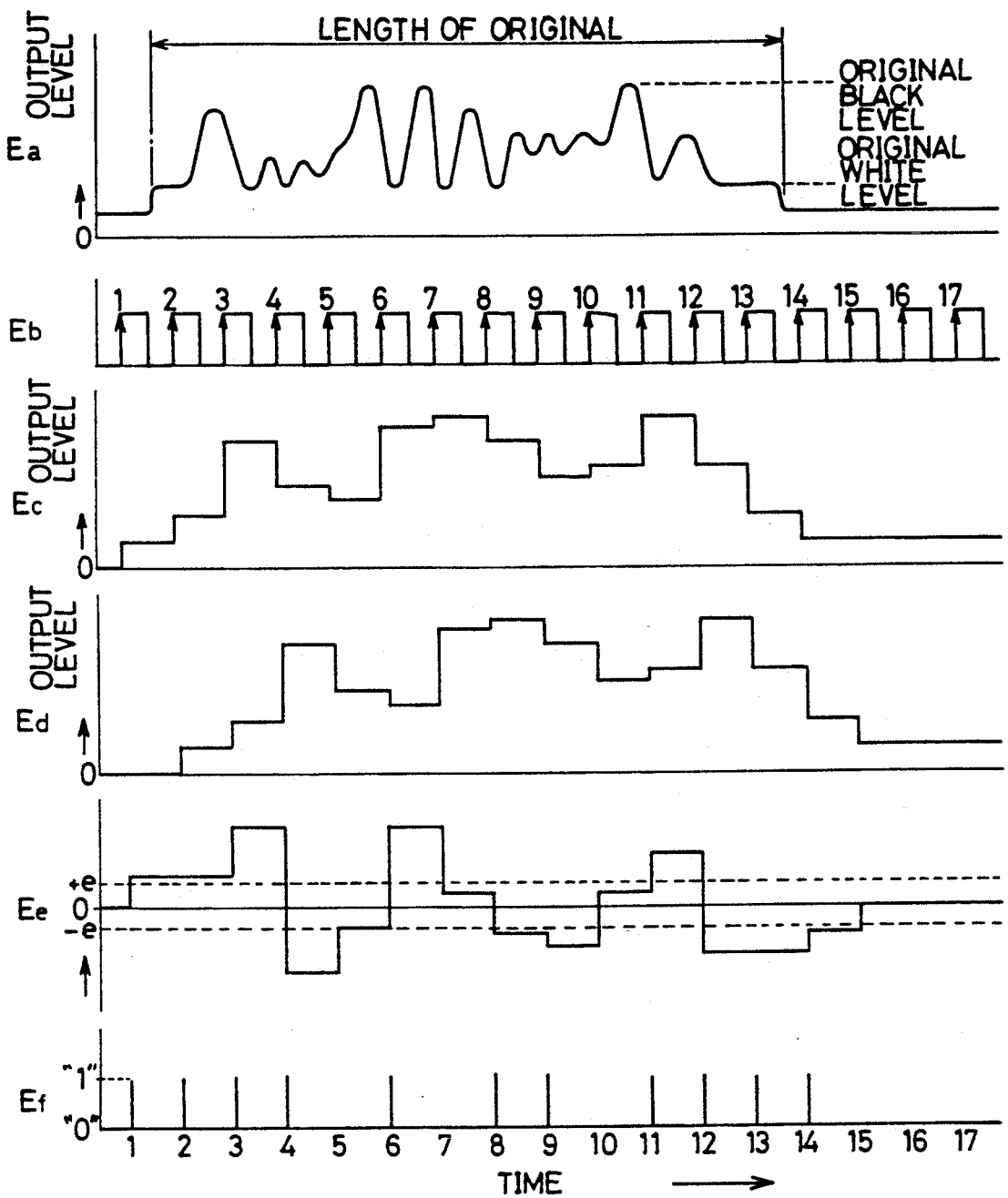
FIG. 37 is a timing chart showing output signals of the entire circuit configuration of the image reading apparatus of the third embodiment of FIG. 36.
Figure 38:
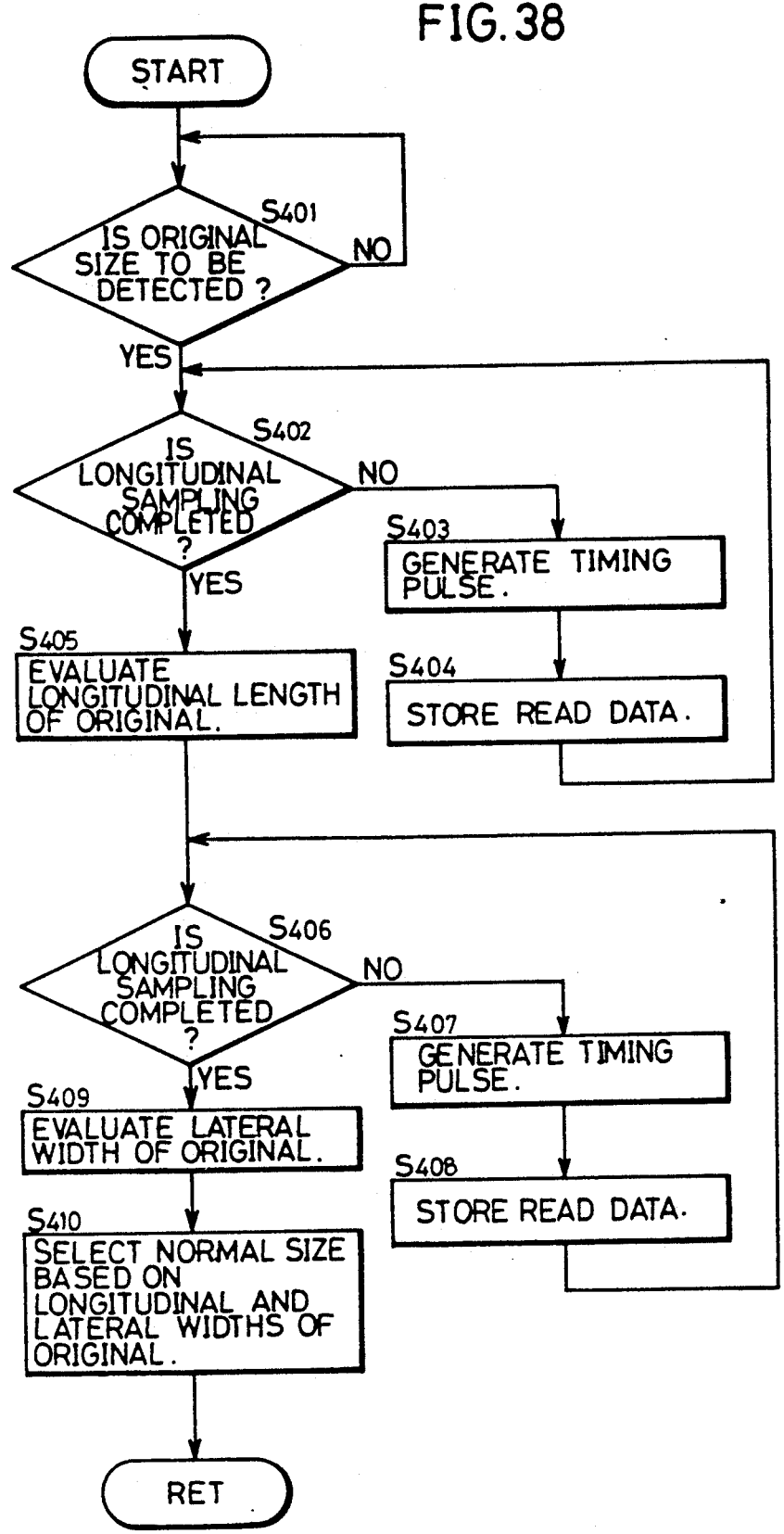
FIG. 38 is a flow chart which is carried out by original size deciding means of the image reading apparatus shown in FIG. 36.

FIG. 36 is a block diagram of an entire circuit configuration constituting an image reading apparatus of the third embodiment of the present invention; FIG. 37 is a timing chart for designating output signals of the entire circuit configuration of the image reading apparatus of the embodiment of FIG. 36; and FIG. 38 is a flow chart of a program to be executed by original size deciding means in the image reading apparatus of the embodiment of FIG. 36.

In the third embodiment, the L-shaped area 8C on the elastic pressing member 8B of the original pressing cover 8 is not to be determined as black having a predetermined width but as white by the image sensor 13.

Referring to the figures, a photoelectrical conversion element 151, which is the photoelectrical conversion means or the like described in the foregoing embodiments, comprises a light emitting portion and a light receiving portion for receiving reflected light from the light emitting portion and outputs, as shown in FIG. 29, a sampling hold signal Ec of the longitudinal side 9a of the platen 9.

A delay circuit 154 is, in this embodiment, a circuit for causing the sampling hold signal Ec to be a delay signal Ed which is delayed one period from a sampling timing signal Eb. There are two types of the delay circuit: one is in synchronization with the sampling timing signal Eb, the other is in nonsynchronization with the sampling time signal Ebo A differential amplifying circuit 155 is a circuit for subtracting the delay signal Ed from the sampling hold signal Ec, the output of which becomes a difference output Ee. A signal shaping circuit 156, which comprises a waveform shaping circuit and a binarization circuit, outputs a signal Ef which causes an output of the circuit 156 to be "0" when an input signal is equal to or lower than a predetermined threshold value (±e)and "1" when the input signal is higher than the predetermined threshold value. A sampling counter 157 counts signals generated from a timing generating circuit 152 to inform a microcomputer 158 of the completion of sampling in the longitudinal direction (main scanning direction ) and lateral direction ( subscanning direction ).

Next, the original size deciding means of the image reading apparatus of the third embodiment will now be described with reference to the flow chart of FIG. 38.

First, when it is decided that the original size is to be detected in response to a signal from an original size detecting signal source (not shown) in step S401, it is decided whether a longitudinal sampling is completed according to the sampling counter 157 in step S402. Before the end of the longitudinal sampling, the timing generating circuit 152 is driven so as to increment the value of the sampling counter 157 by "1" and also select the photoelectrical conversion element 151 by a shift register 159, in step S403. An output of the photoelectrical conversion element 151 in the longitudinal direction becomes a read data output Ea as shown in FIG. 37. Thus, each time the sampling time signal Eb is generated, the sampling hold signal Ec is obtained to be the delay signal Ed which is one period delayed from the sampling timing signal Eb in the delay circuit 154. The differential amplifying circuit 155 then accepts those signals to obtain the difference signal Ee. The signal shaping circuit 156 shapes the difference signal Ee into a predetermined signal Ef of "1" or "0" to provide the same to the original size deciding means 158.

The original size deciding means 158 receives the signal Ef to store the same in a predetermined memory, in step S404. Thus, the routine from the steps S402 to S404 is repetitively executed until the completion of sampling in longitudinal direction is decided according to the sampling counter 157 in step S402.

When it is decided according to the sampling counter 157 that the longitudinal sampling is completed in the step S402, the microcomputer subtracts the number of sampling points at the final position "1" from the number of longitudinal sampling points and evaluates a longitudinal width of the original depending on a value directly detected in accordance with position information of placement of the photoelectric conversion element 151, in step S405. At this time, the evaluation of the longitudinal width may be carried out by employing a flag as in the above described embodiment.

In step S406, it is decided whether a sampling in the lateral direction is completed according to the sampling counter 157. Before the lateral sampling is completed, the timing generating circuit 152 is driven so as to increment the value of the sampling counter 157 by "1" and also select the photoelectrical conversion element 151 by the shift register 159, in step S407. Then, each time the sampling timing signal Eb is generated, the sampling hold signal Ec is obtained to be the delay signal Ed which is one period delayed from the sampling timing signal Eb in the delay circuit 154. The differential amplifying circuit 155 accepts those signals to obtain the difference signal Ee. The signal shaping circuit 156 shapes the difference signal Ee into a predetermined signal Ef of "1" or "0" to input the same to the original size deciding means 158.

The original size deciding means 158 receives the signal Ef to store the same in a predetermined memory in step S408. Thus, the routine from the steps S406 to S408 is repetitively executed until the completion of lateral sampling is decided according to the sampling counter 157 in step S406.

When it is decided that the lateral sampling is completed according to the sampling counter 157 in step S406, the microcomputer 158 subtracts the number of sampling points at the final position of "1" from the number of lateral sampling points and evaluates the lateral width of the original depending on the value directly detected in accordance with the position information of placement of the photoelectrical conversion element 151. At this time, as it is described above, the evaluation of the lateral width may be carried out employing a flag. In step S410, it is decided whether or not the detected original size is normal size based on the longitudinal width and lateral width of the original, as shown in the "original size deciding subroutine" of FIG. 24 of the first embodiment, and the normal size is selected based on the detecting position in the main scanning and subscanning directions. Alternatively, it is decided whether the detected original size is out of the normal size.

As described above, although only the original size deciding means 158 is employed as a microcomputer in the image reading apparatus of the third embodiment of the present invention, this means 158 may be a circuit having a predetermined function in implementation of the present invention.

In addition, also in this embodiment, a precision in detecting the original of plain paper can be enhanced by setting the color of the original to a color which is determined as black with a predetermined width by the image sensor 13, similarly to the L-shaped area 8C on the elastic pressing member 8b, with the original pressing cover 8 pressing the original in the second embodiment.

Further, although the normal size is selected to decide the original size in the above described embodiments, the longitudinal and lateral width of the original directly detected can be used as the original size since the end portion of the original can be detected precisely in the third embodiment of the present invention.

In the above described embodiments, the decision of the original size is made with a difference detecting signal for one time, based on the sampling means for detecting by sampling the output of the photoelectrical conversion means in accordance with predetermined position information to obtain a difference signal, and the difference detecting means for converting the output of the sampling means into a plurality of signals having mutually different timing to obtain a difference between each of the signals at predetermined timing. However, in case of implementation of the present invention, it is also possible to again carry out position detection by narrowing the variation of the information of positions to be detected in difference after detecting the difference in predetermined positions so as to increase the variation of the output of the difference detecting means.

The image reading apparatus of the above described embodiments comprises the photoelectrical conversion means, the sampling means for detecting by Sampling the output of the photoelectrical conversion means as read data from the memory storing this output, based on predetermined position information corresponding to the length of the platen 9 made of a transparent member, the difference detecting means for converting the output of the sampling means into a plurality of signals having mutually different timing to obtain the difference between each of the signals at predetermined timing, and the original size deciding means for deciding the size of the original placed on the transparent member based on the output of the difference detecting means and the relation ship between the time to obtain this output and predetermined timing. The output of the sampling means is converted into a plurality of signals having mutually different timing, and the difference between each of the signals is obtained at predetermined timing. This makes it possible to cope with digital processing to facilitate digitization of a signal processing thereof.

However, in case of implementation of the present invention as described above, the object for which a difference detection output is obtained is predetermined position information corresponding to the length of the transparent member. Therefore, in case of analog and digital processings, the image reading apparatus can be structured with the sampling means for detecting by sampling the output of the photoelectrical conversion means based on predetermined position information corresponding to the length of the transparent member, the difference detecting means for converting the output of the sampling means into a plurality of signals having mutually different positions in the length of the transparent member to obtain the difference between each of the signals, and the original size deciding means for deciding the size of the original placed on the transparent member based on the output of the difference detecting means and on the relationship between the time to obtain this output and the predetermined length positions of the transparent member.

Moreover, the original reference position for detecting the original size of the embodiments of the present invention is set at the reference position on the platen made of the transparent member. However, any position may be the reference position on the platen in case of implementation of the present invention. Preferably, as in this embodiment, the reference position on the platen is set so as to match the original reference position at which the original is placed.

While the embodiments of the present invention have been described with the examples employed in the copier, they can be employed in devices in general for processing an image such as image scanners and facsimile devices, in case of implementation of the present invention.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image reading apparatus comprising
   an original placing platen formed of a rectangular transparent member on which an original is placed on a surface of said original placing platen;
   photoelectrical conversion means for reading an image of the original placed on said transparent member;
   original pressing means having an original pressing surface for pressing the overall surface of said original placing platen;
   said original pressing surface having a first area formed at a portion opposing a first side of said transparent member and a second area formed at a portion opposing a second side of said transparent member, said first side intersecting at a right angle with the second side, said first and second areas being determined as a predetermined color by said photoelectrical conversion means; and
   size detection means for detecting the size of the original based on a result of reading by said photoelectrical conversion means.

2. The image reading apparatus in accordance with claim 1, further comprising
   display means being operative when said size detection means can not detect the size of the original.

3. The image reading apparatus in accordance with claim 2, wherein
   said size detection means samples data at a plurality of positions in said first area and data at a plurality of positions in said second area so as to decide the size of the original based on the data sampled.

4. The image reading apparatus in accordance with claim 1, wherein
   said photoelectrical conversion means comprises
   a reading element, and
   a movable holder movable along the bottom surface of said transparent member, for holding said reading element.

5. The image reading apparatus in accordance with claim 4, wherein
   said size detection means moves said movable holder to a first position to sample image data of said first area, and when failing to sample the image data of said first area, moves said movable holder to a second position to sample the image data of said first area.

6. An image reading apparatus comprising;
   an original placing platen formed of a rectangular transparent member on which an original is placed;
   photoelectrical conversion means for converting an optical image into an electrical signal;
   movable optic means movable under said transparent member, for projecting an image of the original onto said photoelectrical conversion means as an optical image while moving;
   original pressing means having an original pressing surface for pressing an overall surface of said original placing platen;
   said original pressing surface having a first area formed at a portion opposing a first side of said transparent member and a second area formed at a portion opposing a second side of said transparent member, said second side crossing at a right angle to the first side of said transparent member, said first and second areas being determined as black by said photoelectrical conversion means, while other areas being determined as white;
   sampling means for sampling by said photoelectrical conversion means an image at a predetermined position on the original sandwiched between said first area on said original pressing surface and said transparent member and further sampling by said photoelectrical conversion means at an image at a predetermined position on the original sandwiched between said second area on said original pressing surface and said transparent member; and
   decision means for deciding the size of the original based on data sampled.

7. The image reading apparatus in accordance with claim 6, further comprising scanning control means for moving said movable optic means for sampling and, after sampling, moving said movable optic means for reading an entire image of the original.

8. An image reading method in an image reading apparatus for reading by photoelectrical conversion means an image of an original placed on a transparent member formed of a rectangular transparent material and pressed by original pressing means, said method comprising the steps of:

providing a first area at a portion, opposing a first side of said transparent member, on an original pressing surface of said original pressing means and providing a second area at a portion thereon opposing a second side of said transparent member, said first area intersecting said second area at a right angle, said first and second areas being determined as a predetermined color by said photoelectrical conversion means;

setting an original on said transparent member along the first and second sides thereof with an image side of the original to be read by the apparatus facing the transparent member;

reading with said photoelectrical conversion means an image of a portion of the image side of the original which is pressed by said first and second areas and of portions of the first and second areas which are directly in contact with the transparent member; ad creating image data based on said reading;

deciding the size of the original based on said image data.

9. The method of claim 8, further comprising the step of:

warning when the size of the original cannot be decided.

10. An image reading method in an image reading apparatus for reading by said photoelectrical conversion means an image of an original placed on a transparent member formed of a rectangular transparent material and pressed by original pressing means and producing image data, said method comprising the steps of:

providing a first area at a portion, opposing a first side of said transparent member, on an original pressing surface of said original pressing means and providing a second area at a position thereon opposing a second side of said transparent member, said first area meeting said second area at a right angle, said first and second area being determined as a predetermined color by said photoelectrical conversion means;

setting an original on said transparent member along the first and second sides thereof;

pressing the original by said original pressing means onto said transparent member;

sampling image data corresponding to a plurality of predetermined positions in said first area;

sampling image data corresponding to a plurality of predetermined positions in said second area; and deciding a size of the original based on said sampled image data.

11. The method of claim 10, wherein in said sampling steps, the sampling steps are repeated when the image of the portion pressed by said first area fails to be sampled.

12. An original size detecting device comprising:

an original placing platen formed of a rectangular transparent member on which an original can be placed;

original pressing means provided over the original placing platen and having an original pressing surface for pressing an overall surface of said original placing platen;

said original pressing surface having a first area formed at a portion opposing a first side of said transparent member and a second area formed at a portion opposing to second side of said transparent member, said second side crossing at a right angle at the first side of said transparent member;

detecting means provided under the original placing platen for detecting a density of a portion of an original sandwiched between said first and second areas on said original pressing surface and said transparent member;

size deciding means for deciding the size of the original based on the result of detection by said detecting means.

13. The original size detecting device in accordance with claim 12, wherein said detecting means comprises a light emitting element, a light receiving element and a polarizing filter between said light emitting element and said light receiving element.

14. The original size detecting device in accordance with claim 12, further comprising:

display means being operative when said size detecting means can not detect the size of the original.

15. The original size detecting device in accordance with claim 12, wherein said detection means samples data of a plurality of positions at the portion sandwiched between said first area and said transparent member and samples data of a plurality of positions at the portion sandwiched between said second area and said transparent member; and said size deciding means decides the size of the original based on the data sampled.

16. A method of deciding a size of an original placed on a transparent member formed of a rectangular transparent material and pressed by original pressing means, said method comprising the steps of:

providing a first area at a portion, opposing a first side of said transparent member, on an original pressing surface of said original pressing means and providing a second area at a portion thereon opposing a second side of said transparent member, said second side crossing at a right angle to the first side of said transparent member, said first and second areas being determined as a predetermined color b photoelectrical conversion means;

setting an original on said transparent member along the first and second sides thereof;

reading an image of a portion of the original pressed by said first and second areas; and deciding the size of the original based on the image data read.

17. A method of deciding a size of an original placed on a transparent member formed of a rectangular transparent material and pressed by original pressing means, said method comprising the steps of:

providing a photoelectrical conversion mans which generates image data corresponding to an image on the original placed the transparent member;

providing a first area at a portion, opposing a first side of said transparent member, on an original pressing surface of said original pressing means and providing a second area at a portion thereon opposing a second side of said transparent member, said second side crossing at a right angle to the first side of said transparent member, said first and second areas being determined as a predetermined color by the photoelectrical conversion means;

setting an original on said transparent member along the first and second sides thereof;

sampling data generated by said photoelectrical conversion means at a plurality of predetermined positions in an image of a portion of the original pressed by said first area;

sampling data generated by said photoelectrical conversion means at a plurality of predetermined positions in an image of a portion of the original pressed by said second area; and deciding the size of the original based on image data sampled.

18. The method of claim 17, wherein
in said sampling step, the sampling steps are repeated when the image of the portion pressed by said first area fails to be sampled.

19. An original size detecting device comprising:
detecting means for sampling density data at a predetermined position in an image of an original;
altering means for altering a sampling position when said detecting means fails in sampling; and
deciding means for deciding the size of the original based on said sampled data.

20. The original size detecting device in accordance with claim 19, further comprising:
warning means for warning when said detecting means fails in sampling successively predetermined times.

21. The original size detecting device in accordance with claim 21, wherein
said detecting means comprises
a detecting element, and
a movable optical system for projecting an image of the original onto said detecting element; and
said altering means alters the sampling position by moving said optical system.

22. A method of deciding the size of an original, comprising the steps of:
sampling density data at a predetermined position in an image of the original;
altering a sampling position to carry out sampling again when the sampling fails; and
deciding the size of the original based on sampling data.

23. The method of claim 22, further comprising the step of:
warning when the sampling fails successively predetermined times.

24. An image reading apparatus comprising:
original size deciding means for deciding the size of an original to be read;
area designating means for designating an area on the original to be read; and
control means for prohibiting an operation of said original size deciding means when the area to be read is designated.

25. The image reading apparatus in accordance with claim 24, further comprising:

scanning means for scanning an image of an original; wherein
said original size deciding means allows said scanning means to carry out a preliminary scanning prior to reading of the image so as to decide the original size based on information obtained by the preliminary scanning.

26. A copying apparatus comprising:
original size deciding means for deciding the size of an original;
area designating means for designating an area on the original to be copied; and
control means for prohibiting the operation of said original size deciding means when the area to be copied is designated.

27. The copying apparatus in accordance with claim 26, further comprising:
scanning means for scanning an image of the original; wherein
said original size deciding means allows said scanning means to carry out a preliminary scanning prior to a copying operation so as to decide the original size based on information obtained by the preliminary scanning.

28. An image reading apparatus comprising:
an original placing platen formed of a rectangular transparent member on which an original is placed;
photoelectrical conversion means for reading an image of the original placed on said transparent member;
original pressing means having an original pressing surface for pressing the overall surface of said original placing platen;
said original pressing surface having a first area formed at a portion opposing a first side of said transparent member and a second area formed at a portion opposing a second side of said transparent member, said second side crossing at a right angle to the first side of said transparent member and a remaining area;
said first and second areas being determined as a first color by said photoelectrical conversion means, while the remaining area is determined as a second color by said photoelectrical conversion mans;
detecting means for reading by said photoelectrical conversion means the original when sandwiched between sad first and second areas on said original pressing surface and said transparent member so as to detect a position where the original is placed based on the reading; and
control mans for prohibiting an operation of reading the entire image of the original when the position where the original is placed is inappropriate.

29. The image reading apparatus in accordance with claim 28, wherein
said detecting means samples an image at a predetermined position in a portion of the original sandwiched between said first area on said original pressing surface and said transparent member and samples an image at a predetermined position in a portion of the original sandwiched between said second area on said original pressing surface and said transparent member, so as to detect the position of the original based on data sampled.

30. The image reading apparatus in accordance with claim 28, further comprising:

scanning means for scanning the image of the original to project the scanned image onto said photoelectrical conversion means; wherein said detecting means allows said scanning means to carry out a preliminary scanning prior to a main scanning operation so as to detect the position where the original is placed based on information obtained by the preliminary scanning.

31. An image reading apparatus comprising:

an original placing platen formed of a rectangular transparent member on which an original is placed;

photoelectric conversion means for reading an image of the original placed on said transparent member;

original pressing means having an original pressing surface for pressing the overall surface of said original placing platen, said original pressing surface having a specific area formed at a portion opposing a reference side of said transparent member and a remaining area;

said specific area being determined as a first color by said photoelectrical conversion means, while the remaining area is determined as a second color by said photoelectric conversion means;

detecting means for reading by said photoelectrical conversion means an original sandwiched between said specific area on said original pressing surface and said transparent member so as to detect the position where the original is placed based on the result of reading; and control means for prohibiting an operation of reading the entire image of the original when the position where the original is placed is inappropriate.

32. An image reading method in an image reading apparatus for reading by photoelectrical conversion means an image of an original placed on a transparent member formed of a rectangular transparent material and pressed by original pressing means, said method comprising the steps of:

providing a first area at a portion, opposing a first side of said transparent member, on an original pressing surface of said original pressing means and providing a second area at a portion thereon opposing a second side of said transparent member, said second side crossing at a right angle to the first side of said transparent member, said first and second areas being determined as a predetermined color by said photoelectrical conversion means;

setting an original on said transparent member along the first and second sides thereof;

reading an image of a portion of the original pressed by said first and second areas;

detecting the position were a original is placed based on image data read; and prohibiting an operation of reading the entire image of the original when the position where the original is placed is inappropriate.

33. An image reading method in an image reading apparatus for reading by photoelectrical conversion means an image of an original placed on a transparent member formed of a rectangular transparent material and pressed by original pressing means, said method comprising the steps of:

providing a first area at a portion, opposing a first side of said transparent member, on an original pressing surface of said original pressing means and providing a second area at a portion thereon opposing a second side of said transparent member, said second side crossing at a right angle to the first side of said transparent member, said first and second areas being determined as a predetermined color by said photoelectrical conversion means;

setting an original on said transparent member along the first and second sides thereof;

sampling data at a plurality of determined positions in an image of a portion of the original pressed by said first area;

sampling data at a plurality of determined positions in an image of a portion of the original pressed by said second area;

detecting the position where the original is placed based on image data sampled; and prohibiting an operation of reading an entire image of the original when the position where the original is placed is inappropriate.

34. An image reading method in an image reading apparatus for reading by photoelectrical conversion means an image of an original placed on a transparent member formed of a rectangular transparent material and pressed by original pressing means, said method comprising the steps of:

providing a specific area at a portion, opposing a reference side of said transparent member, on an original pressing surface of said original pressing means;

setting an original on said transparent member along the reference side thereof;

reading an image of a portion of the original pressed by said specific area;

detecting the position where the original is placed based on image data read; and prohibiting an operation of reading the entire image of the original when the position where the original is placed is inappropriate.

35. A copying apparatus comprising;

an original placing platen formed of a rectangular transparent member on which an original is placed;

photoelectrical conversion means for reading an image of the original placed on said transparent member;

original pressing means having an original pressing surface for pressing an overall surface of said original placing platen;

said original pressing surface having a specific area formed at a portion opposing a reference side of said transparent member and a remaining area;

said specific area being determined as a first color by said photoelectrical conversion means, while the remaining area is determined as a second color by said photoelectrical conversion means;

detecting means for reading the original when it is sandwiched between said specific area on said original pressing surface and said transparent member so as to detect the position where the original is placed based on the result of said reading; and control means for prohibiting a copying operation of the original when the original placement position is inappropriate.

36. A processing method in a copying apparatus for copying an image of an original placed on an original placing platen formed of a rectangular transparent member and pressed by an original pressing member, said method comprising the steps of:

preparing a specific area at a portion, opposing a reference side of said transparent member, on said original pressing member;

said specific area being determined as a first color by photoelectrical conversion means, while remaining areas on said original pressing member are determined as a second color by said photoelectrical conversion means;

setting an original along said reference side;

reading by said photoelectrical conversion means an original sandwiched between said specific area on said original pressing member and said transparent member so as to detect the position where the original is placed based on the result of reading; and prohibiting a copying operation of the original when the original placement position is inappropriate.

37. An image reading apparatus comprising:
an original placing means for placing an original thereon;
photoelectrical conversion means for converting an optical image into image data;
reciprocating means reciprocating along said original placing means in a first direction and in a second direction opposite from the first direction, for projecting an image of the original onto said photoelectrical conversion means;
size detecting means for detecting the size of the original based on the image data outputted from said photoelectrical conversion means when said reciprocating means moves in the first direction; and
density detecting means for detecting a density of the original based on the image data outputted from said photoelectrical conversion means when said reciprocating means moves in the second direction.

38. The image reading apparatus in accordance with claim 39, wherein
said size detecting means samples image data at a predetermined position on the original so as to detect the size of the original.

39. The image reading apparatus in accordance with claim 31, wherein
said density detecting means samples image data at a predetermined position on the original so as to detect the density of the original.

40. An image reading apparatus comprising:
original placing means for placing an original thereon;
reciprocating means for scanning the original and reciprocating along said original placing means in a first direction and in a second direction opposite from the first direction;
size detecting means for detecting the size of the original when said reciprocating means moves in the first direction; and
density detecting means for detecting the density of the original when said reciprocating means moves in the second direction.

41. An image reading method in an image reading apparatus for scanning by reciprocating means an original placed on original placing means so as to read an image, said method comprising the steps of:
reciprocating said reciprocating means in a first direction and in a second direction opposite from the first direction so as to project an image of the original onto photoelectrical conversion means;
detecting a size of the original based on image data outputted from said photoelectrical conversion means when said reciprocating means moves in the first direction; and detecting a density of the original based on the image data outputted from said photoelectrical conversion means when said reciprocating means moves in the second direction.

42. A copying apparatus comprising:
an original placing means for placing an original thereon;
photoelectrical conversion means for converting an optical image into an electrical signal;
reciprocating means reciprocating along said original placing means in a first direction and in a second direction opposite from the first direction, for projecting an image of the original onto said photoelectrical conversion means;
size detecting means for detecting a size of the original in response to the electrical signal outputted from said photoelectrical conversion means when said reciprocating means moves in the first direction; and
density detecting means for detecting a density of the original in response to the electrical signal outputted from said photoelectrical conversion means when said reciprocating means moves in the second direction.

43. A copying apparatus comprising:
original placing means for placing an original thereon;
reciprocating means for scanning the original and reciprocating along said original placing means in a first direction and in a second direction opposite from the first direction;
size detecting means for detecting a size of the original when said reciprocating means moves in the first direction; and
density detecting means for detecting a density of the original when said reciprocating means moves in the second direction.

44. A processing method in a copying apparatus for scanning by reciprocating means an original placed on original placing means so as to copy an image of the scanned original on a record sheet, said method comprising the steps of:
reciprocating said reciprocating means in a first direction and in a second direction opposite from the first direction to project an image of the original onto photoelectrical conversion means;
detecting a size of the original in response to an electrical signal outputted from said photoelectrical conversion means when said reciprocating means moves in the first direction; and
detecting a density of the original in response to the electrical signal outputted from said photoelectrical conversion means when said reciprocating means moves in the second direction.

45. A processing method in a copying apparatus for scanning by reciprocating means an original placed on original placing means so as to copy an image of the scanned original on a record sheet, said method comprising the steps of:
reciprocating said reciprocating means in a first direction and in a second direction opposite from the first direction;
detecting a size of the original when said reciprocating means moves in the first direction;
detecting a density of the original when said reciprocating means moves in the second direction; and operating said reciprocating means again after detecting the size and density of the original so as to copy an image of the original on the record sheet.

46. An image reading apparatus comprising:
an original placing platen formed of a transparent member on which an original is placed;
photoelectrical conversion means for reading a density of the original placed on said transparent member;
first sampling means for sampling image densities of a plurality of predetermined points along a first side of the original so as to generate a plurality of first data;
first comparing means for comparing each of adjacent first data corresponding to adjacent predetermined points so as to detect a length of the original in a first direction based on a result of comparison;
second sampling means for sampling image densities of a plurality of predetermined points along a second side crossing at a right angle to the first side of the original to generate a plurality of second data;
second comparing means for comparing each of adjacent second data corresponding to adjacent predetermined points so as to detect a length of the original in a second direction based on a result of comparison; and
deciding means for deciding a size of the original based on the lengths of the original in said first and second directions.

47. The image reading apparatus in accordance with claim 46, wherein
said photoelectrical conversion means comprises
light emitting elements provided under said original placing platen, for directing light onto the original, and
light receiving elements provided under said original placing platen, for receiving reflected light from the original.

48. The image reading apparatus in accordance with claim 47, wherein
said photoelectrical conversion means comprises a plurality of pairs of the light emitting elements and light receiving elements.

49. The image reading apparatus in accordance with claim 46, further comprising:
storage means for storing the first and second data sampled, wherein
said first and second comparing means each compare the first and second data called from said storage means.

50. An image reading apparatus comprising:
an original placing platen formed of a transparent member on which an original is placed;
photoelectrical conversion means for reading an image of the original placed on said transparent member;
sampling means for sampling image densities of a plurality of predetermined points on the original so as to generate a plurality of density data;
comparing means for comparing each of adjacent density data corresponding to adjacent predetermined points; and
deciding means for deciding a size of the original based on a result of comparison by said comparing means.

51. The image reading apparatus in accordance with claim 50, wherein said predetermined points are each positioned in predetermined directions of the original and with predetermined spacings.

52. The image reading apparatus in accordance with claim 50, further comprising:
storage means for storing said plurality of density data generated by said sampling means; and
calling means for sequentially calling each of adjacent data pairs corresponding to the adjacent predetermined points out of said density data stored in said storage means, wherein
said density data in each pair called sequentially is compared by said comparing means.

53. A method of detecting the size of an original, comprising the steps of:
sampling image densities of a plurality of predetermined points along a first side of the original so as to generate a plurality of first data;
comparing each of adjacent first data corresponding to adjacent predetermined points out of said plurality of first data;
determining a length of the original in a first direction based on a result of comparing the first data;
sampling image densities of a plurality of predetermined points along a second side crossing at a right angle to the first side of the original so as to generate a plurality of second data;
comparing each of adjacent second data corresponding to adjacent predetermined points out of said plurality of second data;
determining a length of the original in a second direction based on a result of comparing the second data; and
determining a size of the original based on the lengths of the original in the first and second directions.

54. A method of detecting the size of an original, comprising the steps of:
sampling image densities of a plurality of predetermined points on the original in predetermined directions so as to generate a plurality of density data;
comparing each of adjacent density data corresponding to adjacent predetermined points out of said plurality of density data; and
determining a size of the original based on a result of comparison.

55. An image reading apparatus for reading an image of an original comprising:
an original placing platen formed of a rectangular transparent member having first and second surfaces;
photoelectrical conversion means, provided under the second surface of said original lacing platen, for reading through said second surface of said original placing platen the image side of the original placed on the first surface of said original placing platen with the image side of the original to be read by the apparatus facing said first surface of said original placing platen;
original pressing means, provided over the first surface of said original placing platen, having an original pressing surface, for pressing the original to the first surface of said original placing platen;
said original pressing surface having a first area formed at a potion opposing a first side of said transparent member and a second area formed at a portion opposing a second side of said transparent member, said second side crossing at a right angle to the first side of said transparent member, said first and second areas being determined as a predetermined color by said photoelectrical conversion means;

said photoelectrical conversion means generating a first signal when said photoelectrical conversion means reads the original sandwiched between aid first and second areas of said original pressing means and said first surface of said original placing platen and generating a second signal when said photoelectrical conversion means reads the portion of the first and second areas which are directly in contact with the first surface of the original placing platen; ad size detection means for detecting a size of the original based on the first and second signals generated b said photoelectrical conversion means.

* * * * *